US011997443B2

(12) United States Patent
Zhang et al.

(10) Patent No.: US 11,997,443 B2
(45) Date of Patent: May 28, 2024

(54) EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/518,392

(22) Filed: Nov. 22, 2023

(65) Prior Publication Data

US 2024/0147119 A1 May 2, 2024

Related U.S. Application Data

(63) Continuation of application No. PCT/CN2023/083552, filed on Mar. 24, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 25/00* (2006.01)
*H04R 1/10* (2006.01)

(52) U.S. Cl.
CPC ........... *H04R 1/1016* (2013.01); *H04R 1/105* (2013.01)

(58) Field of Classification Search
CPC ...... H04R 2460/13; H04R 9/06; H04R 11/02; H04R 2400/03; H04R 1/1075
See application file for complete search history.

(56) References Cited

U.S. PATENT DOCUMENTS 11,140,469 B1 10/2021 Miller et al.
2007/0009133 A1 1/2007 Gerkinsmeyer
(Continued)

FOREIGN PATENT DOCUMENTS

CN 106341752 A 1/2017
CN 209201336 U 8/2019
(Continued)

OTHER PUBLICATIONS

International Search Report in PCT/CN2023/083552 dated Jun. 30, 2023, 10 pages.
(Continued)

*Primary Examiner* — Amir H Etesam
(74) *Attorney, Agent, or Firm* — METIS IP LLC

(57) ABSTRACT

The earphone includes a sound generation component including a transducer; at least a portion of the sound generation component extending into a concha cavity of a user; and an ear hook including a first portion and a second portion, the second portion being connected to the first portion, and being connected to the sound generation component to place the sound generation component at a position near an ear canal without blocking an opening of the ear canal. The sound generation component has a first projection on a sagittal plane, and the auricle has a second projection on the sagittal plane. A centroid of the first projection may have a first distance from a highest point of the second projection in a vertical axis direction. A ratio of the first distance to a height of the second projection in the vertical axis direction may be in a range of 0.35-0.6.

17 Claims, 15 Drawing Sheets

(30) Foreign Application Priority Data

| | | |
|---|---|---|
| Dec. 30, 2022 | (WO) | PCT/CN2022/144339 |
| Mar. 2, 2023 | (WO) | PCT/CN2023/079409 |

(56) References Cited

U.S. PATENT DOCUMENTS

| | | | | |
|---|---|---|---|---|
| 2016/0134957 | A1* | 5/2016 | Jentz | H04R 1/105 381/380 |
| 2020/0322712 | A1 | 10/2020 | Williams et al. | |

FOREIGN PATENT DOCUMENTS

| | | | |
|---|---|---|---|
| CN | 110958526 | A | 4/2020 |
| CN | 212909891 | U | 4/2021 |
| CN | 113115152 | A | 7/2021 |
| CN | 214125513 | U | 9/2021 |
| CN | 113542956 | A | 10/2021 |
| CN | 113556638 | A | 10/2021 |
| CN | 113573215 | A | 10/2021 |
| CN | 114286228 | A | 4/2022 |
| CN | 114286236 | A | 4/2022 |
| CN | 217159946 | U | 8/2022 |
| CN | 115175069 | A | 10/2022 |

OTHER PUBLICATIONS

Written Opinion in PCT/CN2023/083552 dated Jun. 30, 2023, 7 pages.

International Search Report in PCT/CN2023/079409 dated Jun. 29, 2023, 8 pages.

Written Opinion in PCT/CN2023/079409 dated Jun. 29, 2023, 8 pages.

* cited by examiner

EARPHONES

CROSS-REFERENCE TO RELATED APPLICATION

This application is a continuation of International Application No. PCT/CN2023/083552, filed on Mar. 24, 2023, which claims priority of Chinese Patent Application No. 202211336918.4 filled on Oct. 28, 2022, the Chinese Patent Application No. 202223239628.6 filled on Dec. 1, 2022, the PCT application No. PCT/CN2022/144339 filed on Dec. 30, 2022, and the PCT application No. PCT/CN2023/079409 filed on Mar. 2, 2023, the contents of each of which are entirely incorporated herein by reference.

TECHNICAL FIELD

The present disclosure relates to the field of acoustic technology, and in particular relates to an earphone.

BACKGROUND

With the development of acoustic output technology, an acoustic output device (e.g., an earphone) has been widely used in people's daily life. The acoustic devices may generally be classified into a head-mounted type, an ear hook type, and an in-ear type according to the way users wear them. The output performance of the acoustic device may have a great impact on a using experience of the user.

Therefore, it is necessary to provide an earphone to improve the output performance of the acoustic output device.

SUMMARY

One of the embodiments of the present disclosure provides an earphone including: a sound generation component including a transducer and a housing accommodating the transducer, at least a portion of the sound generation component extending into a concha cavity; and an ear hook including a first portion and a second portion, the first portion being hooked between an auricle and a head of a user, the second portion being connected to the first portion, extending toward an anterolateral side of the auricle, and being connected to the sound generation component to place the sound generation component at a position near an ear canal without blocking an ear canal opening. The sound generation component and the auricle may have a first projection and a second projection, respectively on a sagittal plane, a centroid of the first projection having a first distance from a highest point of the second projection in a vertical axis direction, a ratio of the first distance to a height of the second projection in the vertical axis direction being in a range of 0.35-0.6; and in a specific frequency range, the sound generation component may be capable of providing sound with a maximum sound pressure of not less than 75 dB into the ear canal when an input voltage of the transducer does not exceed 0.6 V.

One of the embodiments of the present disclosure provides an earphone including: a sound generation component including a transducer and a housing accommodating the transducer, the sound generation component at least partially covering an antihelix region; an ear hook including a first portion and a second portion, the first portion being hooked between an auricle and a head of a user, the second portion being connected to the first portion, extending toward an anterolateral side of the auricle and being connected to the sound generation component to fix the sound generation component at a position near an ear canal without blocking an ear canal opening. The sound generation component and the auricle may have a first projection and a second projection, respectively on a sagittal plane, a centroid of the first projection having a first distance from the highest point of the second projection in a vertical axis direction, a ratio of the first distance to a height of the second projection in the vertical axis direction being in a range of 0.25 and 0.4; and in a specific frequency range, the sound generation component may be capable of providing a maximum sound pressure of not less than 70 dB into the ear canal when an input voltage of the transducer does not exceed 0.6 V.

BRIEF DESCRIPTION OF THE DRAWINGS

The present disclosure will be further illustrated by way of exemplary embodiments, which will be described in detail by means of the accompanying drawings. The first portion may be hung between the auricle of a user and the head of the user.

DETAILED DESCRIPTION

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios in accordance with these drawings without creative labor. The present disclosure may be applied to other similar scenarios based on these drawings without the expenditure of creative labor. Those having ordinary skills in the art, without further creative efforts, may apply the present disclosure to other similar scenarios according to these drawings.

Figure 1:
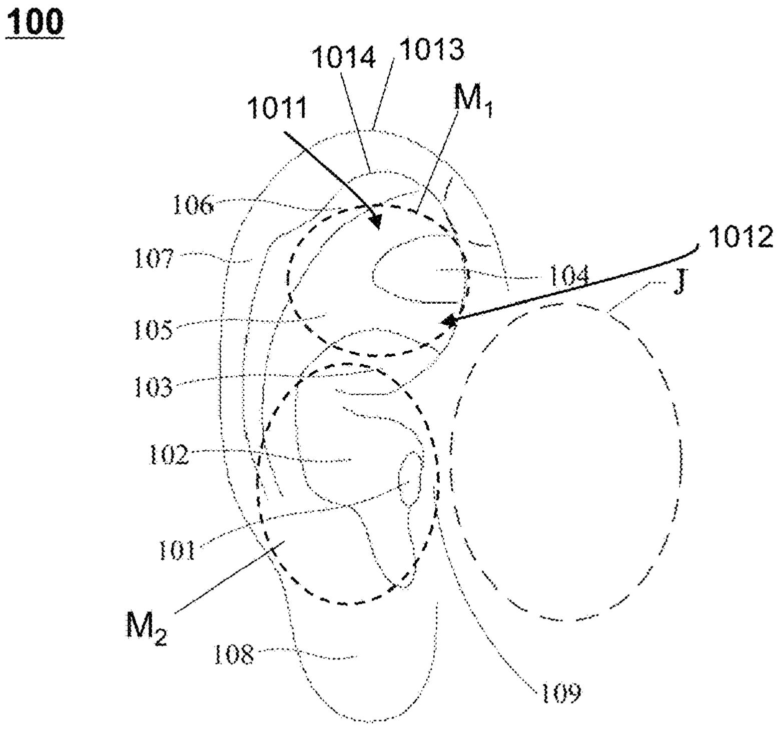
FIG. 1 is a schematic diagram illustrating an exemplary ear according to some embodiments of the present disclosure.

FIG. 1 is a schematic diagram illustrating an exemplary ear according to some embodiments of the present disclosure. As shown in FIG. 1, FIG. 1 is a schematic diagram of an exemplary ear according to some embodiments of the present disclosure. Referring to FIG. 1, an ear 100 may include an external ear canal 101, a concha cavity 102, a cymba conchae 103, a triangular fossa 104, an antihelix 105, a scaphoid 106, a helix 107, an earlobe 108, a crus of helix 109, an outer contour 1013, and an inner contour 1014. It should be noted that, for the convenience of description, an upper crus of helix 1011, a lower crus of helix 1012, and the antihelix 105 may be collectively referred to as the antihelix region in the embodiments of the present disclosure. In some embodiments, an acoustic device may be stably worn by means of one or more portions of the ear 100 supporting the acoustic device. In some embodiments, the external ear canal 101, the concha cavity 102, the cymba conchae 103, and the triangular fossa 104 may have a certain depth and volume in a three-dimensional (3D) space, which are used to meet wearing requirements of the acoustic device. For example, the acoustic device (e.g., the earphone) may be worn in the external ear canal 101. In some embodiments, the acoustic device may be worn by means of other parts of the ear 100 than the external ear canal 101. For example, the wearing of the acoustic device may be achieved with the help of portions such as the cymba conchae 103, the triangular fossa 104, the antihelix 105, the scaphoid 106, or the helix 107, or a combination thereof. In some embodiments, the earlobe 108 and other portions of the user may be further used to improve the wearing comfort and reliability of the acoustic device. By using other portions of the ear 100 than the external ear canal 101 to realize the wearing of the acoustic device and the transmission of sound, the external ear canal 101 of the user may be "freed". When the user wears the acoustic device (the earphone), the acoustic device may not block the external ear canal 101 of the user, and the user may receive both the sound from the acoustic device and the sound from the environment (e.g., a whistle sound, a car bell, a surrounding voice, a traffic command sound, etc.), so as to reduce a probability of traffic accidents. In some embodiments, the acoustic device may be designed into a structure adapted to the ear 100 according to a structure of the ear 100 to realize the wearing of the sound generation component of the acoustic device at different positions of the ear. For example, when the acoustic device is the earphone, the earphone may include a suspension structure (e.g., an ear hook) and the sound generation component physically connected with each other. The suspension structure may be adapted to a shape of an auricle, so as to place a whole or a portion of the sound generation portion in front of the crus of helix 109 (e.g., the region J enclosed by dotted lines in FIG. 1). As another example, when the user wears the earphone, the whole or the portion of the structure of the sound generation component may be in contact with an upper portion of the external ear canal 101 (e.g., a position where the crus of helix 109, the cymba conchae 103, the triangular fossa 104, the antihelix 105, the scaphoid 106, the helix 107, and other positions are located). Furthermore, for example, the whole or the portion of the structure of the sound generation component may be located in a cavity (e.g., a region M1 containing at least the cymba conchae 103 and the triangular fossa 104, and a region M2 including at least the concha cavity 102 enclosed by the dotted line in FIG. 1) formed by one or more portions of the ear (e.g., the concha cavity 102, the cymba conchae 103, the triangular fossa 104, etc.).

Different users may have individual differences, resulting in different shapes and sizes of the ears. For a convenience of description and understanding, unless otherwise specified, the present disclosure mainly takes to an ear model with a "standard" shape and size for reference, and further describes how the acoustic device in different embodiments is worn on the ear model. For example, a simulator containing the head and (left and right) ears thereof prepared based on ANSI: S3.36, S3.25 and IEC: 60318-7 standards, such as GRAS KEMAR, HEAD Acoustics, B&K 4128 series, or B&K 5128 series, may be used as a reference for wearing the acoustic device, to present a situation that most users normally wear the acoustic device. Taking GRAS KEMAR as an example, an ear simulator may be any one of GRAS 45AC, GRAS 45BC, GRAS 45CC, or GRAS 43AG. Taking HEAD Acoustics as an example, an ear simulator may be any one of HMS II.3, HMS II.3 LN, or HMS II.3LN HEC. It should be noted that the range of data measured in the embodiments of the present disclosure is based on GRAS 45BC KEMAR, but it should be understood that there may be differences between different head models and ear models. A projection of the auricle in a sagittal plane refers to the projection of an edge of the auricle on the sagittal plane. The edge of the auricle may at least consist of the outer contour of the helix, the contour of the earlobe, the contour of a tragus, an intertragic notch, the tip of the pairs of tragus, and the whorl screen notch, etc. Thus, in the present disclosure, words such as "worn by a user", "in a wearing state" and "in the wearing state" may therefore refer to the acoustic device described in the present disclosure being worn on the ear of the aforementioned simulator. Of course, considering the individual differences of different users, the structure, shape, size, and thickness of one or more portions of the ear 100 may be differentiatedly designed according to ears of different shapes and sizes. The differentiated design may be represented by that a feature parameter of one or more portions (e.g., the sound generation component, the earhook, etc. as follows) may have different ranges of values to adapt to different ears.

It should be noted that in the fields of medicine and anatomy, three basic planes including the sagittal plane, a coronal plane, and a horizontal plane, and three basic axes including the sagittal axis, the coronal axis, and the vertical axis of a human body may be defined. The sagittal plane refers to a section perpendicular to the ground along a front and rear direction of the body, which divides the human body into left and right portions; the coronal plane refers to a section perpendicular to the ground along a left and right direction of the body, which divides the human body into front and rear portions; and the horizontal plane refers to a section parallel to the ground along a vertical direction of the body, which divides the human body into upper and lower portions. Correspondingly, the sagittal axis refers to an axis along a front-rear direction of the body and perpendicular to the coronal plane, the coronal axis refers to an axis along a left-right direction of the body and perpendicular to the sagittal plane, and the vertical axis refers to an axis along a vertical direction of the body and perpendicular to the horizontal plane. Furthermore, the front side of the ear as described herein refers to the side of the ear along the sagittal axis direction and located on the side of the ear toward a facial region of the body. A schematic diagram illustrating a front contour of the ear as shown in FIG. 1 may be obtained by observing the ear of the simulator along the coronal axis direction of the human body.

The description of the above-described ear 100 is for illustration only and is not intended to limit the scope of the present disclosure. For those skilled in the art, a wide variety of variations and modifications may be made based on the description of the present disclosure. For example, a portion of the structure of the acoustic device may cover a portion part or all of the external ear canal 101. These changes and modifications remain within the scope of protection of the present disclosure.

Figure 2:
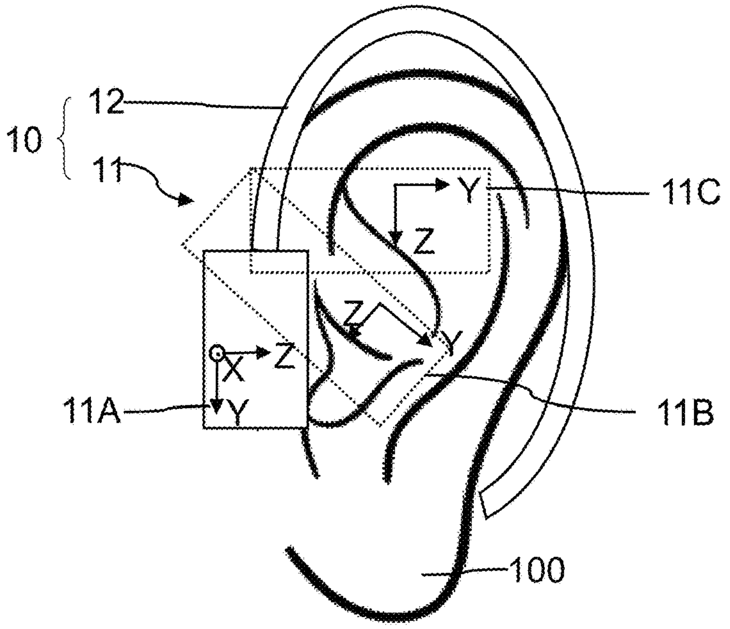
FIG. 2 is a schematic diagram illustrating an exemplary wearing of an earphone according to some embodiments of the present disclosure.

FIG. 2 is a schematic diagram illustrating an exemplary wearing of an earphone according to some embodiments of the present disclosure. As shown in FIG. 2, an earphone 10 may include a sound generation component 11 and a suspension structure 12. In some embodiments, the sound generation component 11 may be worn on a user's body (e.g., a head, a neck, or an upper torso of a human body) by the earphone 10 through the suspension structure 12. In some embodiments, the suspension structure 12 may be an ear hook. For example, the ear hook may be a curved structure. In some embodiments, the suspension structure 12 may also be a clamping structure adapted to the user's ear so that the suspension structure 12 can be clamped at the user's ear. In some embodiments, the suspension structure 12 may include, but is not limited to, the ear hook, an elastic band, etc., so that the earphone 10 can be better hooked to the user, thereby preventing the earphone 10 from dropping during use.

In some embodiments, the sound generation component 11 may be worn on the user's body, and a transducer may be disposed in the sound generation component 11 to generate a sound input to the user's ear 100. In some embodiments, the earphone 10 may be combined with products such as glasses, a headphone, a head-mounted display device, an augmented reality (AR)/virtual reality (VR) helmet, etc. In some embodiments, the sound generation component 11 may be circular, elliptical, polygonal (regular or irregular), U-shaped, V-shaped, or semi-circular so that the sound generation component 11 may be hung directly at the user's ear 100.

In some embodiments, the sound generation component 11 and the suspension structure 12 may be detachable from each other. The sound generation component 11 and the suspension structure 12 may be connected in various ways such as a clamping connection, a welding connection, a glue connection, a threaded connection, a screw connection, etc. The sound generation component 11 and the suspension structure 12 may be also connected through a connection structure (e.g., an adapter housing). Under the aforementioned design, the sound generation component 11 may be separated from the suspension structure 12 or the connection structure, and the sound generation component 11 may be measured to obtain data such as a size or a volume, etc.

In some embodiments, the housing of the sound generation component 11 may be integrally formed with the suspension structure 12. As the suspension structure 12 is used to wear the sound generation component 11 on the user, the suspension structure 12 and an inner side of a housing of the sound generation component 11 (e.g., the inner side IS in FIG. 3B) may not be on the same plane. Therefore, a section cutting the integrated structure of the plane where the inner side of a housing of the sound generation component 11 is located may be taken as a separation position between the sound generation component 11 and the suspension structure 12. A section cutting the integrated structure of the plane where the upper side face of a housing of the sound generation component 11 (e.g., the upper side face US in FIG. 3B) is located may be taken as another separation position between the sound generation component 11 and the suspension structure 12. Based on the above two separation positions, the sound generation component 11 and the suspension structure 12 may be differentiated for further operations including a measurement, etc.

Combining FIGS. 1 and 2, in some embodiments, when the user wears the earphone 10, at least a portion of the sound generation component 11 may be located in a region J on the front side of the tragus, or a region M1 and a region M2 on an anterolateral side of the auricle of the user's ear 100 illustrated in FIG. 1. Exemplary illustrations will be provided below in conjunction with different wearing positions (11A, 11B, and 11C) of the sound generation component 11. It should be noted that the anterolateral side of the auricle in some embodiments of the present disclosure refers to a side of the auricle away from the head along the coronal axis. Correspondingly, a posteromedial side of the auricle refers to a side of the auricle facing the head along the coronal axis. In some embodiments, the sound generation component 11A may be disposed on the side of the user's ear 100 facing a human face region along the sagittal axis direction, i.e., the sound generation component 11A may be disposed on the front side of the ear 100 in a human face region J. Further, a transducer may be provided inside the housing of the sound generation component 11A, and the housing of the sound generation component 11A may be provided with at least one sound guiding hole (not shown in FIG. 2). The sound guiding hole may be disposed on a sidewall of the housing of the sound generation component facing or near the external ear canal 101 of the user, and the transducer may output the sound through the sound guiding hole to the external ear canal 101 of the user. In some embodiments, the transducer may include a diaphragm, the cavity inside the housing of the sound generation component 11 being at least divided into a front cavity and a rear cavity. The sound guiding hole may be coupled with the front cavity and the diaphragm may vibrate to drive the air in the front cavity to vibrate to produce an air conduction sound. The air conduction sound generated in the front cavity may be spread to the outside through the sound guiding hole. In some embodiments, the housing of the sound generation component 11 may further include one or more pressure relief holes, the pressure relief holes may be located on a sidewall of the housing adjacent or opposite to the sidewall where the sound guiding hole is located. The pressure relief holes may be acoustically coupled to the rear cavity. When the diaphragm vibrates, the air in the rear cavity may also be driven to vibrate to generate the air conduction sound. The air conduction sound generated in the rear cavity may be transmitted to the outside through the pressure relief holes. Exemplarily, in some embodiments, the transducer within the sound generation component 11A may output sounds with a phase difference (e.g., opposite phases) through the sound guiding hole and the pressure relief hole. The sound guiding hole may be disposed on the sidewall of the housing of the sound generation component 11 facing the external ear canal 101 of the user, and the pressure relief hole may be disposed on the sidewall of the housing of the sound generation component 11 departs from the external ear canal 101 of the user. At this time, the housing may serve as a baffle to increase a sound path difference between the sound guiding hole and the pressure relief hole to the external ear canal 101 to increase a sound intensity at the external ear canal 101 while decreasing a volume of a far-field sound leakage. In some embodiments, the sound generation component 11 may have a long axis direction Y and a short axis direction Z that are perpendicular to a thickness direction X and orthogonal to each other. The long axis direction Y may be defined as a direction with the greatest extension dimension in a shape of a two-dimensional (2D) projection plane (e.g., a projection of the sound generation component 11 on a plane where the outer side of the sound generation component 11 is located, or on a sagittal plane) of the sound generation component 11 (e.g., when the projection shape is a rectangle or a proximate rectangle, the long axis direction may be a length direction of the rectangle or the proximate rectangle). The short axis direction Z may be defined as the direction perpendicular to the long axis direction Y in the shape of the projection of the sound generation component 11 on the sagittal plane (e.g., when the shape of the projection is the rectangle or the proximate rectangle, the short axis direction may be a width direction of the rectangle or the proximate rectangle). The thickness direction X may be defined as the direction perpendicular to the 2D projection plane, e.g., the thickness direction X may be the same as the coronal Axis, which both points to the left-right direction of the body. In some embodiments, when the sound generation component 11 is in a tilted state in the wearing state, the long axis direction Y and the short axis direction Z may be still parallel or approximately parallel to the sagittal plane, and the long axis direction Y may have a certain angle with the direction of the sagittal axis, that is, the long axis direction Y may also be tilted accordingly, and the short axis direction Z may have a certain angle with the vertical axis direction, that is, the short axis direction Z may also be tilted, as the wearing situation of the sound generation component 11B shown in FIG. 2. In some embodiments, the whole or a portion of the structure of the sound generation component 11B may extend into the concha cavity. That is, the projection of the sound generation component 11B on the sagittal plane may have an overlapping portion with the projection of the concha cavity on the sagittal plane. For specific contents of the sound generation component 11B, please refer to other parts of the present disclosure, e.g., FIG. 3A and the corresponding description thereof. In some embodiments, the sound generation component 11 may also be in a horizontal state or a near-horizontal state in the wearing state. As shown by the sound generation component 11C of FIG. 2, the long axis direction Y may be consistent or approximately consistent with the sagittal axis direction, which are both pointing in the front and back direction of the body. The short axis direction Z may be consistent or approximately consistent with the vertical axis direction, which are both pointing in the Up and down direction of the body. It may be noted that in the wearing state, the sound generation component 11C being in the near-horizontal state may refer to that an angle between the long axis direction Y of the sound generation component 11C shown in FIG. 2 and the sagittal axis is within a specific range (e.g., not greater than 20°). In addition, the wearing position of the sound generation component 11 may not be limited to the sound generation component 11A, the sound generation component 11B, and the sound generation component 11C shown in FIG. 2, as long as the wearing position satisfies the region J, the region M1, or the region M2 shown in FIG. 1. For example, the whole or portion of the structure of the sound generation component 11 may be located in the region J enclosed by the dotted line in FIG. 1. As another example, the whole or portion of the structure of the sound generation component may be in contact with a location where one or more portions of the ear 100, such as the crus of helix 109, the cymba conchae 103, the triangular fossa 104, the antihelix 105, the scaphoid 106, the helix 107, etc., are located. As another example, the whole or portion of the structure of the sound generation component 11 may be disposed within the cavity (e.g., the region M1 containing at least the cymba conchae 103, the triangular fossa 104 and the region M2 containing at least the concha cavity 102, enclosed by the dashed lines in FIG. 1) formed by one or more portions (e.g., the concha cavity 102, the cymba conchae 103, the triangular fossa 104, etc.) of the ear 100.

To improve a stability of the earphone 10 in the wearing state, the earphone 10 may adopt any one or any combination of the following modes. First, at least a portion of the suspension structure 12 may be configured as a profiling structure that fits at least one of a posteromedial side of the auricle and the head, to increase a contact area between the suspension structure 12 and the ear and/or the head, thereby increasing a resistance preventing the acoustic device 10 from falling off the ear. Second, at least a portion of the suspension structure 12 may be configured as an elastic structure, so that the suspension structure 12 may have a certain deformation in the wearing state, so as to increase a positive pressure of the suspension structure 12 on the ear and/or head, thereby increasing the resistance preventing the acoustic device from falling off the ear. Third, the suspension structure 12 may be at least partially configured to abut against the ear and/or the head in the wearing state. Fourth, the sound generation component 11 and the suspension structure 12 may be disposed to clamp an antihelix region, the concha cavity region, etc., from the anterolateral side and the posteromedial side of the auricle in the wearing state, thereby increasing the resistance preventing the earphone 10 from falling off the ear. Fifth, the sound generation component 11 or the structure connected thereto may be disposed to at least partially extend into cavities such as the concha cavity 102, the cymba conchae 103, the triangular fossa 104, or the scaphoid 106, thereby increasing the resistance preventing the earphone 10 from falling off the ear.

Figure 3A:
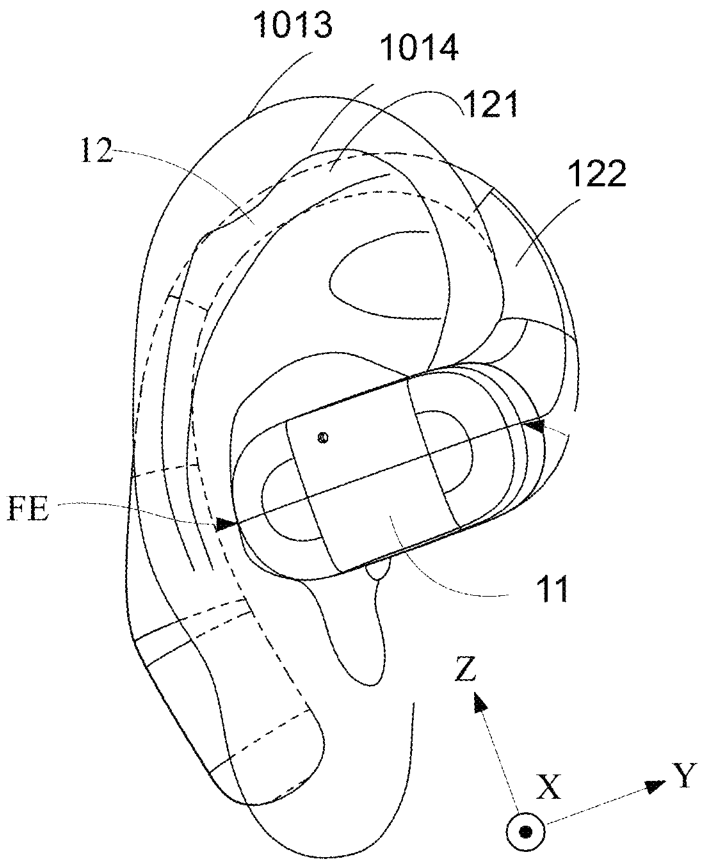
FIG. 3A is a schematic diagram illustrating an exemplary wearing of an earphone according to some embodiments of the present disclosure.

Exemplarily, with reference to FIG. 3A, in the wearing state, an end FE (also referred to as a free end) of the sound generation component 11 may extend into the concha cavity. Optionally, the sound generation component 11 and the suspension structure 12 may be configured to clamp an ear region from the front and rear sides of the ear region corresponding to the concha cavity, thereby increasing the resistance preventing the earphone 10 from falling off the ear, and improving the stability of the earphone 10 in the wearing state. For example, the end FE of the sound generation component may be pressed in the concha cavity in the thickness direction X. As another example, the end FE may abut against the concha cavity (e.g., abuts against an inner wall of the concha cavity facing the end FE) in the long axis direction Y and/or the short axis direction Z. It should be noted that the end FE of the sound generation component 11 refers to an end of the sound generation component 11 opposite to a fixed end connected to the suspension structure 12, which is also referred to as the free end. The sound generation component 11 may be a regular or irregular structure. To further illustrate the end FE of the sound generation component 11, an exemplary description is performed as follows. For example, when the sound generation component 11 is a cuboid structure, an end wall of the sound generation component 11 may be a plane. At this time, the end FE of the sound generation component 11 may be an end sidewall disposed opposite to the fixed end connected to the suspension structure 12. As another example, when the sound generation component 11 is a sphere, an ellipsoid, or an irregular structural body, the end FE of the sound generation component 11 may refer to a specific region away from the fixed end obtained by cutting the sound generation component 11 along a Y-Z plane (the plane formed by the short axis direction Z and the thickness direction X). A ratio of a size of the specific region along the long axis direction Y to a size of the sound generation component along the long axis direction Y may be 0.05 to 0.2.

By extending the at least a portion of the sound generation component 11 into the concha cavity, a listening volume at a listening position (e.g., the opening of the ear canal), especially the listening volume of a mid-low frequency, may be improved while still maintaining a better canceling effect of the far-field sound leakage. For illustrative purposes only, when the whole or a portion of the structure of the sound generation component 11 extends into the concha cavity 102, the sound generation component 11 and the concha cavity 102 may form a structure similar to a cavity (hereinafter referred to as a cavity-like structure). In some embodiments of the present disclosure, the cavity-like structure may be understood as a semi-enclosed structure formed by the sidewall of the sound generation component 11 and the structure of the concha cavity 102. The semi-enclosed structure may make the listening position (e.g., the opening of the ear canal) not completely airtight and isolated from the external environment, instead, a leakage structure (e.g., an opening, a gap, a pipeline, etc.) acoustically communicating with the external environment may be provided. When the user wears the earphone 10, one or more sound guiding holes may be disposed on a side of the housing of the sound generation component 11 near or facing the ear canal of the user. On the other sidewalls of the housing of the sound generation component 11 (e.g., the sidewall away from or departing from the user), one or more pressure relief holes may be disposed. The one or more sound guiding holes may be acoustically coupled with the front cavity of the earphone 10, while the one or more pressure relief holes may be acoustically coupled with the rear cavity of the earphone 10. Taking the sound generation component 11 including one sound guiding hole and one pressure relief hole as an example, the sound output from the sound guiding hole and the sound output from the pressure relief hole may be approximately regarded as from two sound sources, and the sounds from the two sound sources may have opposite sound phases. The sound generation component 11 and the corresponding inner wall of the concha cavity 102 may form a cavity-like structure. The sound source corresponding to the sound guiding hole may be disposed within the cavity-like structure, and the sound source corresponding to the pressure relief hole may be disposed outside the cavity-like structure, thereby forming an acoustic model as shown in FIG. 4A.

Figure 3B:
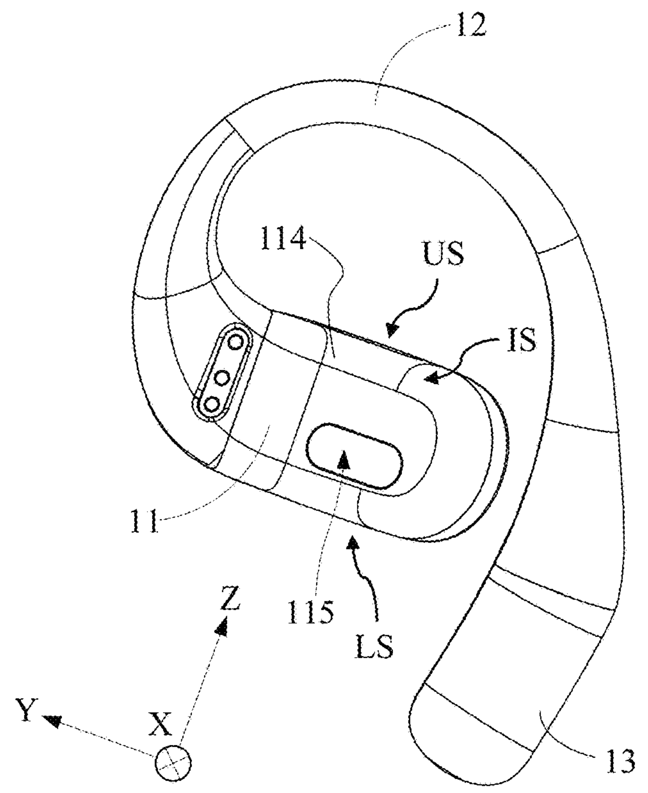
FIG. 3B is a schematic structural diagram illustrating an earphone in a non-wearing state according to some embodiments of the present disclosure.

Referring to FIGS. 3A and 3B, an ear hook is illustrated herein as an example of the suspension structure 12. In some embodiments, the ear hook may include a first portion 121 and a second portion 122 sequentially connected. The first portion 121 may be hung between the posteromedial side of the user's ear and the head, and the second portion 122 may extend toward an anterolateral side of the ear (the side of the ear departs from the head along the coronal axis) and connect the sound generation component, thereby securing the sound generation component near the ear canal of the user without blocking the opening of the ear canal. In some embodiments, the sound guiding hole may be opened on the sidewall of the housing facing the auricle of the ear, so as to transmit the sound generated by the transducer out of the housing toward the opening of the ear canal of the user.

In some embodiments, the sound generation component 11 may include a transducer and a housing 114 for accommodating the transducer. The housing 114 may be coupled to an ear hook 12. The transducer may be configured to convert an electrical signal into a corresponding mechanical vibration to generate the sound. In some embodiments, when divided by frequency, a type of transducer may include a low frequency (e.g., 30 Hz-150 Hz) speaker, a medium and low frequency (e.g., 150 Hz-500 Hz) speaker, a medium and high frequency (e.g., 500 Hz-5 kHz) speaker, a high frequency (e.g., 5 kHz-16 kHz) speaker, or a full range (e.g., 30 Hz-16 kHz) speaker, or any combination thereof. The low frequency, high frequency, etc. mentioned here may only represent an approximate range of the frequency, and in different application scenarios, there may be different division manners. For example, a frequency-dividing point may be determined, the low frequency may represent a frequency range below the frequency-dividing point, and the high frequency may represent a frequency range above the frequency-dividing point. The frequency-dividing point may be any value within an audible range of the human ear, e.g., 500 Hz, 600 Hz, 700 Hz, 800 Hz, 1000 Hz, etc. In some embodiments, a sound guiding hole 115 may be provided on a side of the housing facing the auricle, and the sound guiding hole 115 may be configured to conduct the sound generated by the transducer out of the housing 114 and then towards the ear canal, so that the sound can be heard by the user. In some embodiments, the transducer (e.g., the diaphragm) may separate the housing 114 to form the front cavity and the rear cavity of the earphone, and the sound guiding hole 115 may be connected to the front cavity and conduct sound generated by the front cavity out of the housing 114 and then transmit it to the ear canal. In some embodiments, a portion of the sound exported through the sound guiding hole 115 may be transmitted to the ear canal so that the user hears the sound, and another portion of the sound, along with the sound reflected by the ear canal, may be transmitted through a gap between the sound generation component 11 and the ear (e.g., a portion of the concha cavity not covered by the sound generation component 11) to the earphone 10 and to an exterior of the ear, thereby creating a first sound leakage in the far field. At the same time, the housing 114 may be generally provided with one or more pressure relief holes 113 on other sides of the housing 114 (e.g., the side away from or departing from the ear canal of the user). The pressure relief hole 113 may be farther away from the ear canal compared to the sound guiding hole 115, and the sound spread out of the pressure relief hole 113 may generally form a second sound leakage in the far field. An intensity of the first sound leakage may be equal to an intensity of the second sound leakage, and a phase of the first sound leakage may (approximately) inverse with a phase of the second sound leakage, so that the first sound leakage and the second sound leakage may cancel each other in the far field, which helps to reduce the sound leakage of the earphone 10 in the far field.

As shown in FIG. 3B, in some embodiments, the inner side IS of the housing 114 may be provided with a sound guiding hole 115 communicating the front cavity to conduct the sound generated by the front cavity out of the housing 114 and then toward the ear canal so that the user can hear the sound. One or more pressure relief holes 113 may be provided on the other sides of the housing 114 (e.g., an upper side US or a lower side LS, etc.). The one or more pressure relief holes 113 may communicate with the rear cavity for conducting the sound generated by the rear cavity out of the housing 114 and then interfere and cancel with the sound conducted from the sound guiding hole 115 in the far field. In some embodiments, the pressure relief hole 113 may be farther away from the ear canal compared to the sound guiding hole 115 to attenuate the cancellation between the sound exported through the pressure relief hole 113 and the sound exported through the sound guiding hole 115 at the listening position.

Figure 4:
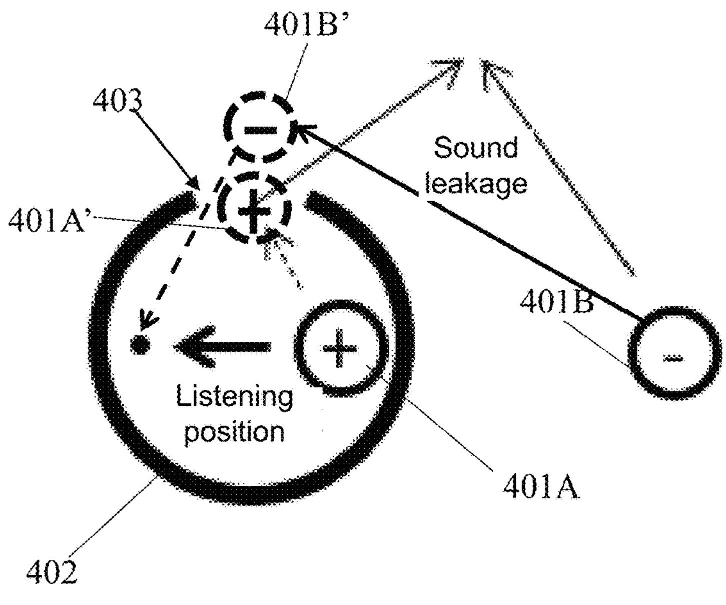
FIG. 4 is a schematic diagram illustrating an acoustic model formed by an earphone according to some embodiments of the present disclosure.

By extending the at least a portion of the sound generation component 11 into the concha cavity, the listening volume of the sound at the listening position (such as the opening of the ear canal) may be improved, especially for the listening volume at the middle and low frequency. At the same time, a better far-field sound leakage cancellation effect may be maintained. Merely by way of example, when the whole or a portion of the structure of the sound generation component 11 extends into the concha cavity 102, the sound generation component 11 and the concha cavity 102 may form a structure similar to a cavity (hereinafter referred to as a cavity-like structure). In some embodiments of the present disclosure, the cavity-like structure may be understood as a semi-enclosed structure formed by the sidewall of the sound generation component 11 and the structure of the concha cavity 102. The semi-enclosed structure may make the listening position (e.g., at the opening of the ear canal) not completely airtight and isolated from the external environment, instead, a leakage structure (e.g., an opening, a gap, a pipeline, etc.) acoustically communicating with the external environment may be provided. When the user wears the earphone 10, one or more sound guiding holes may be disposed on a side of the housing of the sound generation component 11 near or facing the ear canal of the user. On the other sidewalls of the housing of the sound generation component 11 (e.g., the sidewall away from or departing from the user), one or more pressure relief holes may be disposed. The one or more sound guiding holes may be acoustically coupled with the front cavity of the earphone 10, while the one or more pressure relief holes may be acoustically coupled with the rear cavity of the earphone 10. Taking the sound generation component 11 including one sound guiding hole and one pressure relief hole as an example, the sound output from the sound guiding hole and the sound output from the pressure relief hole may be approximately regarded as from two sound sources, and the sounds from the two sound sources may have opposite sound phases. The sound generation component 11 and the corresponding inner wall of the concha cavity 102 may form a cavity-like structure. The sound source corresponding to the sound guiding hole may be disposed within the cavity-like structure, and the sound source corresponding to the pressure relief hole may be disposed outside the cavity-like structure, thereby forming an acoustic model as shown in FIG. 4. As shown in FIG. 4, the cavity-like structure 402 may contain a listening position and at least one sound source 401A. The "contain" herein may mean that at least one of the listening position and the sound source 401A is inside the cavity-like structure 402, or at least one of the listening position and the sound source 401A is at an interior edge of the cavity-like structure 402. The listening position may be equivalent to the entrance of the ear canal or inside the ear canal of the ear, or the listening position may be an acoustic reference point of the ear, such as an ear reference point (ERP), an ear-drum reference point (DRP), etc., or the listening position may further be an entrance structure oriented to a listener, etc. A sound source 401B may be disposed outside of the cavity-like structure 402, and the sound sources 401A and 401B with opposite phases may radiate sounds into the surrounding space and undergo an interference cancellation of the sound waves, so as to realize the effect of sound leakage cancellation. Specifically, as the sound source 401A is wrapped by the cavity-like structure 402, most of the sound radiated therefrom may reach the listening position by direct transmission or reflection. Relatively, in a case without the cavity-like structure 402, most of the sound radiated from the sound source 401A may not reach the listening position. Therefore, by disposing the cavity-like structure, the sound volume reaching the listening position may be significantly improved. At the same time, only a smaller portion of the sound of an opposite phase radiated by the inverse sound source 401B outside of the cavity-like structure 402 may enter the cavity-like structure 402 through a leakage structure 403 of the cavity-like structure 402. This is equivalent to generating a secondary sound source 401B' at the leakage structure 403, whose intensity is significantly smaller than the sound source 401B and also significantly smaller than the sound source 401A. The sound generated by the secondary sound source 401B' may have a weak opposite phase and cancellation effect on the sound source 401A in the cavity, so as to significantly increase the listening volume at the listening position. For the sound leakage, the sound source 401A radiating the sound to the outside world through the leakage structure 403 of the cavity may be equivalent to generating a secondary sound source 401A' at the leakage structure 403. As almost all sound radiated by the sound source 401A is output from the leakage structure 403, and a size of the cavity-like structure 402 is much smaller than a spatial size for evaluating the sound leakage (by at least one order of magnitude), an intensity of the secondary sound source 401A' may be considered to be comparable to the strength of the sound source 401A, and a considerable sound leakage reduction effect may still be maintained.

In specific application scenarios, by extending the whole or a portion of the sound generation component 11 into the concha cavity, a cavity-like structure in acoustic communication with the outside world may be formed between the sound generation component 11 and a contour of the concha cavity. Furthermore, by disposing the sound guiding hole 115 on a side of the housing of the sound generation component facing the opening of the ear canal of the user and near the edge of the concha cavity, the acoustic model shown in FIG. 4 may be constructed, which enables the user to hear a greater listening volume. In other words, by specially designing the structure of the sound generation component as well as a wearing mode, etc., the sound generation component 11 may be made to have a superior sound output efficiency. The superior sound output efficiency referred to herein may be understood as the fact that, even if a smaller input signal is provided to the sound generation component 11 (e.g., a smaller input voltage or input power is provided to the transducer of the sound generation component 11), the sound generation component may still provide a sufficient volume to the user, i.e., a sound pressure exceeding a specific threshold may be generated in the ear canal of the user. For more detailed descriptions of the sound output efficiency, please refer to the following contents.

As mentioned above, the sound wave generated by the transducer may be transmitted through the at least one sound guiding hole to enter the external ear canal. The transducer refers to a component that receives an electrical signal and converts the electrical signal into the sound signal for output. In some embodiments, the transducer may include a diaphragm, a voice coil, and a magnetic circuit component. One end of the voice coil may be fixedly connected to the diaphragm, and the other end may extend into a magnetic gap formed by the magnetic circuit component. By supplying current to the voice coil, the voice coil may be made to vibrate in the magnetic gap, which drives the diaphragm to vibrate to generate the sound wave.

Figure 19:
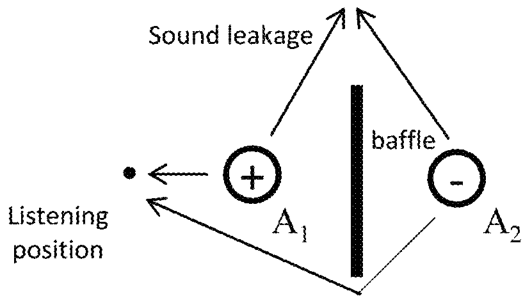
FIG. 19 is a schematic diagram illustrating an acoustic model of an earphone formation according to some other embodiments of the present disclosure.

Compared to a non-open earphone 10 (e.g., an in-ear earphone, an over-ear earphone, etc.), an ambient sound may be more likely to be transmitted into the ear canal of the user, which generates an impact on the listening performance of the earphone 10. In this situation, the earphone 10 may need to provide a higher sound volume to ensure a better listening effect. With the special design of the structure of the sound generation component 11 and the wearing mode, etc., described elsewhere in the present disclosure (e.g., forming an acoustic model as shown in FIG. 4 or FIG. 19), a sufficient sound pressure in the ear canal may be ensured even when the input power (or input voltage) of the transducer is small.

For the convenience of description, the listening position being located in the ear canal is taken as an example for illustration. It should be noted that in other embodiments, the ear acoustic reference point like ERP and DRP may also be the entrance structure directed to the listener, and the sound pressure at the above positions may increase or decrease accordingly.

Figure 5A:
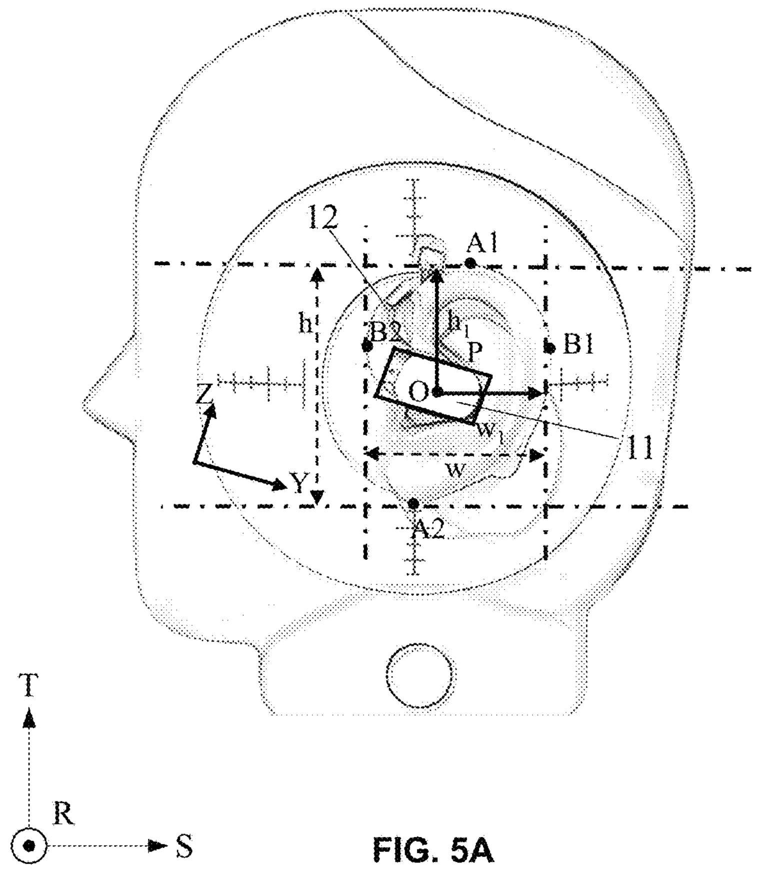
FIG. 5A is a schematic diagram illustrating an exemplary wearing of an earphone according to some embodiments of the present disclosure.
Figure 5B:
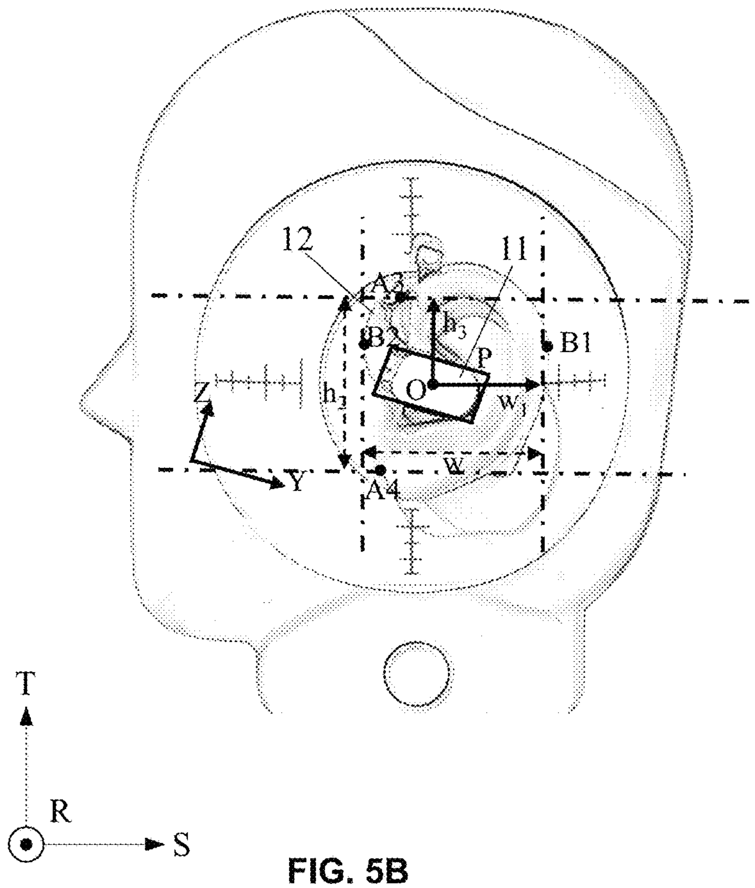
FIG. 5B is a schematic diagram illustrating an exemplary wearing of an earphone according to some embodiments of the present disclosure.

Combined with FIGS. 3A and 5A, in some embodiments, when a user wears the earphone 10, the sound generation component 11 may have a first projection on a sagittal plane (i.e., a plane formed by the T-axis and the S-axis in FIG. 5A) along a coronal axis direction R, and a shape of the sound generation component 11 may be a regular or irregular 3D shape. Correspondingly, the first projection of the sound generation component 11 on the sagittal plane may be a regular or irregular shape, e.g., when the shape of the sound generation component 11 is a cuboid, a cuboid-like, or a cylinder, the first projection of the sound generation component 11 on the sagittal plane may be a rectangle or a quasi-rectangle (e.g., a runway shape). Considering that the first projection of the sound generation component 11 on the sagittal plane may be an irregular shape, for convenience in describing the first projection, a rectangular region shown in a solid box P may be delineated around the projection (i.e., the first projection) of the sound generation component 11 shown in FIGS. 5A and 5B, and the centroid O of the rectangular region shown in the solid box P may be approximately considered as a centroid of the first projection. It should be noted that the above description of the first projection and the centroid of the first projection is only an example, and the shape of the first projection is related to the shape of the sound generation component 11 or a wearing situation relative to the ear. The auricle may have a second projection on the sagittal plane along the coronal axis R direction. To allow at least a portion of the structure of the sound generation component 11 to extend into the concha cavity or to cover the antihelix region when the earphone 10 is in a wearing state, in some embodiments, a ratio of a distance h1 between the centroid O of the first projection and a highest point of the second projection in the vertical axis direction (e.g., the T-axis direction shown in FIG. 5A) to a height h of the second projection in the vertical axis direction may be between 0.25 and 0.6. A ratio of a distance w1 (also referred to as a second distance) between the centroid O of the first projection and an end point of the second projection in the sagittal axis direction (e.g., the S-axis direction shown in FIG. 5A) to a width w of the second projection in the sagittal axis direction is between 0.4 and 0.7. In some embodiments, the sound generation component 11 and the suspension structure 12 may be two separate structures or an integrated structure. To more clearly illustrate the first projection region of the sound generation component, a thickness direction X, a long axis direction Y, and a short axis direction Z may be introduced herein according to the 3D structure of the sound generation component 11. The long axis direction Y may be perpendicular to the short axis direction Z. The thickness direction X may be perpendicular to a plane formed by the long axis direction Y and the short axis direction Z. For example, a confirmation process of the solid line box P is as follows: two points of the sound generation component 11 that are farthest apart in the long axis direction Y may be determined, and a first line segment and a second line segment parallel to the short axis direction Z may be made passing the two points, respectively. Determine two points of the sound generation component 11 that are farthest apart in the short axis direction Z, a third line segment and a fourth line segment parallel to the long axis direction Y may be made passing the two points, respectively. Through a region formed by each of the above line segments, a solid line rectangular box P shown in FIGS. 5A and 5B may be obtained.

The highest point of the second projection may be understood as the point that has the greatest distance in the vertical axis direction relative to a projection of a point on the neck of the user on the sagittal plane among all the projection points thereof, i.e., the projection of the highest point of the auricle (e.g., the point A1 in FIG. 5A) on the sagittal plane may be the highest point of the second projection. The lowest point of the second projection may be understood as the point that has the smallest distance in the vertical axis direction relative to a projection of a point on the neck of the user on the sagittal plane among all the projection points thereof, i.e., the projection of the lowest point of the auricle (e.g., the point A2 in FIG. 5A) on the sagittal plane may be the lowest point of the second projection. The height of the second projection in the vertical axis direction may be a difference between the point that has the greatest and the smallest distance in the vertical axis direction relative to a projection of a point on the neck of the user on the sagittal plane among all the projection points of the second projection (the height h shown in FIG. 5A), i.e., the distance between the point A1 and the point A2 in the vertical axis direction T. The end point of the second projection may be understood as the point with the greatest distance in the sagittal axis direction relative to the projection of the tip of a user's nose on the sagittal plane among all the projection points of the second projection, i.e., the projection of the end point of the auricle (e.g., the point B1 illustrated in FIG. 5A) on the sagittal plane may be the end point of the second projection. A front end point of the second projection may be understood as the point that has the smallest distance among all the projection points of the second projection relative to the projection of the tip of the nose of the user on the sagittal plane in the sagittal axis direction, i.e., the projection of the front end point of the auricle (e.g., the point B2 shown in FIG. 5A) may be the front end point of the second projection. A width of the second projection on the sagittal plane direction may be a difference between the point with the greatest and the smallest distances relative to the projection of the tip of the nose on the sagittal plane in the sagittal plane axis direction (the width w shown in FIG. 5A), i.e., the distance between the point B1 and the point B2 in the sagittal axis S direction. It should be noted that the above description about the projections of the sound generation component 11 or the structures like the auricle on the sagittal plane all refer to the projections in the coronal axis R direction on the sagittal plane, which is not emphasized in the following descriptions.

In some embodiments, when the ratio of the distance h1 between the centroid O of the first projection and the highest point of the second projection in the vertical axis to the height h of the second projection in the vertical axis direction is in a range of 0.25 to 0.6, the ratio of the distance w1 between the centroid O of the first projection and the second projection end point in the sagittal axis direction to the width w of the second projection in the sagittal axis direction is in the range of 0.4 to 0.7, a portion or the whole of the sound generation component 11 may substantially cover the antihelix region of the user (e.g., located in the triangle fossa, the upper crus of helix, the lower crus of helix, or the antihelix, as the position of the sound generation component 11C relative to the ear shown in FIG. 2), or the portion or the whole of the sound generation component 11 may extend into the concha cavity (e.g., the position of the sound generation component 11B relative to the ear shown in FIG. 2). In some embodiments, to make the whole or a portion of the structure of the sound generation component 11 cover the antihelix region of the user (e.g., a location in the triangular fossa, the upper crus of helix, the lower crus of helix, or the antihelix), e.g., the position of the sound generation component 11C relative to the ear as shown in FIG. 2, the ratio of the distance h1 between the centroid O of the first projection and the highest point of the second projection in the vertical axis direction to the height h of the second projection in the vertical axis direction may be between 0.25 and 0.4; and the ratio of the distance w1 between the centroid O of the first projection and the end point of the second projection in the sagittal axis direction to the width w of the second projection may be between 0.4 and 0.6. When the whole or a portion of the structure of the sound generation component 11 covers the antihelix region of the user, the housing of the sound generation component 11 may act as a baffle to increase the sound path difference between the sound guiding hole and the pressure relief hole relative to the opening of the ear canal to increase the sound intensity at the opening of the ear canal. Further, in the wearing state, the side wall of the sound generation component 11 may abut against the antihelix region, and a concave-convex structure of the antihelix region may also act as a baffle, which increases the sound path of the sound transmitted from the pressure relief hole to the opening of the ear canal, thereby increasing the sound path difference from the sound guiding hole and the pressure relief hole to the opening of the ear canal. In addition, when the whole or the portion of the sound generation component 11 covers the antihelix region of the user, the sound generation component 11 may not extend into the opening of the ear canal of the user, so as to ensure that the opening of the ear canal is kept sufficiently open so that the user can obtain sound information in the external environment, while improving the wearing comfort of the user. For specific contents regarding the whole or the portion of the structure of the sound generation component 11 substantially covering the antihelix region of the user, please refer to elsewhere in the present disclosure.

In some embodiments, to make the whole or the portion of the structure of the sound generation component 11 extend into the concha cavity, for example, the position of the sound generation component 11B relative to the ear shown in FIG. 2, the ratio of the distance h1 between the centroid O of the first projection and the highest point of the second projection in the vertical axis direction to the height h of the second projection in the vertical axis direction may be between 0.35 and 0.6, and the ratio of the distance w1 between the centroid O of the first projection and the end point of the second projection in the sagittal axis direction to the width w of the second projection in the sagittal axis direction may be between 0.4 and 0.65. By controlling the ratio of the distance h1 between the centroid O of the first projection and the highest point of the second projection in the vertical axis direction when worn by a user to the height h of the second projection in the vertical axis direction to be between 0.35 to 0.6, and controlling the ratio of the distance between the centroid of the first projection and the end point of the second projection in the sagittal axis direction to the width of the second projection in the sagittal axis direction to be between 0.4 and 0.65, at least a portion of the sound generation component 11 of the earphone provided in the embodiments of the present disclosure may extend into the concha cavity and form an acoustic model shown in FIG. 4 with the concha cavity of the user, so as to increase the sound volume at the listening position (e.g., at the opening of the ear canal), especially the listening position at low and middle frequencies, while maintaining a better far-field sound leakage canceling effect. Here, when a portion or the whole of the sound generation component 11 extends into the concha cavity, the sound guiding hole may be closer to the opening of the ear canal, thereby further increasing the listening volume at the opening of the ear canal. In addition, the concha cavity may play a certain supporting and limiting role for the sound generation component 11, thereby improving the stability of the earphone in the wearing state.

It should also be noted that the area of the first projection of the sound generation component 11 on the sagittal plane may be generally much smaller than the area of the projection of the auricle on the sagittal plane, so as to ensure that the earphone 10 does not block the opening of the ear canal when the user wears the earphone 10, and also to reduce a load of the user while wearing the earphone 10, which is easy for the user to carry daily. On this premise, in the wearing state, when the ratio of the distance h1 between the centroid O of the projection (the first projection) of the sound generation component 11 on the sagittal plane and the projection (the highest point of the second projection) of the highest point A1 of the auricle on the sagittal plane in the vertical axis direction to the height h of the second projection in the vertical axis direction is too small or too great, a portion of the structure of the sound generation component 11 may be located above the top of the auricle or at the earlobe of the user, which is impossible to use the auricle to sufficiently support and limit the sound generation component 11, and there may be a problem that the wearing is unstable and easy to fall off. On the other hand, it may further lead to a great distance between the sound guiding hole disposed on the sound generation component 11 and the opening of the ear canal, thereby affecting the listening volume at the opening of the ear canal of the user. To ensure that the earphone does not block the opening of the ear canal of the user while ensuring that the user wears the earphone stably and comfortably as well as having a better listening effect, in some embodiments, the ratio of the distance h1 between the centroid O of the first projection and the highest point of the second projection in the vertical axis direction to the height h of the second projection in the vertical axis direction may be controlled between 0.35 and 0.6. As a result, when the whole or the portion of the structure of the sound generation component extends into the concha cavity, an action force of the concha cavity on the sound generation component 11 may have a certain support and limit on the sound generation component 11, thereby improving stability and comfort of wearing the sound generation component 11. At the same time, the sound generation component 11 may also form the acoustic model with the concha cavity as shown in FIG. 4, which ensures the listening volume of the user at the listening position (e.g., the opening of the ear canal), and reduces the volume of the sound leakage in the far field. In some embodiments, the ratio of the distance h1 between the centroid O of the first projection and the highest point of the second projection in the vertical axis direction to the height h of the second projection in the vertical axis direction may be between 0.35 and 0.55. In some embodiments, the ratio of the distance h1 between the centroid O of the first projection and the highest point of the second projection in the vertical axis direction to the height h of the second projection in the vertical axis direction may be between 0.4 and 0.5, so as to improve the wearing stability of the earphone 10 and improve the acoustic output effect.

Similarly, when the ratio of the distance w1 between the centroid o of the first projection and the end point of the second projection in the sagittal axis direction to the width w of the second projection in the sagittal axis direction is too great or too small, the portion or the whole structure of the sound generation component 11 may be located in a facial region on the front side of the ear, or extend out of the outer contour of the ear, which leads to the problem that the sound generation component 11 is unable to construct the acoustic model shown in FIG. 4 with the concha cavity and an unstable wearing of the earphone 10. Based on this, for the earphone provided in the embodiments of the present disclosure, by controlling the ratio of the distance w1 between the centroid o of the first projection and the end point of the second projection in the sagittal axis direction to the width w of the second projection in the sagittal axis direction between 0.4 and 0.7, the wearing stability and comfort of the earphone may be improved while ensuring the acoustic output effect of the sound generation component. In some embodiments, the ratio of the distance w1 between the centroid o of the first projection and the end point of the second projection in the sagittal axis direction to the width w of the second projection in the sagittal axis direction may be between 0.45 and 0.68. In some embodiments, the ratio of the distance w1 between the centroid o of the first projection and the end point of the second projection in the sagittal axis direction to the width w of the second projection in the sagittal axis direction may be between 0.5 and 0.6 to improve the wearing stability and comfort of the earphone and the acoustic output effect.

As a specific example, the height h of the second projection in the vertical axis direction may be between 55 mm and 65 mm. In the wearing state, if the distance h1 between the centroid O of the first projection and the highest point of the second projection on the sagittal plane in the vertical axis direction is less than 15 mm or greater than 50 mm, the sound generation component 11 may be located far away from the concha cavity. As a result, the acoustic model shown in FIG. 4 may not be constructed and the wearing of the earphone may be unstable. To ensure the acoustic output effect of the sound generation component and the wearing stability of the earphone, the distance h1 between the centroid O of the first projection and the highest point of the second projection in the vertical axis direction may be controlled between 15 mm and 50 mm. Similarly, in some embodiments, the width of the second projection of the second projection in the sagittal axis direction may be 40 mm-55 mm, and when the distance between the projection of the centroid O of the first projection on the sagittal plane and the end point of the second projection in the sagittal axis direction is greater than 45 mm or less than 15 mm, the sound generation component 11 may be too far forward or too far back relative to the user's ear, which may cause the problem that the sound generation component 11 is unable to construct the acoustic model shown in FIG. 4, and at the same time cause the unstable wearing of the earphone 10. To ensure the acoustic output effect of the sound generation component 11 and the wearing stability of the earphone, the distance between the centroid O of the first projection and the end point of the second projection in the sagittal axis direction may be between 15 mm and 45 mm.

Figure 6:
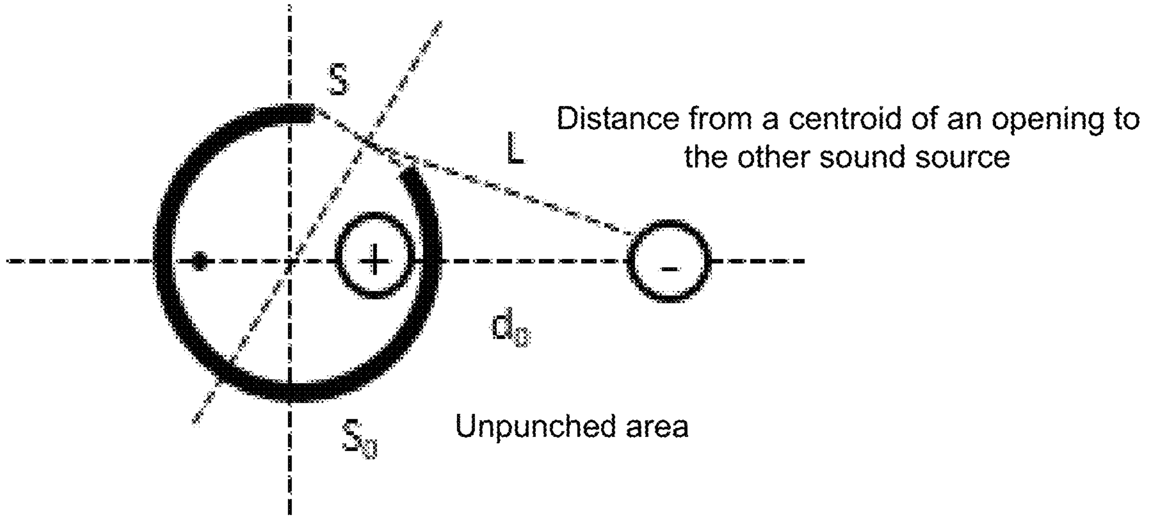
FIG. 6 is a schematic diagram illustrating a cavity-like structure according to some embodiments of the present disclosure.
Figure 7:
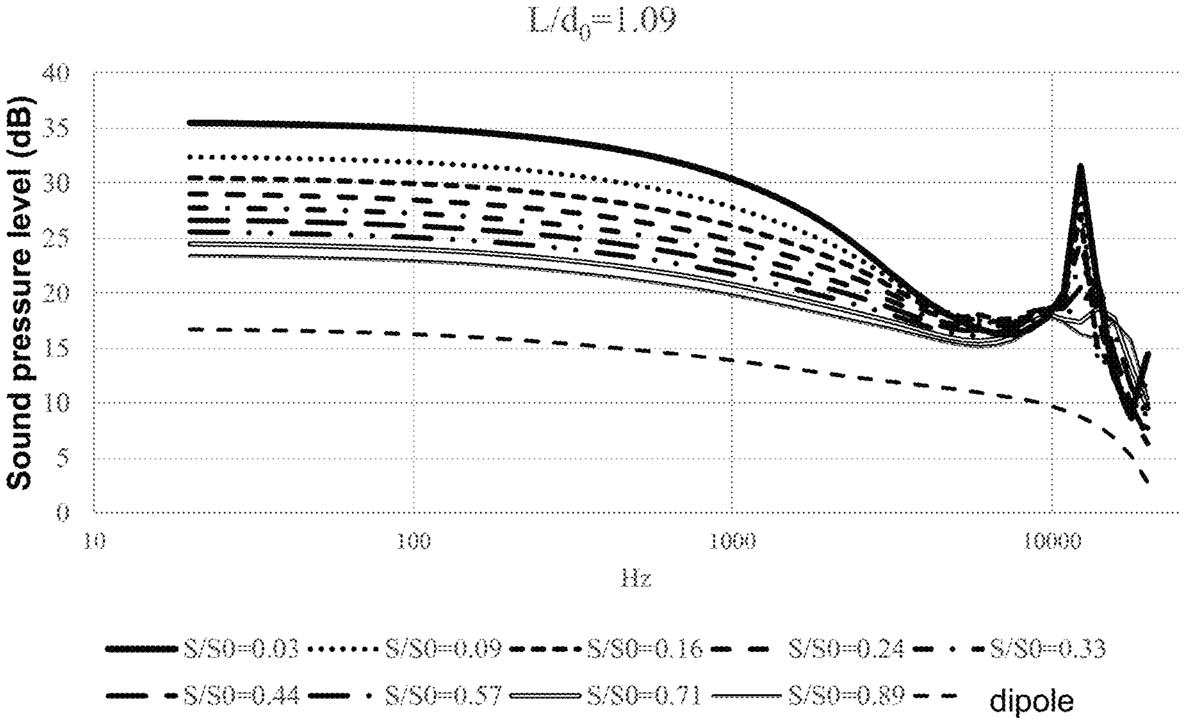
FIG. 7 is a graph illustrating listening indices of cavity-like structures with leakage structures of different sizes according to some embodiments of the present disclosure.

As described above, when the user wears the earphone 10, at least a portion of the sound generation component 11 may extend into the concha cavity of the user, forming the acoustic model shown in FIG. 4. An outer wall surface of the housing of the sound generation component 11 may usually be a flat or curved surface, and a contour of the concha cavity of the user may be a concave-convex structure, so that when a whole or portion of the sound generation component 11 extends into the concha cavity, as the sound generation component 11 is unable to tightly fit with the concha cavity, a gap that corresponds to the leakage structure 403 shown in FIG. 4 may be formed. FIG. 6 is a schematic diagram illustrating a cavity-like structure according to some embodiments of the present disclosure; and FIG. 7 is a graph illustrating listening indices of cavity-like structures with leakage structures of different sizes according to some embodiments of the present disclosure. As shown in FIG. 6, an area of an opening of a leakage structure on the cavity-like structure may be S, and an area of the cavity-like structure subject to a direct action of the included sound source (e.g., the "+" shown in FIG. 6) may be S. The term "direct action" here refers to that a direct acoustic action of the sound generated by the included sound source acts acoustically directly on the wall of the cavity-like structure without passing through the leakage structure. A spacing between the two sound sources may be d0, and a distance from a centroid of an opening of the leakage structure to the other sound source (e.g., the "−" shown in FIG. 6) may be L. As shown in FIG. 7, keeping L/d0=1.09 constant, the greater a relative opening S/S0, the smaller a listening index. This is because the greater the relative opening, the more sound components that the included sound source radiates directly outward, and the less sound reaching a listening position, causing a listening volume to decrease with an increase of the relative opening, which in turn leads a decrease of the listening index. It may be inferred that the greater the opening, the lower the listening volume at the listening position.

In some embodiments, considering that the relative position of the sound generation component 11 and an ear canal of a user (e.g., a concha cavity) may affect a size of a gap formed between the sound generation component 11 and the concha cavity. For example, when the end FE of the sound generation component 11 abuts against the concha cavity, the size of the gap may be relatively small, and when the end FE of the sound generation component 11 does not abut against the concha cavity, the size of the gap may be relatively great. The gap formed between the sound generation component 11 and the concha cavity may be referred to as the leakage structure in the acoustic model in FIG. 4. Therefore, the relative position between the sound generation component 11 and the ear canal (e.g., the concha cavity) of the user may affect a count of the leakage structures of the cavity-like structure formed by the sound generation component 11 and the concha cavity of the user as well as a size of an opening of the leakage structure. The size of the opening of the leakage structure may directly affect a listening sound quality. Specifically, the greater the size of the opening of the leakage structure, the more sound components the sound generation component 11 directly radiates outward, and the less sound reaches the listening position. To balance the listening volume and a sound leakage reduction effect of the sound generation component 11 and ensure an acoustic output quality of the sound generation component 11, the sound generation component 11 may be made to fit as closely as possible with the concha cavity of the user. Correspondingly, a ratio of the distance h1 between the centroid O of the first projection and a highest point of a second projection in a vertical axis direction to the height h of the second projection in the vertical axis direction may be in a range of 0.35-0.6, and at the same time, a ratio of the distance w1 between the centroid O of the first projection and the end point of the second projection in the sagittal axis direction to the width w of the second projection in the sagittal axis direction may be between 0.4 and 0.65. In some embodiments, to ensure the acoustic output quality of the sound generation component 11 while enhancing the wearing comfort of the earphone, the ratio of the distance h1 between the centroid O of the first projection and the highest point of the second projection in the vertical axis direction to the height h of the second projection in the vertical axis direction may also be between 0.35 and 0.55. The ratio of the distance w1 between the centroid O of the first projection and the end point of the second projection in the sagittal axis direction to the width w of the second projection in the sagittal axis direction may be between 0.45 and 0.68. In some embodiments, the ratio of the distance h1 between the centroid O of the first projection and the highest point of the second projection in the vertical axis direction to the height h of the second projection in the vertical axis direction may also be between 0.35 and 0.5. The ratio of the distance w1 between the centroid O of the first projection and the end point of the second projection in the sagittal axis direction to the width w of the second projection in the sagittal axis direction may be between 0.48 and 0.6, so as to improve the wearing stability of the earphone 10 and to make the size of the gap in the cavity-like structure more conducive to the improvement of the listening volume.

In some embodiments, a sound pressure in the ear canal described in the present disclosure may be measured in the following manner: using the simulator including a head and ears described above as a reference for wearing the acoustic device, and performing a test to obtain the sound pressure provided by the sound generation component toward the ear canal. For example, a device with a playback function (e.g., a cell phone, a digital audio player (DAP), etc.) may connect to the earphone 10 and control the earphone 10 to play a swept signal (e.g., a swept signal with a frequency range of 20 Hz-20,000 Hz). The playback device may generate the output signals corresponding to different sound volume levels. For example, the output signals of the playback device may include a plurality of sound volume levels, with each sound volume level corresponding to different input voltages or input currents of the transducer input signal. The earphone 10 may be controlled to play the swept signal using the output signal of each sound volume level, and the sound pressure generated and transmitted into the ear canal by the transducer input signal under different input voltages or input currents may be recorded. Exemplarily, the sound volume of the playback device may be divided into eight sound volume levels, and the sound volume levels corresponding to the sound volume from the maximum to the minimum may be the maximum level, minus one level, minus two level, minus three level, . . . , and minus seven level. It should be noted that, in some other embodiments, a range between the maximum sound volume and the minimum sound volume of the playback device may be divided into other levels, such as 3, 5, 20, etc. In some embodiments, the output signal of the playback device may be a sinusoidal signal.

The ear canal of the simulator including the head and the ear may be provided with a microphone inside, and the microphone may be connected to a sound input device (e.g., a computer sound card, an analog to digital converter (ADC), etc.). A processing device (e.g., a computer) may further receive a level signal converted by the microphone, and perform a recording or processing.

In some embodiments, the sound pressure in the ear canal may also be measured by performing the following operations. An acoustic test microphone may be disposed in the ear canal of the model, and the level signal converted by the microphone may be collected to replace the aforementioned simulator including the head and the ear to obtain the sound pressure in the ear canal.

The human ear has an auditory frequency range of approximately 20 Hz-20,000 Hz, but a hearing of the human is not sensitive to some frequency bands, such as a low frequency (e.g., below 300 Hz) or a high frequency (e.g., above 5000 Hz). In some embodiments, by specially designing a structure of the sound generation component 11, the wearing mode, etc., the sound generation component 11 may have a better sound output efficiency in a specific frequency range, i.e., with a certain input voltage or input power of the transducer input signal, the sound generation component 11 may provide the user with a sufficiently great volume of sound in a specific frequency range, so that the sound pressure exceeding a specific threshold may be generated in the ear canal of the user. For example, under a certain input voltage of the transducer, the sound pressure provided by the sound generation component 11 to the ear canal in a range of 300 Hz-5000 Hz may be provided to enable the earphone 10 to have a better listening effect. In some embodiments, to prioritize the listening effect in a more sensitive range of the human ear, under a certain input voltage of the transducer, the sound pressure provided by the sound generation component 11 to the ear canal may be increased in a range of 600 Hz-2000 Hz. In this way, the earphone 10 may have a better listening effect.

Figure 8:
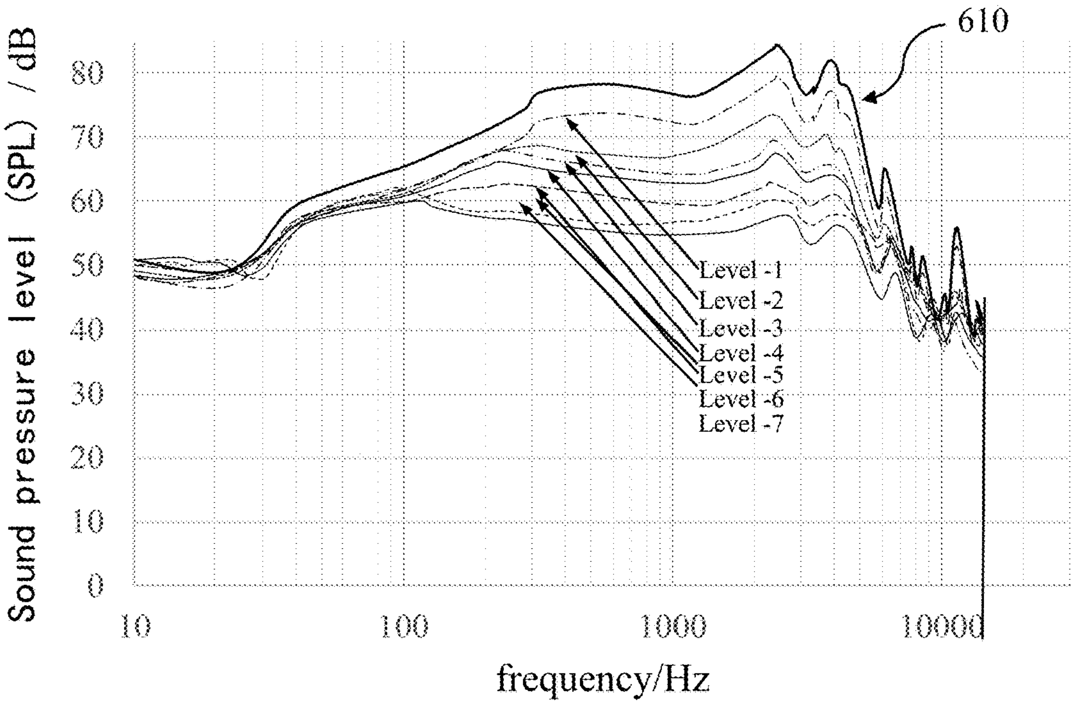
FIG. 8 is a graph illustrating sound pressure level curves in an ear canal in a wearing mode in which at least a portion of a sound generation component extends into a concha cavity according to some embodiments of the present disclosure.

FIG. 8 is a graph illustrating sound pressure level (SPL) curves in an ear canal in a wearing mode in which at least a portion of the sound generation component 11 extends into the concha cavity. A horizontal coordinate indicates a frequency in Hz and a vertical coordinate indicates a sound pressure in dB. A solid line 610 in FIG. 8 indicates the sound pressure level curve of the earphone 10 in the ear canal when a playback device outputs an output signal with the maximum sound volume level, and the other line segments may indicate the sound pressure level curves of the earphone 10 in the ear canal when the playback device is at smaller sound volume levels (minus one-minus seven levels).

Figure 9:
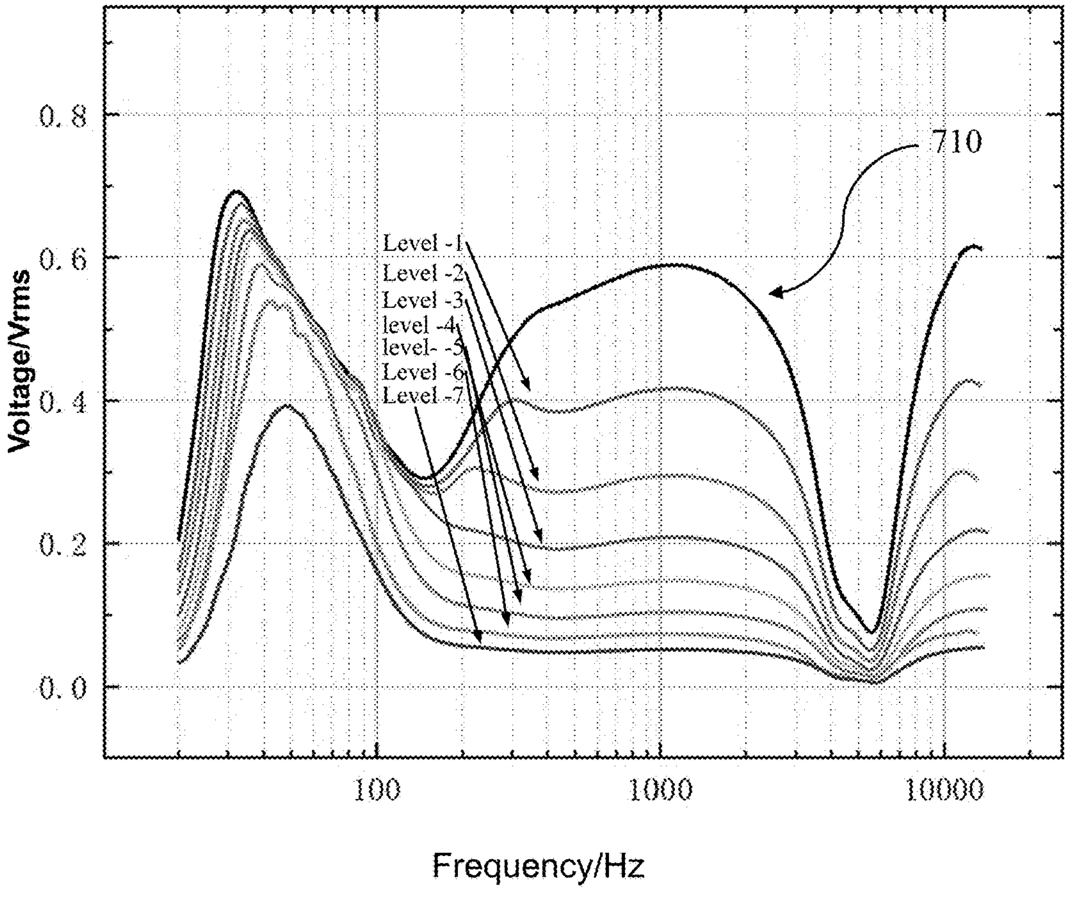
FIG. 9 is a graph illustrating input voltage-frequency curves corresponding to FIG. 8.

FIG. 9 is a graph illustrating input voltage-frequency curves corresponding to FIG. 8. A horizontal coordinate indicates the frequency in Hz, and a vertical coordinate indicates the input voltage of an input signal of a transducer in V. It should be noted that when the input signal of the transducer is a sinusoidal signal, the input voltage of the input signal may also be understood as an effective voltage value (Vrms) corresponding to the sinusoidal signal. A solid line 710 in FIG. 9 indicates the input voltage of the transducer of the earphone 10 at different frequencies when the playback device outputs an output signal of the maximum sound volume level, and the other solid lines indicate the input voltages of the transducer of the earphone 10 at different frequencies when the playback device outputs output signals of smaller sound volume levels (minus one level-minus seven level). For an easy understanding, the input voltage of the transducer may be obtained by testing the voltage at an end of a connection of the transducer (e.g., a connection between a voice coil and an external wire) when the transducer is playing a swept signal. For example, the wire may be drawn from a solder spot of the connection terminal of the transducer, and connected to a filter. Then the wire may connect a filter and a tester, and voltage data may be obtained through the processing device (e.g., a computer).

In some embodiments, the wire between the transducer and a battery or a driving circuit may be cut off and drawn out from a housing of the sound generation component 11, and the drawn wires may be connected to an output end of an acoustic tester. When a test is performed, the above input voltage of the input signal may be determined by disposing the input signal of the acoustic tester. Different input voltages may be disposed according to actual testing needs. In some embodiments, the acoustic tester may be the device that can selectively output sinusoidal waves corresponding to specific voltages or currents.

By adopting a design of making a portion of the sound generation component 11 extend into the concha cavity to form a cavity-like structure as shown in FIG. 4, more sound generated by the sound guiding hole 115 (i.e., the sound source 401A in FIG. 4) within the cavity-like body may be directed to the ear canal, and less sound generated by the sound source 401B outside the cavity-like body may enter the ear canal for phase cancellation, thereby enabling the sound generation component 11 to provide a greater sound pressure into the ear canal. In some embodiments, as shown in FIGS. 8 and 9, in a specific frequency range, when the input voltage of the transducer is no more than 0.6 V, the maximum sound pressure that the sound generation component 11 is capable of delivering into the ear canal may be not less than 75 dB.

Exemplarily, at a frequency of 1000 Hz, for example, as shown by the solid line 610 in FIG. 8, the maximum sound pressure provided by the sound generation component 11 into the ear canal at a frequency of 1000 Hz may be 79 dB, and combining FIG. 9, the input voltage of the transducer under a frequency of 1000 Hz may be 0.6 V. That is to say, at a frequency of 1000 Hz, by adopting the design of extending a portion of the sound generation component 11 into the concha cavity, when the transducer input voltage does not exceed 0.6 V, the maximum sound pressure the sound generation component 11 can provide into the ear canal may be not less than 75 dB.

In addition, combining FIGS. 8 and 9, at a frequency of 500 Hz, the maximum sound pressure provided by the sound generation component 11 into the ear canal may be 80 dB, and the transducer input voltage may be 0.58 V. That is to say, at a frequency of 500 Hz, by adopting the design of extending a portion of the sound generation component 11 into the concha cavity, when the input voltage of the transducer does not exceed 0.59V, the maximum sound pressure provided by the sound generation component 11 to the ear canal may be not less than 80 dB. Also based on FIGS. 8 and 9, at a frequency of 800 Hz, by adopting the design of extending a portion of the sound generation component 11 into the concha cavity, when the input voltage of the transducer does not exceed 0.58V, the maximum sound pressure provided by the sound generation component 11 to the ear canal may be not less than 79 dB. At a frequency of 2000 Hz, by adopting the design of extending a portion of the sound generation component 11 into the concha cavity, when the input voltage of the transducer does not exceed 0.55V, the maximum sound pressure provided by the sound generation component 11 to the ear canal may be not less than 83 dB.

Continuing to refer to FIGS. 8 and 9, in a frequency range of 300 Hz-4000 Hz, by adopting the design of extending a portion of the sound generation component 11 into the concha cavity, when the input voltage of the transducer does not exceed 0.6 V, the maximum sound pressure provided by the sound generation component 11 to the ear canal may be not less than 79 dB; in a frequency range of 700 Hz-1500 Hz, by adopting the design of extending a portion of the sound generation component 11 into the concha cavity, when the input voltage of the transducer does not exceed 0.6 V, the maximum sound pressure provided by the sound generation component 11 to the ear canal may be not less than 75 dB; in a range of 2500 Hz-4000 Hz, by adopting the design of extending a portion of the sound generation component 11 into the concha cavity, when the input voltage of the transducer does not exceed 0.55V, the maximum sound pressure provided by the sound generation component 11 to the ear canal may be not less than 75 dB.

Accordingly, in the wearing mode of extending at least a portion of the sound generation component 11 into the concha cavity, in a specific frequency range (e.g., 300 Hz-4000 Hz), and when the input voltage of the transducer is not larger than 0.6 V, the maximum sound pressure provided by the sound generation component 11 to the ear canal may be not less than 75 dB. In some embodiments, by optimizing volumes, masses, and sizes of the sound generation component 11 and the battery compartment 13, the sound output efficiency of the sound generation component 11 may be further improved such that when the input voltage of the transducer does not exceed 0.6 V, the maximum sound pressure provided by the sound generation component 11 to the ear canal may be not less than 78 dB. For more contents of the volumes, the masses, and the sizes of the sound generation component 11 and the battery compartment 13, please refer to FIGS. 14 and 15.

In some embodiments, to enable the sound generation component 11 to provide a greater sound pressure into the ear canal, the design of extending a portion of the sound generation component 11 into the concha cavity may be adopted. A ratio of the distance h1 between the centroid O of the first projection and the highest point A1 of the second projection in the vertical axis direction to the height h of the second projection in the vertical axis direction may be between 0.35 and 0.6. From another point of view, under the premise of ensuring that a sufficient sound pressure is provided to the ear canal, by controlling a position of the sound generation component 11 relative to the ear in the vertical axis direction, a dependence of the transducer on a high voltage, a high current, or a high power may be reduced. In such a situation, in a specific frequency range, when the input voltage of the transducer does not exceed 0.6 V, the maximum sound pressure provided by the sound generation component 11 to the ear canal may be not less than 75 dB.

In some embodiments, by controlling the position of the sound generation component 11 relative to the ear in the sagittal axis direction, for example, by controlling a ratio of the distance w1 between the centroid O of the first projection and the end point of the second projection in the sagittal direction to the width w of the second projection in the sagittal axis direction between 0.4 and 0.65, the sound pressure provided by the sound generation component 11 into the ear canal may be further improved. As an example only, by adopting the design of extending a portion of the sound generation component 11 into the concha cavity, and making the ratio of the distance w1 between the centroid O of the first projection and the end point of the second projection in the sagittal axis direction to the width w of the second projection in the sagittal axis direction between 0.4 and 0.65, when the input voltage of the transducer does not exceed 0.6 V, the maximum sound pressure provided by the sound generation component to the ear canal may be not less than 75 dB.

In some embodiments, depending on different power supply situations (e.g., different sound volume levels of the playback device, different models of the earphone 10, different specifications of the batteries, etc.), the input voltage of the transducer may not be greater than 0.4 V, and in a specific frequency range (such as 100 Hz-3000 Hz), by adopting the design of extending a portion of the sound generation component 11 into the concha cavity, the maximum sound pressure provided by the sound generation component 11 to the ear canal may be not less than 72 dB.

Referring to FIGS. 8 and 9, when the frequency is 400 Hz, when the sound volume level of the playback device is minus one level, the input voltage to the transducer is 0.39 V, and the maximum sound pressure supplied by the sound generation component 11 into the ear canal may be 76 dB. When the frequency is 1500 Hz, when the sound volume level of the playback device is minus one level, the input voltage to the transducer is 0.3 V, and the maximum sound pressure supplied by the sound generation component 11 into the ear canal may be 78 dB. When the frequency is in a range of 200 Hz-3000 Hz, the maximum input voltage of the transducer may not exceed 0.3V and the sound pressure provided by the sound generation component 11 to the ear canal may be not smaller than 74 dB. It may be seen that when the input voltage of the transducer is reduced, the sound generation component 11 may still provide a relatively great sound pressure to the ear canal, thereby ensuring a good listening effect of the earphone 10.

In some embodiments, depending on the different power supply situations, to ensure that the sound generation component 11 can provide a greater sound pressure to the ear canal and ensure a good listening effect, the design of extending a portion of the sound generation component 11 into the concha cavity may be adopted, and the ratio of the distance h1 between the centroid O of the first projection and the highest point of the second projection in the vertical axis direction to the height h of the second projection in the vertical axis direction may be between 0.4 and 0.5. At this point, in a specific frequency range, the sound generation component 11 may be able to provide a maximum sound pressure of not less than 72 dB into the ear canal when an input voltage of the transducer is not larger than 0.4 V.

Further, by controlling the ratio of the distance w1 between the centroid O of the first projection and the end point of the second projection in the sagittal axis direction to the width w of the second projection in the sagittal axis direction to be in a range of 0.48-0.6, in a specific frequency range, the maximum sound pressure that the sound generation component 11 is capable of providing into the ear canal may not be less than 72 dB when an input voltage of the transducer is not larger than 0.4 V.

Figure 10A:
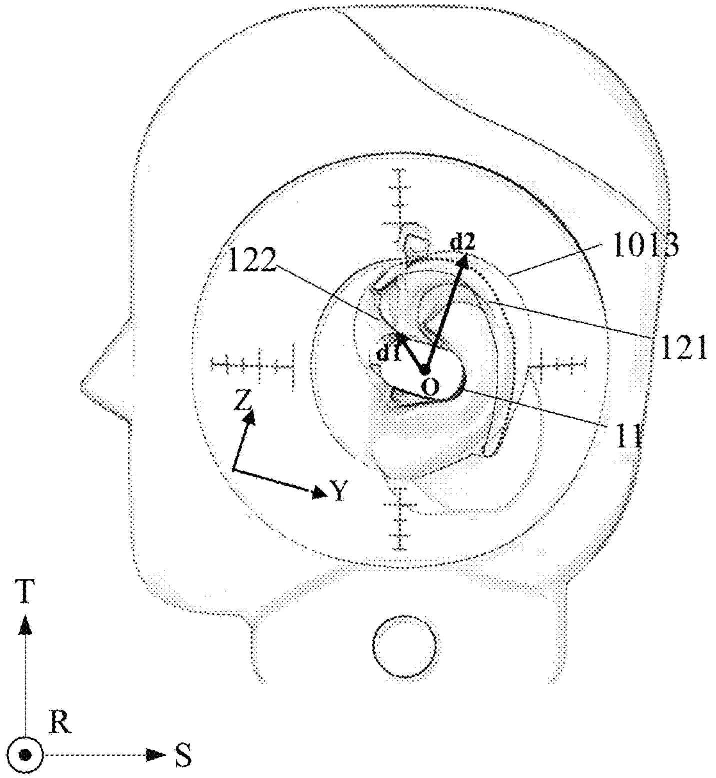
FIG. 10A is a schematic diagram illustrating an exemplary structure of an earphone provided by some embodiments of the present disclosure.
Figure 10B:
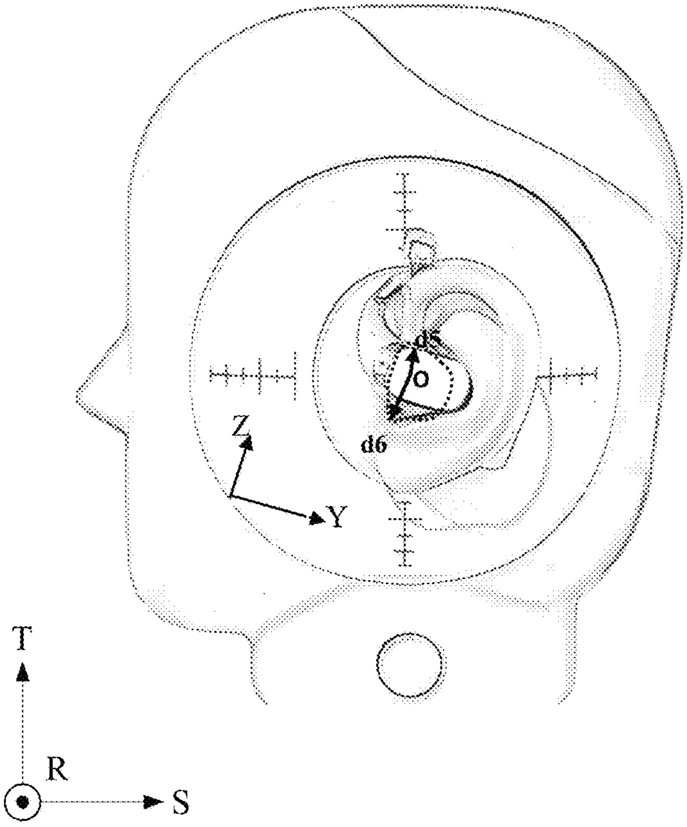
FIG. 10B is a schematic diagram illustrating a user wearing an earphone provided according to some embodiments of the present disclosure.

FIGS. 10A and 10B are schematic diagrams illustrating exemplary wearing of earphones according to some other embodiments of the present disclosure.

Combining FIGS. 3A and 10A, when a user wears the earphone 10 with the sound generation component 11 extending into the concha cavity, the centroid O of a first projection may be located in a region enclosed by a contour of a second projection. The contour of the second projection may be understood as projections of contours like a helix outer contour, an earlobe contour, a tragus contour, an intertragic notch, an apex of antitragus, a tragus notch, and other contours projected on the sagittal plane of a user. In some embodiments, a listening volume of the sound generation component, a sound leakage reduction effect, and wearing comfort and stability may be improved by adjusting a distance between the centroid O of a first projection and a contour of a second projection. For example, when the sound generation component 11 is located at the top of an auricle, at the earlobe, at a facial region on the front side of the auricle, or between an inner contour 1014 of the auricle and an outer edge of the concha cavity, specifically embodied as there is a too small distance between the centroid O of the first projection and a point in a region of the second projection and a too great distance relative to a point in another region, the sound generation component may be unable to form a cavity-like structure (the acoustic model illustrated in FIG. 4) with the concha cavity, which affects an acoustic output effect of the earphone 10. To ensure an acoustic output quality when the user wears the earphone 10, in some embodiments, the distance between the centroid O of the first projection and the contour of the second projection may be in a range of 10 mm-52 mm, that is, the distance between the centroid O of the first projection and any point of the contour of the second projection may be in the range of 10 mm-52 mm. In some embodiments, in order to further improve the wearing comfort of the earphone 10, as well as to optimize the cooperation between the sound generation component 11 and the concha cavity to form the cavity-like structure, the distance between the centroid O of the first projection and the contour of the second projection may be in a range of 12 mm-50.5 mm. In some embodiments, the distance between the centroid O of the first projection and the contour of the second projection may be in a range of 13.5 mm-50.5 mm. In some embodiments, by controlling the distance between the centroid O of the first projection and the contour of the second projection to be in a range of 23 mm-52 mm, a majority of the sound generation component 11 may be located near the ear canal of the user. In this way, at least a portion of the sound generation component may extend into the concha cavity of the user to form the acoustic model shown in FIG. 4. At this point, in a specific frequency range, when an input voltage of the transducer does not exceed 0.6 V, the sound generation component may be able to provide a maximum sound pressure of not less than 75 dB to the ear canal, thereby ensuring that the sound output by the sound generation component 11 can be transmitted to the user effectively and the sound generation component 11 may provide a greater sound pressure into the ear canal. For example, in some embodiments, a minimum distance d1 between the centroid O of the first projection and the contour of the second projection may be 20 mm, and a maximum distance d2 between the centroid O of the first projection and the contour of the second projection may be 48.5 mm. In such cases, in a specific frequency range, when an input voltage of the transducer does not exceed 0.4 V, the sound generation component may be able to provide a maximum sound pressure of not less than 72 dB to the ear canal, thereby improving the listening effect of the earphone 10.

Referring to FIG. 10B, in some embodiments, the projection of the sound generation component on the sagittal plane may have an overlapping portion with the projection of the concha cavity of the user (e.g., the dashed portion of FIG. 9) on the sagittal plane, i.e., when the user wears the earphone, a whole or a portion of the sound generation component may cover the concha cavity. When the earphone is in a wearing state, the centroid of the first projection (e.g., the point O in FIG. 10B) may be located within the region of the projection of the concha cavity of the user on the sagittal plane. The position of the centroid O of the first projection may be related to a size of the sound generation component, for example, when the size of the sound generation component 11 is too small in a long axis direction Y or a short axis direction Z, the size of the sound generation component 11 may be relatively small such that an area of a diaphragm provided therein may also be relatively small, resulting in a low efficiency of the diaphragm in pushing an air inside a housing of the sound generation component 11 to produce a sound, thereby affecting the acoustic output effect of the earphone. When the size of the sound generation component 11 in the long axis direction Y or the short axis direction Z is too great, the sound generation component 11 may exceed a range of the concha cavity, and fail to extend into the concha cavity to form the cavity-like structure, or a total size of a gap formed between the sound generation component 11 and the concha cavity may be great, thereby affecting a listening volume of the user wearing the earphone 10 at the opening of the ear canal and a sound leakage reduction effect in the far field. In some embodiments, to enable the earphone 10 to have a better acoustic output quality when the user wears the earphone 10, by adopting the design of extending a portion of the sound generation component 11 into the concha cavity, the distance between the centroid O of the first projection and the projection of an edge of the concha cavity of the user on the sagittal plane may be in a range of 4 mm-25 mm. At this time, in a specific frequency range, and when the input voltage of the transducer does not exceed 0.6 V, the maximum sound pressure provided by the sound generation component to the ear canal may be not less than 75 dB. In some embodiments, a distance between the centroid of the first projection on the sagittal plane of the user and the projection of the edge of the concha cavity of the user on the sagittal plane may be in a range of 6 mm-20 mm. In some embodiments, the distance between the centroid of the first projection on the sagittal plane of the user and the projection of the edge of the concha cavity of the user on the sagittal plane may be in a range of 10 mm-18 mm. At this time, in a specific frequency range, when the input voltage of the transducer does not exceed 0.4 V, the maximum sound pressure provided by the sound generation component to the ear canal may be not less than 72 dB, so as to ensure a good listening effect. For example, in some embodiments, a minimum distance d5 between the centroid of the first projection and the projection of the edge of the concha cavity of the user on the sagittal plane may be 5 mm, and a maximum distance d6 between the centroid of the first projection and the projection of the edge of the concha cavity of the user on the sagittal plane may be 24.5 mm. In some embodiments, by controlling the range of the distance between the centroid of the first projection and the projection of the edge of the concha cavity of the user on the sagittal plane in 4 mm-25 mm, at least a portion of the structure of the sound generation component 11 may cover the concha cavity to form the cavity-like acoustic model with the concha cavity. In this way, the sound output from the sound generation component may be transmitted to the user effectively, and at the same time, the stability of the wearing of the earphone 10 may be improved by an action of the concha cavity on the sound generation component 11.

In some embodiments, the sound generation component 11 may be a cuboid, a quasi-cuboid, a cylinder, an ellipsoid, or other regular or irregular 3D structures. When the sound generation component 11 extends into the concha cavity, as an overall contour of the concha cavity is an irregular structure similar to an arc, the sound generation component 11 may not completely cover or fit the contour of the concha cavity, thus several gaps may be formed. A general size of the gap may be approximately regarded as an opening S of a leakage structure in the cavity-like structure. A size of the portion of the sound generation component 11 fitting or overlapping the contour of the concha cavity may be approximately regarded as an unpunched area S0 in the cavity-like structure shown in FIG. 6. As shown in FIG. 7, the greater a relative opening S/S0, the smaller the listening index. This is because the greater the relative opening, the more sound components the included sound source radiates directly outward, and the less sound reaching a listening position, causing the listening volume to decrease with an increase of the relative opening, which in turn leads to the decrease of the listening index. In some embodiments, while ensuring that the ear canal is not blocked, the size of the gap formed between the sound generation component 11 and the concha cavity may be as small as possible, and the overall volume of the sound generation component 11 should not be too great or too small. Therefore, under the premise that the overall volume or shape of the sound generation component 11 is determined, a wearing angle of the sound generation component 11 relative to the auricle and the concha cavity needs to be considered. For example, when the sound generation component 11 is of a rectangular-like structure, when the user wears the earphone 10, when the upper side wall 111 or the lower side wall 112 of the sound generation component 11 is disposed parallel with or approximatively parallel with the horizontal plane or disposed perpendicular to or approximatively perpendicular to the horizontal plane (it may also be understood as that the projection of the upper side wall 111 or the lower side wall 112 of the sound generation component 11 on the sagittal plane may be parallel with or approximatively parallel with the sagittal axis or disposed perpendicular to or approximatively perpendicular to the sagittal axis), and when the sound generation component 11 abutting against or covering a portion of the concha cavity, a greater-sized gap may be formed, which affects the listening volume of the user. To make the whole or a portion of the region of the sound generation component 11 extend into the concha cavity, and to increase the area of the region of the concha cavity covered by the sound generation component 11, thereby reducing the size of the gap formed between the sound generation component 11 and the edge of the concha cavity, and increasing the listening volume at the opening of the ear canal, in some embodiments, when the earphone 10 is in the wearing state, the projection of the upper side wall 111 or the lower side wall 112 of the sound generation component 11 on the sagittal plane may have an inclination angle α with the horizontal direction in a range of 10°-28°. At this point, the sound generation component 11 may better extend into the concha cavity, making the size of the gap in the cavity-like structure more favorable for increasing the listening volume. In a specific frequency range, when the input voltage of the transducer does not exceed 0.6 V, the maximum sound pressure provided by the sound generation component to the ear canal may be not less than 75 dB. In some embodiments, when the earphone 10 is in a wearing state, an inclination angle α between the projection of the upper sidewall 111 or the lower sidewall 112 of the sound generation component 11 on the sagittal plane and the horizontal direction may be in a range of 13°-21°. In some embodiments, when the earphone 10 is in a wearing state, an inclination angle α between the projection of the upper sidewall 111 or the lower sidewall 112 of the sound generation component 11 on the sagittal plane projection relative to the horizontal direction may be in a range of 15°-19°. At this time, in a specific frequency range, when the input voltage of the transducer does not exceed 0.4V, the maximum sound pressure provided by the sound generation component to the ear canal may not be less than 72 dB, so as to ensure a good listening effect of the earphone 10. It should be noted that the inclination angle between the projection of the upper side wall 111 of the sound generation component 11 on the sagittal plane and the horizontal direction may be the same as or different from the inclination angle between the projection of the lower side wall 112 on the sagittal plane and the horizontal direction. For example, when the upper sidewall 111 is parallel to the lower sidewall 112 of the sound generation component 11, the inclination angle of the projection of the upper sidewall 111 on the sagittal plane relative to the horizontal direction and the inclination angle of the projection of the lower sidewall 112 on the sagittal plane relative to the horizontal direction may be the same. For example, when the upper sidewall 111 of the sound generation component 11 is not parallel to the lower sidewall 112, or when one of the upper sidewall 111 and the lower sidewall 112 is a planar wall, and the other is a non-planar wall (e.g., a curved wall), the inclination angle between the projection of the upper sidewall 111 on the sagittal plane and the horizontal direction and the angle between the projection of the lower sidewall 112 on the sagittal plane and the horizontal direction may be different. Additionally, when the upper sidewall 111 or the lower sidewall 112 is a curved surface, the projection of the upper sidewall 111 or the lower sidewall 112 on the sagittal plane may be a curve or a polyline. At this time, the inclination angle between the projection of the upper sidewall 111 on the sagittal plane and the horizontal direction may be an angle between a tangent line at a point where the curve or the polyline has the greatest distance from the ground plane and the horizontal direction, and the inclination angle between the projection of the lower sidewall 112 on the sagittal plane and the horizontal direction may be the angle between a tangent line of the curve or the polyline at a point where the curve or the polyline has the smallest distance from the ground plane and the horizontal direction. In some embodiments, when the upper sidewall 111 or the lower sidewall 112 is the curved surface, a tangent line on the projection of the upper sidewall 111 or the lower sidewall 112 parallel to the long axis direction Y may also be selected, and the angle between the tangent line and the horizontal direction may be used to represent the inclination angle between the projection of the upper sidewall 111 or the lower sidewall 112 on the sagittal plane and the horizontal direction.

Figure 11:
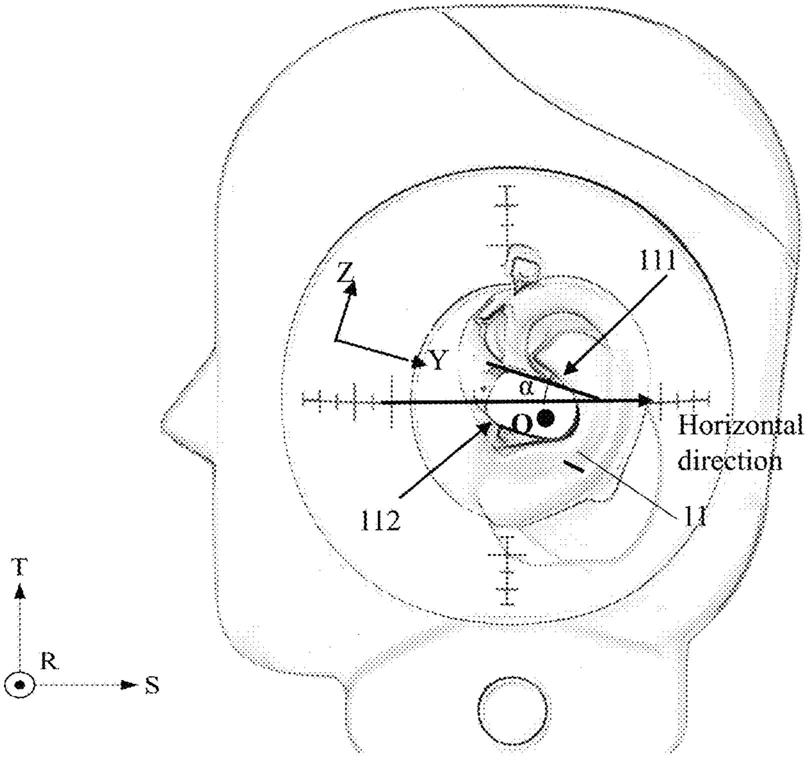
FIG. 11 is a schematic diagram illustrating an exemplary wearing of an earphone according to some other embodiments of the present disclosure.

It should be noted that one end of the sound generation component 11 of the embodiment of the present disclosure may be connected to the second portion 122 of a suspension structure. The end may be referred to as a fixed end, and the end of the sound generation component 11 departing from the fixed end of the sound generation component 11 may be referred to as a free end or a tail end. The tail end of the sound generation component 11 may face the first portion 121 of the ear hook. In the wearing state, the suspension structure 12 (e.g., the ear hook) may have an apex, i.e., a location at the highest distance relative to the horizontal plane, which is close to a connection between the first portion 121 and the second portion 122. The upper sidewall refers to a sidewall (e.g., the upper sidewall 111 illustrated in FIGS. 10A and 11) of the sound generation component 11 whose central point (e.g., geometric center point) has a smallest distance from an apex of the ear hook in the vertical axis direction apart from the fixed end and the tail end. The apex of the ear hook may be a location on the ear hook that has a maximum distance in the vertical axis direction relative to a specific point on the neck of the user when the user is wearing the earphone. Correspondingly, the lower sidewall refers to a sidewall (e.g., the lower sidewall 112 illustrated in FIGS. 10A and 11) of the sound generation component 11 whose central point (e.g., geometric center point) has a greatest distance from the apex of the ear hook in the vertical axis direction apart from the fixed end and the tail end.

Figure 12:
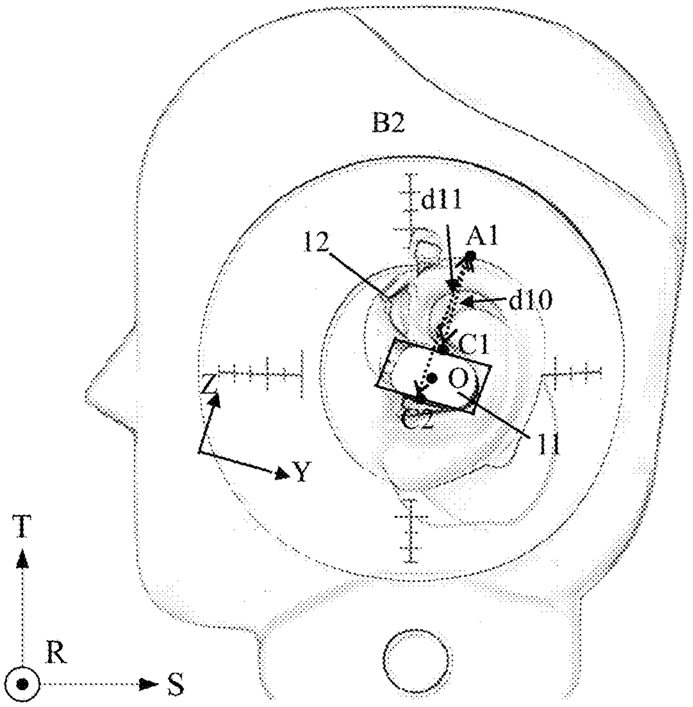
FIG. 12 is a schematic diagram illustrating an exemplary wearing of an earphone according to some other embodiments of the present disclosure.

The whole or a portion of the structure of the sound generation component 11 may extend into the concha cavity to form a cavity-like structure shown in FIG. 4, the listening effect when the user wears the earphone 10 may be related to the size of the gap formed between the sound generation component 11 and the edge of the concha cavity, and the smaller the size of the gap, the greater the listening volume at the opening of the ear canal of the user. Besides being related to the inclination angle between the projection of the upper sidewall 111 or the lower sidewall 112 of the sound generation component 11 on the sagittal plane and the horizontal plane, the size of the gap formed between the sound generation component 11 and the edge of the concha cavity may further be related to the size of the sound generation component 11. For example, if the size of the sound generation component 11 (in particular the size along the short axis direction Z illustrated in FIG. 12) is too small, the gap formed between the sound generation component 11 and the edge of the concha cavity may be too great, thereby affecting the listening volume at the opening of the ear canal of the user. When the size of the sound generation component 11 (in particular the size along the short axis direction Z illustrated in FIG. 12) is too great, there may be very few portion of the sound generation component 11 extending into the concha cavity or the sound generation component 11 may completely cover the concha cavity. At this time, the opening of the ear canal is equivalent to being blocked, and the communication between the opening of the ear canal and the external environment may not be realized, which does not serve an original purpose of the design of the earphone. Additionally, an oversize of the sound generation component 11 may also affect the comfort and ease of carrying the earphone around for the user. As shown in FIG. 12, in some embodiments, the distance between a midpoint of the projection of the upper sidewall 111 and the lower sidewall 112 of the sound generation component 11 on the sagittal plane and the highest point of the second projection may reflect the size of the sound generation component 11 along the short axis direction Z (the direction shown by the arrow Z illustrated in FIG. 12) and the position of the sound generation component 11 relative to the concha cavity. To ensure that the earphone 10 does not block the opening of the ear canal of the user while improving the listening effect of the earphone 10, in some embodiments, by adopting the design of extending a portion of the sound generation component 11 into the concha cavity, a distance d10 between a midpoint C1 of the projection of the upper side wall 111 of the sound generation component 11 on the sagittal plane and the highest point A1 of the second projection may be in a range of 20 mm-38 mm, and a distance d11 between a midpoint C2 of the projection of the lower side wall 112 of the sound generation component 11 on the sagittal plane and the highest point A1 of the second projection may be in a range of 32 mm-57 mm. At this point, in a specific frequency range, when the input voltage of the transducer does not exceed 0.6 V, the maximum sound pressure provided by the sound generation component to the ear canal may be not less than 75 dB. In some embodiments, the distance d10 between the midpoint C1 of the projection of the upper side wall 111 of the sound generation component 11 on the sagittal plane and the highest point A1 of the second projection may be in a range of 24 mm-36 mm, and the distance d11 between the midpoint C2 of the projection of the lower side wall 112 of the sound generation component 11 on the sagittal plane and the highest point A1 of the second projection may be in a range of 36 mm-54 mm. In some embodiments, the midpoint C1 of the projection of the upper side wall 111 of the sound generation component 11 on the sagittal plane and the highest point A1 of the second projection may be in a range of 27 mm-34 mm, and the distance d11 between the midpoint C2 of the projection of the lower side wall 112 of the sound generation component 11 on the sagittal plane and the highest point A1 of the second projection may be in a range of 38 mm-50 mm. At this time, in a specific frequency range, when the input voltage of the transducer does not exceed 0.4V, the maximum sound pressure provided by the sound generation component 11 to the ear canal may not be less than 72 dB, so as to ensure the good listening effect of the earphone 10 and the comfort of the user wearing it. It should be noted that, when the projection of the upper side wall 111 of the sound generation component 11 on the sagittal plane is a curve or a polyline, the midpoint C1 of the projection of the upper side wall 111 of the sound generation component 11 on the sagittal plane may be selected in the following exemplary manner. Two points of the projection of the upper sidewall 111 on the sagittal plane with the greatest distance along the long axis direction may be selected to make a line segment, and a midpoint on the line segment may be selected to make a midperpendicular, and a point where the midperpendicular intersects with the projection may be the midpoint of the projection of the upper sidewall 111 of the sound generation component 11 on the sagittal plane. In some alternative embodiments, the point of the projection of the upper sidewall 111 on the sagittal plane that has the smallest distance from the projection of the highest point of the second projection may be selected as the midpoint of the projection of the upper sidewall 111 of the sound generation component 11 on the sagittal plane. The midpoint of the projection of the lower sidewall 112 of the sound generation component 11 on the sagittal plane may be selected in the same manner as described above, for example, a point of the projection of the lower sidewall 112 on the sagittal plane with a greatest distance from the highest point of the second projection may be selected as the midpoint C2 of the projection of the lower side wall 112 of the sound generation component 11 on the sagittal plane.

Figure 13A:
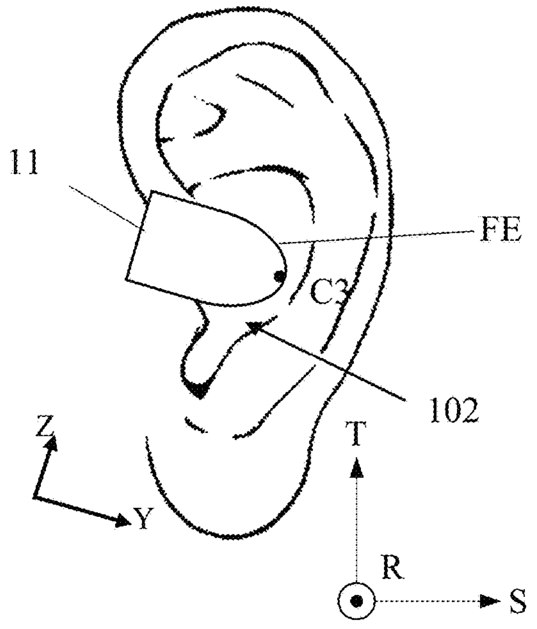
FIG. 13A is a schematic diagram illustration an exemplary fitting position of an earphone with an ear canal of a user according to some embodiments of the present disclosure.
Figure 13B:
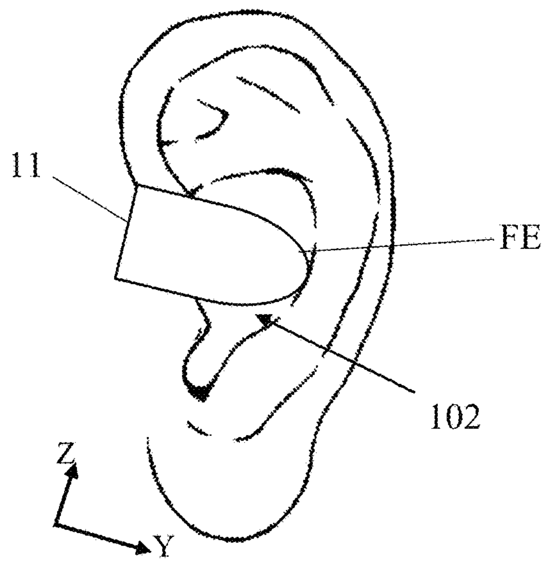
FIG. 13B is a schematic diagram illustrating an exemplary fitting position of another type of earphone with an ear canal of a user according to some embodiments of the present disclosure.
Figure 13C:
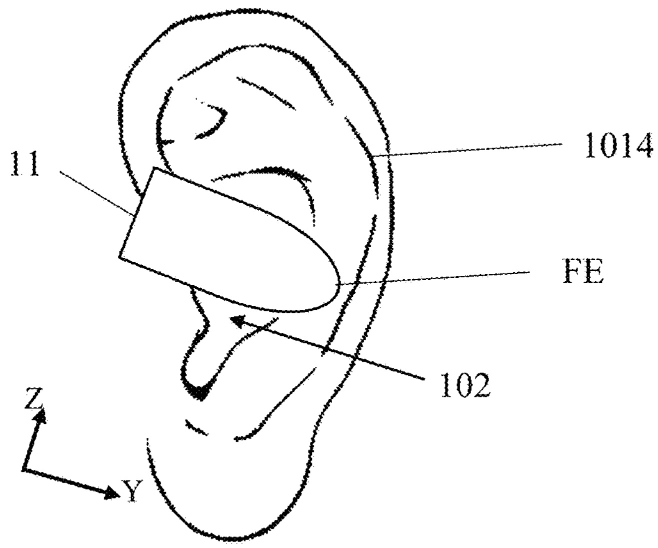
FIG. 13C is a schematic diagram illustrating an exemplary fitting position of another type of earphone with an ear canal of the user according to some embodiments of the present disclosure.

FIGS. 13A to 13C are schematic diagrams illustrating different exemplary mating positions of an earphone with an ear canal of a user according to some embodiments of the present disclosure.

In addition to an inclination angle of a projection of the upper side wall 111 or the lower side wall 112 of the sound generation component 11 on a sagittal plane to the horizontal plane, a size of the sound generation component 11 (e.g., the size of the sound generation component 11 along a short axis direction Z illustrated in FIG. 3A), a size of a gap formed between the sound generation component 11 and an edge of the concha cavity may be related to a distance of the end FE of the sound generation component 11 relative to the edge of the concha cavity. It should be noted that the end FE of the sound generation component 11 refers to an end of the sound generation component 11 opposite to a fixed end connected to the suspension structure 12, which is also referred to as the free end. The sound generation component 11 may be a regular or irregular structure. Here, for further explaining the end FE of the sound generation component 11, exemplary illustrations are given below. For example, when the sound generation component 11 is a cuboid structure, an end wall of the sound generation component 11 may be a plane. At this time, the end FE of the sound generation component 11 may be an end sidewall oppositely disposed relative to the fixed end connected with the suspension structure 12 of the sound generation component 11. For example, if the sound generation component 11 is a sphere, an ellipsoid, or an irregular structural body, the end FE of the sound generation component 11 may be a specific region away from the fixed end obtained by cutting the sound generation component 11 along a Y-Z plane (a plane formed by the short axis direction Z and the thickness direction X). A ratio of a size of the specific region along the long axis direction Y to a size of the sound generation component along the long axis direction Y may be 0.05 to 0.2.

Specifically, one end of the sound generation component 11 may be connected to the suspension structure 12 (the second portion 122 of the ear hook), which is positioned relatively forward when worn by the user, and the distance of the end FE (the free end) of the sound generation component 11 relative to the fixed end may reflect the size of the sound generation component 11 in the long axis direction (the direction shown by the arrow Y in FIG. 3A). Therefore, the position of the end FE of the sound generation component 11 relative to the concha cavity may affect an area of the concha cavity covered by the sound generation component 11, and thus affecting the size of the gap formed between a contour of the concha cavity and the sound generation component 11, which in turn affects a listening volume at the opening of the ear canal of the user. A distance between a midpoint of the projection of the end FE of the sound generation component 11 on the sagittal plane and the projection of the edge of the concha cavity on the sagittal plane may reflect the position of the end FE of the sound generation component 11 relative to the concha cavity and an extent to which the sound generation component 11 covers the concha cavity of the user. The concha cavity refers to a concave fossa region below a crus of helix, that is to say, the edge of the auricular cavity at least consists of a sidewall below the crus of helix, a tragus contour, an intertragic notch, an apex of antitragus, a tragus notch, and the contour of the antihelix corresponding to the concha cavity. It may be noted that when the projection of the end FE of the sound generation component 11 on the sagittal plane is a curve or a polyline, the midpoint of the projection of the end FE of the sound generation component 11 on the sagittal plane may be selected in the following exemplary manner. Two points of the projection of the end FE on the sagittal plane with the greatest distance in the short axis direction Z may be selected to make a line segment, and a midpoint on the line segment may be selected to make a midperpendicular, and a point where the midperpendicular intersects with the projection may be the midpoint of the projection of the end of the sound generation component 11 on the sagittal plane. In some embodiments, when the end FE of the sound generation component 11 is a curved surface, a point of tangency of the projection of the end FE where a tangent line parallel to the short axis direction Z is located may also be selected as the midpoint of the projection of the end FE of the sound generation component 11 on the sagittal plane.

As shown in FIG. 13A, when the sound generation component 11 does not abut against the edge of the concha cavity 102, the end FE of the sound generation component 11 may be located in the concha cavity 102, i.e., the midpoint of the projection of the end FE of the sound generation component 11 on the sagittal plane may not overlap with the projection of the edge of the concha cavity 102 on the sagittal plane. As shown in FIG. 13B, the sound generation component 11 of the earphone 10 may extend into the concha cavity 102, and the end FE of the sound generation component 11 may abut against the edge of the concha cavity 102. It should be noted that in some embodiments, when the end FE of the sound generation component 11 abuts against the edge of the concha cavity 102, the midpoint of the projection of the end FE of the sound generation component 11 on the sagittal plane may overlap with the projection of the edge of the concha cavity 102 on the sagittal plane. In some embodiments, when the end FE of the sound generation component 11 abuts against the edge of the concha cavity 102, the midpoint of the projection of the end FE of the sound generation component 11 on the sagittal plane may not overlap with the projection of the edge of the concha cavity 102 on the sagittal plane. For example, the concha cavity 102 may be the concave fossa structure, the sidewall corresponding to the concha cavity 102 may not be a flat wall, and the projection of the edge of the concha cavity on the sagittal plane may be an irregular 2D shape. The projection of the sidewall of the sidewall corresponding to the concha cavity 102 on the sagittal plane may be on or off the contour of the shape. Therefore, the midpoint of the projection of the end FE of the sound generation component 11 on the sagittal plane and the projection of the edge of the concha cavity 102 on the sagittal plane may or may not overlap. For example, the midpoint of the projection of the end FE of the sound generation component 11 may be inside or outside the projection of the edge of the concha cavity on the sagittal plane. In some embodiments of the present disclosure, when the end FE of the sound generation component 11 is located at the concha cavity 102, if a distance between the midpoint of the projection of the end FE of the sound generation component 11 on the sagittal plane and the projection of the edge of the concha cavity 102 on the sagittal plane within a certain distance (e.g., not greater than 6 mm), it may be regarded that the end FE of the sound generation component 11 abuts against the edge of the concha cavity 102. As shown in FIG. 13C, the sound generation component 11 of the earphone 10 may cover the concha cavity, and the end FE of the sound generation component 11 may be located between the edge of the concha cavity 102 and an inner contour 1014 of the auricle.

Combining FIGS. 13A to 13C, when the end FE of the sound generation component 11 is disposed within the edge of the concha cavity 102, if the distance between a midpoint C3 of the projection of the end FE of the sound generation component 11 on the sagittal plane and the projection of the edge of the concha cavity 102 on the sagittal plane is too small, the area of the sound generation component 11 covering the concha cavity 102 may be too small, and the size of the gap formed between the sound generation component 11 and the edge of the concha cavity may be too great, which affects the listening volume at the opening of the ear canal of the user. When the midpoint C3 of the projection of the end FE of the sound generation component on the sagittal plane is located between the projection of the edge of the concha cavity 102 on the sagittal plane and the projection of the inner contour 1014 of the auricle on the sagittal plane, if the distance between the midpoint C3 of the projection of the end FE of the sound generation component on the sagittal plane and the projection of the edge of the concha cavity 102 on the sagittal plane is too great, the end FE of the sound generation component 11 may interfere with the auricle, and the proportion of the sound generation component 11 covering the concha cavity 102 may not be increased. When the user wears the earphone, if the end FE of the sound generation component 11 is not in the concha cavity 102, the edge of the concha cavity 102 may not limit the sound generation component 11, making the sound generation component 11 easy to fall off. In addition, an increase in the size of the sound generation component 11 in a certain direction may increase its weight, affecting the wearing comfort and portability of the user. Based on this, to ensure that the earphone 10 has a better listening effect while also ensuring the wearing comfort and stability of the user, in some embodiments, while adopting the design of extending a portion of the sound generation component 11 into the concha cavity, the distance between the midpoint C3 of the projection of the end FE of the sound generation component 11 on the sagittal plane and the projection of the edge of the concha cavity on the sagittal plane may be not greater than 16 mm. At this time, the size of the gap in the cavity-like structure formed by the sound generation component 11 and the concha cavity 102 of the user may be more conducive to increasing the listening volume, so that in a specific frequency range, when the input voltage of the transducer does not exceed 0.6 V, the maximum sound pressure provided by the sound generation component 11 to the ear canal may be not less than 75 dB. In some embodiments, the distance between the midpoint C3 of the projection on the sagittal plane of the end FE of the sound generation component 11 and the projection on the sagittal plane of the edge of the concha cavity may be not greater than 13 mm. In some embodiments, the distance between the midpoint C3 of the projection of the end FE of the sound generation component 11 on the sagittal plane and the projection of the edge of the concha cavity on the sagittal plane is not greater than 8 mm. It is to be noted that in some embodiments, the distance between the midpoint C3 of the projection of the end FE of the sound generation component 11 on the sagittal plane and the projection of the edge of the concha cavity 102 on the sagittal plane may be a minimum distance between the midpoint C3 of the projection of the end FE of the sound generation component 11 on the sagittal plane and the projection of the edge of the concha cavity 102 on the sagittal plane. In some embodiments, the distance between the midpoint C3 of the projection of the end FE of the sound generation component 11 on the sagittal plane and the projection of the rim of the concha cavity 102 on the sagittal plane may also refer to the distance along the sagittal axis. In addition, in a specific wearing scenario, a point of the projection of the end FE of the sound generation component 11 on the sagittal plane other than the midpoint C3 may abut against the edge of the concha cavity. At this time, the distance between the midpoint C3 of the projection of the end FE of the sound generation component 11 and the projection of the edge of the concha cavity on the sagittal plane projection may be greater than 0 mm. In some embodiments, the distance between the midpoint C3 of the projection of the end FE of the sound generation component 11 on the sagittal plane and the projection of the edge of the concha cavity on the sagittal plane may be 2 mm-16 mm. In some embodiments, the distance between the midpoint C3 of the projection of the end FE of the sound generation component 11 on the sagittal plane and the projection of the edge of the concha cavity on the sagittal plane may be 4 mm-10.48 mm. At this point, in a specific frequency range, when the input voltage of the transducer does not exceed 0.4 V, the maximum sound pressure provided by the sound generation component to the ear canal may be not less than 72 dB, so as to ensure a good listening effect of the earphone 10 as well as the comfort of the user wearing it.

Figure 14A:
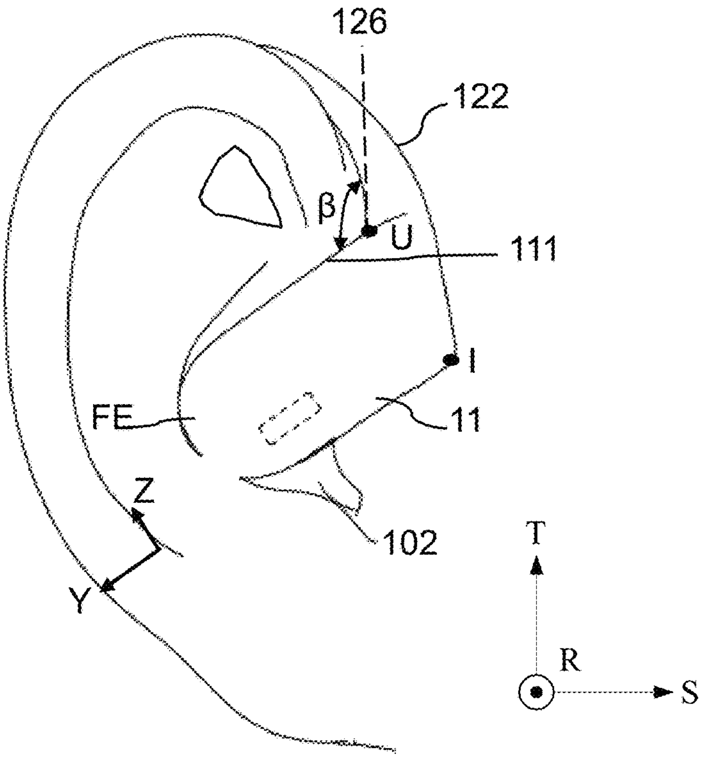
FIG. 14A is a schematic diagram illustrating an exemplary wearing of an earphone according to some other embodiments of the present disclosure.
Figure 14B:
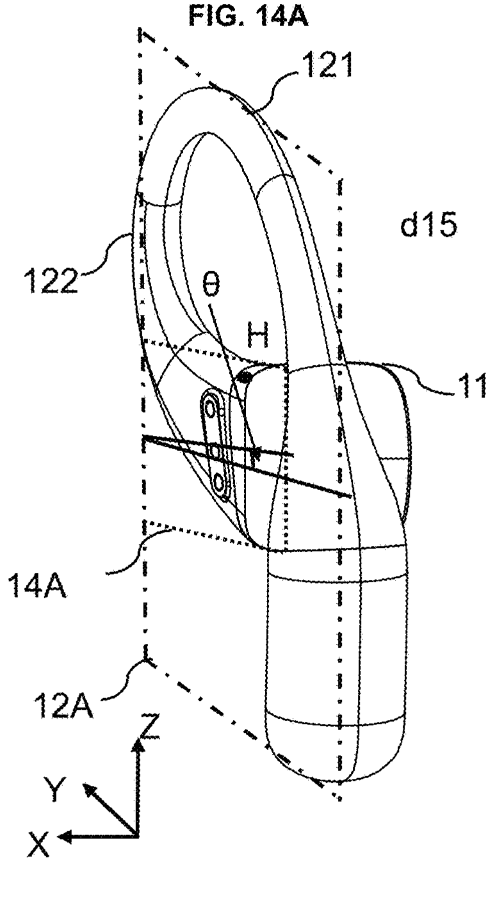
FIG. 14B is a schematic diagram illustrating a structure of an earphone in an non-wearing state according to some embodiments of the present disclosure.

FIG. 14A is a schematic diagram illustrating an exemplary wearing of an earphone according to some other embodiments of the present disclosure. FIG. 14B is a schematic diagram illustrating a structure of the earphone in a non-wearing state according to some embodiments of the present disclosure.

Referring to FIG. 14A, in some embodiments, to make a portion or a whole structure of a sound generation component extend into a concha cavity when the user wears the earphone, there may be a certain angle between the upper sidewall 111 of the sound generation component 11 and the second portion 122 of the ear hook. The angle may be expressed by an angle β between a projection of the upper sidewall 111 of the sound generation component 11 on a sagittal plane and a tangent line 126 of a projection of a connection between the upper sidewall 111 of the sound generation component 11 and the second portion 122 of the ear hook on the sagittal plane. Specifically, the upper sidewall of the sound generation component 11 and the second portion 122 of the ear hook may have a connection portion, the projection of the connection portion on the sagittal plane may be point U, and the tangent line 126 of the projection of the second portion 122 of the ear hook may be made passing point U. When the upper sidewall 111 is a curved surface, the projection of the upper sidewall 111 on the sagittal plane may be a curve or a fold line. At this time the angle between the projection of the upper sidewall 111 on the sagittal plane and the tangent line 126 may be the angle between a tangent line at a point where the polyline has the greatest distance relative to the ground plane and the tangent line 126. In some embodiments, when the upper sidewall 111 is a curved surface, a tangent line on the projection thereof parallel to the long axis direction Y may also be selected, and the angle between the tangent line and the horizontal direction may be used to represent the angle between the projection of the upper sidewall 111 on the sagittal plane and the tangent line 126. In some embodiments, the angle β may be in a range of 100°-150°. In some embodiments, the angle β may be in a range of 120°-135°.

A human head may be approximated regarded as a sphere-like structure, and an auricle may be a structure that is convex relative to the head. When the user wears the earphone, a portion of a region of the ear hook may be fitted to the user's head, and to enable the sound generation component 11 to extend into the concha cavity 102, the sound generation component 11 may have a certain inclination angle with an ear hook plane. The inclination angle may be expressed by an angle between the plane corresponding to the sound generation component 11 and an ear hook plane. In some embodiments of the present disclosure, the ear hook plane may refer to a plane formed by a bisector that bisects or approximately bisects the ear hook along a length extension direction of the ear hook (e.g., the plane in which the dashed line 12A is located in FIG. 14B). In some embodiments, the ear hook plane may further by the plane formed by three most protruding points on the ear hook, that is, the plane that supports the ear hook when the ear hook is placed freely (not affected by external forces). For example, when the ear hook is placed on the horizontal plane, the horizontal plane may support the ear hook, and the horizontal plane may be considered as the ear hook plane. In some embodiments, the plane 14A corresponding to the sound generation component 11 may include a sidewall (also referred to as an inner side) of the sound generation component 11 facing an anterolateral side of the auricle of the user or a sidewall (also referred to as an outer side) away from the anterolateral side of the user. When the sidewall of the sound generation component 11 facing the anterolateral side of the auricle of the user or the sidewall of the sound generation component 11 away from the anterolateral side of the auricle of the user is a curved surface, the plane of the sound generation component 11 may refer to a tangent surface corresponding to a center position of the curved surface, or a surface substantially coincides a curve bounded by an edge profile of the curved surface. Taking a plane 11A where the sidewall of the sound generation component 11 facing the anterolateral side of the auricle of the user is located as an example, an angle θ formed between the plane 11A and an ear hook plane 12A may be the inclination angle of the sound generation component 11 relative to the ear hook plane. In some embodiments, the angle θ may be measured in the following exemplary manner. A projection of a side wall (hereinafter referred to as the inner side) of the sound generation component 11 near the ear hook on an X-Y plane and a projection of the ear hook on the X-Y plane may be respectively obtained along the short axis direction Z. The two most protruding points of a side of the projection of the ear hook on the X-Y plane near (or away from) the projection of the inner side of the sound generation component may be selected to make a first line. When the projection of the inner side of the sound generation component 11 on the X-Y plane is a straight line, an angle between the projection of the first line and the projection of the inner side on the X-Y plane may be angle θ. When the projection of the inner side of the sound generation component 11 is a curve, the angle between the first line and the long axis direction may be approximately regarded as angle θ. It should be noted that the inclination angle θ of the sound generation component 11 relative to the ear hook plane may be measured in the above manner in both the wearing state and the non-wearing state of the earphone. The difference may be that in the non-wearing state, the above manner may be used directly, while in the wearing state, the above manner may be used when the earphone is worn on a head model or an ear model. Considering that a too great angle makes a contact area between the sound generation component 11 and the anterolateral side of the ear of the user small, which is unable to provide sufficient contact resistance and the earphone is prone to fall off when the user wears it. In addition, the size of the gap in the cavity-like structure formed between the sound generation component 11 and the concha cavity 102 of the user may inevitably be too great, thereby affecting the listening volume of an opening of the ear canal of the user. A too small angle may make the sound generation component 11 unable to effectively extend into the concha cavity when worn by the user. To ensure that the user can have a better listening effect while ensuring the stability when wearing the earphone 10, in some embodiments, when the earphone is in the wearing state, the inclination angle θ of the sound generation component 11 relative to the ear hook plane may be in a range of 15°-28°. At this point, in a specific frequency range, when the input voltage of the transducer does not exceed 0.6 V, the maximum sound pressure provided by the sound generation component 11 to the ear canal may be not less than 75 dB. In some embodiments, the inclination angle θ of the sound generation component 11 relative to the ear hook plane may be in a range of 18°-23°. At this point, the size of the gap in the cavity-like structure formed between the sound generation component 11 and the concha cavity 102 of the user may be more conducive to improving the listening volume, so that in a specific frequency range, when the input voltage of the transducer does not exceed 0.4V, the maximum sound pressure provided by the sound generation component to the ear canal may be not less than 72 dB, so as to ensure a good listening effect of the earphone 10 and the wearing stability.

Due to the elasticity of the ear hook, the inclination angle of the sound generation component 11 relative to the ear hook plane 12A may vary to a certain extent in the wearing state and the non-wearing state. For example, the inclination angle in the non-wearing state may be smaller than that in the wearing state. In some embodiments, by adopting the design of extending a portion of the sound generation component 11 into the concha cavity, when the earphone is in the non-wearing state, the inclination angle of the sound generation component 11 relative to the ear hook may be in a range from 15°-23°, so as to enable the earphone 10, when in the wearing state, to generate a certain clamping force on the user's ear. As a result, while the wearing experience of the user is not affected, the wearing stability may be improved, and at the same time, the sound generation component 11 may provide a greater sound pressure to the ear canal. Then, in a specific frequency range, when the input voltage of the transducer does not exceed 0.6 V, the maximum sound pressure provided by the sound generation component to the ear canal may be not less than 75 dB. In some embodiments, when the earphone is in the non-wearing state, the inclination angle of the sound generation component 11 relative to the ear hook may be in a range from 18°-20°. At this time, in a specific frequency range, when the input voltage of the transducer does not exceed 0.4V, the maximum sound pressure provided by the sound generation component to the ear canal may not be less than 72 dB, so as to ensure a good listening effect and wearing stability of the earphone 10.

When a size of the sound generation component 11 in the thickness direction X is too small, volumes of a front cavity and a rear cavity formed by a diaphragm and the housing of the sound generation component 11 may be too small, an amplitude of the vibration may be limited, and a great sound volume may not be provided. When the size of the sound generation component 11 in the thickness direction X is too great, the end FE of the sound generation component 11 may not be able to completely abut against the edge of the concha cavity 102 in the wearing state, resulting in the earphone being easy to fall off. The sidewall of the sound generation component 11 facing the ear of the user in a coronal axis direction may have an inclination angle relative to the ear hook plane. A distance between a point on the sound generation component 11 that is farthest from the ear hook plane and the ear hook plane may be positively related to the size of the sound generation component 11 in the thickness direction X. As the sound generation component 11 is inclined relative to the ear hook plane, the point on the sound generation component 11 that is farthest from the ear hook plane may refer to an intersection point I of the fixed end, the lower sidewall, and the outer side of the sound generation component 11 connected to the ear hook. Further, the extent to which the sound generation component 11 extends into the concha cavity 11 may be determined by a distance between a point on the sound generation component 11 closest to the ear hook plane and the ear hook plane. By disposing the distance between a point on the sound generation component 11 closest to the ear hook plane and the ear hook plane in a suitable range, a gap with a small size may be formed between the sound generation component 11 and the concha cavity, and the wearing comfort for the user may be ensured. The point on the sound generation component 11 closest to the ear hook plane refers to an intersection point H of the end FE, the upper sidewall, and the inner side of the sound generation component 11. In some embodiments, by adopting the design of extending a portion of the sound generation component 11 into the concha cavity, to ensure that the sound generation component 11 has a better acoustic output effect as well as to ensure the wearing stability and comfort, when the earphone is in the wearing state, the distance between the point I on the sound generation component 11 that is farthest from the ear hook plane 12A and the ear hook plane 12A may be 11.2 mm-16.8 mm, and the distance between point H on the sound generation component 11 closest to the ear hook plane and the ear hook plane 12A may be 3 mm-5.5 mm. At this time, the size of the gap in the cavity-like structure formed between the sound generation component 11 and the concha cavity of the user may be more conductive to improve the listening volume, so that in a specific frequency range, when the input voltage of the transducer does not exceed 0.6 V, the maximum sound pressure provided by the sound generation component to the ear canal may be not less than 75 dB. In some embodiments, the distance between the point I on the sound generation component 11 that is farthest from the ear hook plane 12A and the ear hook plane 12A may be 12 mm-15.6 mm, and the distance between point H on the sound generation component 11 closest to the ear hook plane and the ear hook plane 12A may be 3.8 mm-5 mm. In some embodiments, the distance between the point I on the sound generation component 11 that is farthest from the ear hook plane 12A and the ear hook plane 12A may be 13 mm-15 mm, and the distance between point H on the sound generation component 11 closest to the ear hook plane and the ear hook plane 12A may be 4 mm-5 mm. At this point, in a specific frequency range, when the input voltage of the transducer does not exceed 0.4V, the maximum sound pressure provided by the sound generation component 11 to the ear canal may be not less than 72 dB, so as to enable the earphone 10 to have a good listening effect and at the same time to ensure the wearing comfort of the user.

Figure 15:
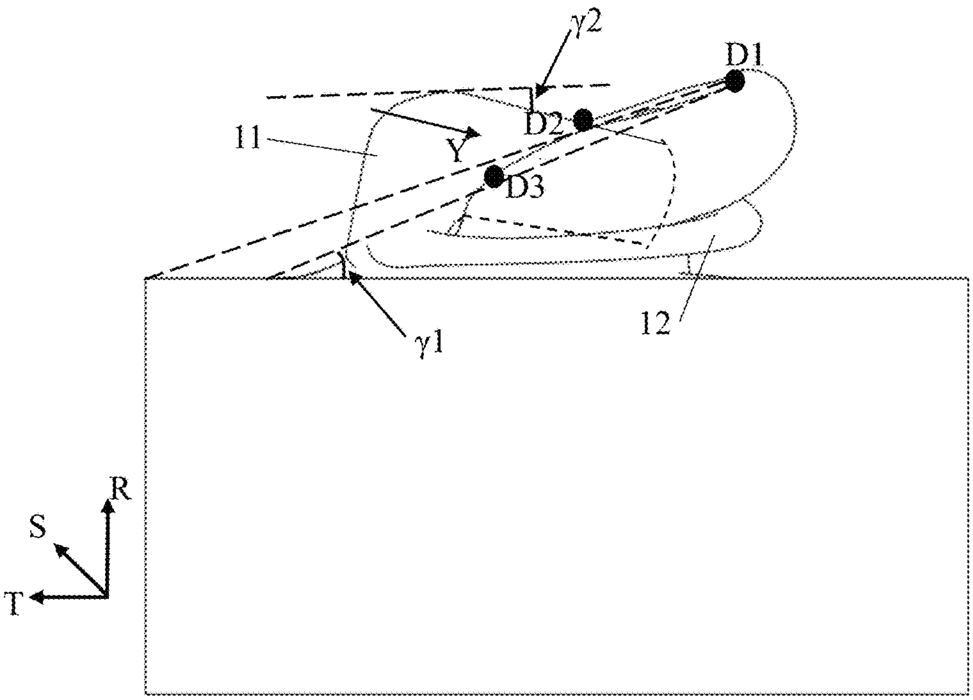
FIG. 15 is a schematic diagram illustrating an exemplary wearing of an earphone according to some other embodiments of the present disclosure.

FIG. 15 is a schematic diagram illustrating an exemplary wearing of an earphone according to some other embodiments of the present disclosure.

Referring to FIG. 15, in some embodiments, when the earphone is in a wearing state, at least a portion of the sound generation component 11 may extend into the concha cavity of the user, so as to ensure an acoustic output effect of the sound generation component 11, and at the same time, to improve wearing stability of the earphone through an action force of the concha cavity on the sound generation component 11. At this time, a sidewall of the sound generation component 11 away from the user's head or facing an opening of the ear canal of the user may have a certain inclination angle relative to an auricular plane of the user. It may be noted that the side wall of the sound generation component 11 away from the user's head or facing the opening of the ear canal of the user may be a plane or a curved plane. When it is a curved plane, an inclination angle between the side wall of the sound generation component 11 away from the user's head or facing the opening of the ear canal of the user and the auricular plane of the user may be represented by a tangent plane corresponding to a center position of the curved plane (or a plane that roughly coincides with a curve formed by an edge contour of the curved plane) relative to the auricular plane of the user. It may be noted that in some embodiments of the present disclosure, the auricular plane of the user may refer to the plane where three points farthest from a sagittal plane of the user in different regions (e.g., a top region of the auricle, the tragus region, the antihelix region) of the auricle of the user are located (e.g., the plane on which points D1, D2, and D3 are located in FIG. 15).

As the projection of the sound generation component 11 on the sagittal plane is much smaller than the projection of the auricle on the sagittal plane, and the concha cavity is a concha cavity in the structure of the auricle, when the range of the inclination angle of the sound generation component 11 relative to the auricular plane is small, for example, when the sidewall of the sound generation component 11 facing away from the user's head or facing the opening of the ear canal of the user is approximately parallel to the auricular plane of the user, the sound generation component 11 may be unable to extend into the concha cavity, or the size of the gap in the cavity-like structure formed between the sound generation component 11 and the concha cavity may be too great, so that the user is unable to obtain a better listening effect when wearing the earphone. At the same time, the sound generation component 11 may not be able to abut against the edge of the concha cavity, and the earphone may be prone to fall off when worn by the user. When the inclination angle of the sound generation component 11 relative to the auricular plane is great, the sound generation component 11 may extend excessively deep into the concha cavity and squeeze the user's ear, and the user may feel uncomfortable after wearing the earphone for a long time. To enable the user to experience a better acoustic output when wearing the earphone and to ensure the stability and comfort of wearing the earphone, by adopting the design of extending a portion of the sound generation component 11 into the concha cavity, the inclination angle of the sidewall of the sound generation component 11 away from the head of the user or facing the opening of the ear canal of the user relative to the auricular plane of the user may be in a range of 40°-60°. At this point, the size of the gap in the cavity-like structure formed between the sound generation component 11 and the concha cavity 102 of the user may be more favorable for increasing the listening volume, such that in a specific frequency range, when the input voltage of the transducer does not exceed 0.6 V, the maximum sound pressure that the sound generation component can provide to the ear canal may be not less than 75 dB, and a portion or the whole structure of the sound generation component 11 may extend into the concha cavity of the user. At this time, the sound generation component 11 may have a relatively good acoustic output quality, and a contact force between the sound generation component 11 and the ear canal of the user may be more moderate, so as to realize a more stable wearing relative to the user's ear, and enable the user to have a more comfortable wearing experience. In some embodiments, to further optimize the acoustic output quality and the wearing experience of the earphone in the wearing state, the inclination angle of the sound generating component 11 relative to the auricular plane may be in a range of 42°-55°. In some embodiments, to further optimize the acoustic output quality and the wearing experience of the earphone in the wearing state, the inclination angle of the sound generation component 11 relative to the auricular plane of the earphone may be controlled to be in a range of 44°-52°. At this time, in a specific frequency range, when the input voltage of the transducer does not exceed 0.4V, the maximum sound pressure provided by the sound generation component to the ear canal may be less than 72 dB, so as to make the earphone 10 have a good listening effect while ensuring the wearing comfort of the user.

It should be noted that, referring to FIG. 15, the auricular plane may be inclined upward relative to the sagittal plane, and the inclination angle between the auricular plane and the sagittal plane may be $\gamma 1$. To make the end of the sound generation component 11 extend into the concha cavity concave relative to the auricle, the outer side or the inner side of the sound generation component 11 may be inclined downward relative to the sagittal plane. The inclination angle between the outer side or the inner side of the sound generation component 11 and the sagittal surface may be $\gamma 2$. The angle between the sound generation component 11 and the auricular plane may be a sum of $\gamma 1$ and $\gamma 2$. That is to say, the inclination angle between the outer side or inner side of the sound generation component 11 relative to the auricular plane of the user may be determined by calculating the sum of inclination angles $\gamma 1$ and $\gamma 2$. The inclination angle between the outer side or the inner side of the sound generation component 11 and the sagittal plane may be approximately regarded as the inclination angle between the sagittal surface and the long axis direction Y of the sound generation component 11. In some embodiments, the inclination angle between the outer side or the inner side of the sound generation component 11 and the sagittal plane may be obtained by calculating the angle between the projection of the auricular plane formed by the T and R axes (hereinafter referred to as the T-R plane) and the projection of the outer or inner side of the sound generation component 11 in the T-R plane. When the outer or inner side of the sound generation component 11 is a plane, the projection of the outer or inner side of the sound generation component 11 on the T-R plane may be a straight line, and the angle between the straight line and the projection of the auricular plane on the T-R plane may be the inclination angle of the sound generation component 11 relative to the auricular plane. When the outer or inner side of the sound generation component 11 is a curved surface, the inclination angle of the sound generation component 11 relative to the auricular plane may be approximately regarded as the angle between the long axis direction Y of the sound generation component 11 and the projection of the auricular plane on the T-R plane.

Figure 16:
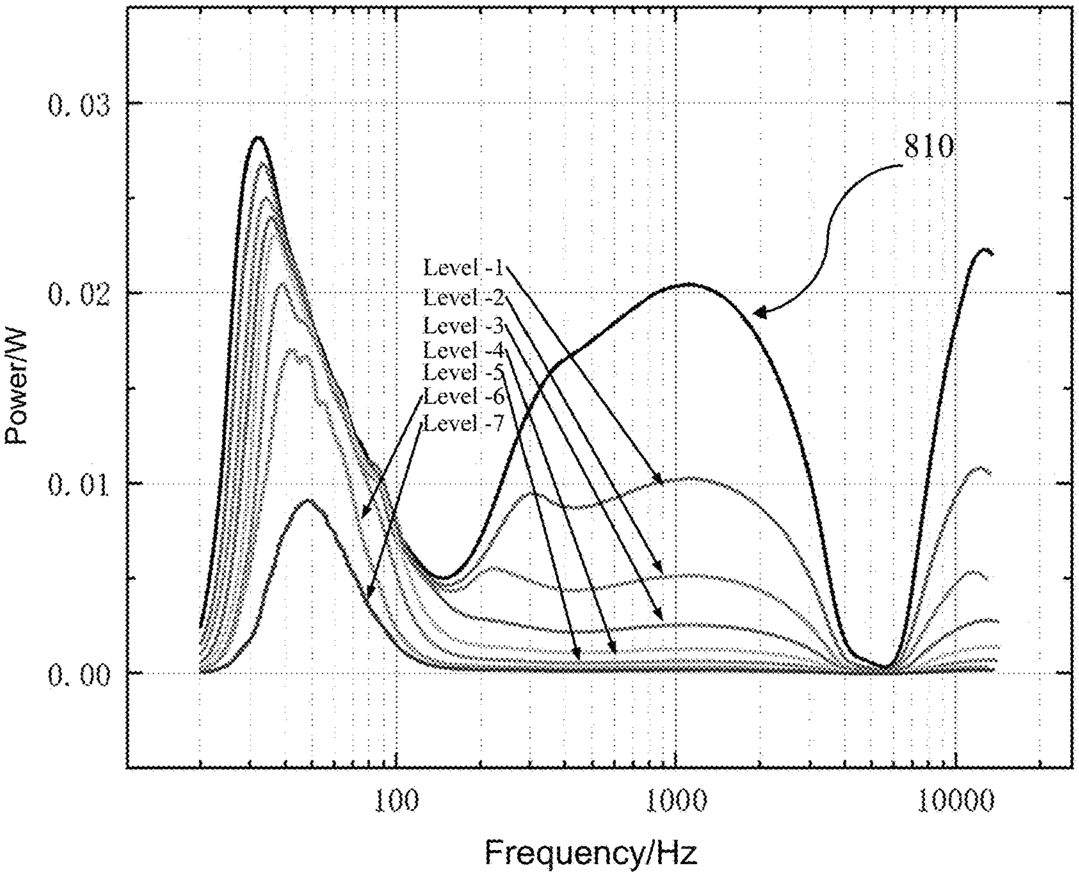
FIG. 16 is a graph illustrating input power-frequency curves corresponding to FIG. 8.

In some embodiments, the relationship between the input power of the transducer and the sound pressure in the ear canal may also reflect the sound output efficiency of the sound generation component 11. For example, a relatively high sound output efficiency may be understood as that, even if a small input power is provided to the transducer, the sound generation component 11 may still provide a sufficient sound volume to the user, that is, a sound pressure exceeding a certain threshold may be generated in the ear canal of the user. FIG. 16 is an input power-frequency diagram corresponding to FIG. 8. A solid line 810 in FIG. 16 may represent a sound pressure level curve of the earphone 10 when a playback device outputs an output signal at the maximum sound volume level, and the other solid lines may represent the sound pressure level curves of the earphone 10 when sounds of smaller sound volume levels (minus one level to minus seven level) are played. In some embodiments, the input power may be determined based on an input voltage and/or input current at a transducer terminal.

Combining FIGS. 8 and 16, it may be seen that, in a specific frequency range, when an input power of the transducer does not exceed 21.1 mW, by adopting the design of extending a portion of the sound generation component 11 into the concha cavity, and controlling a ratio of the distance h1 between the centroid O of the first projection and the highest point A1 of the second projection in the vertical axis direction to the height h of the second projection in the vertical axis direction to be between 0.35 and 0.6, the sound generation component 11 may provide a maximum sound pressure of not less than 75 dB to the ear canal.

Exemplarily, taking a frequency of 1000 Hz as an example, according to FIG. 8, the maximum sound pressure provided by the sound generation component 11 into the ear canal at a frequency of 1000 Hz is 79 dB, and combining FIG. 16, the input power of the transducer at a frequency of 1000 Hz may be 21.1 mW. That is to say, at a frequency of 1000 Hz, by adopting the design of extending a portion of the sound generation component 11 into the concha cavity, when the input power of the transducer does not exceed 21.1 mW, the maximum sound pressure provided by the sound generation component 11 to the ear canal may be not less than 75 dB.

In addition, according to FIGS. 8 and 16, at a frequency of 500 Hz, the input power of the transducer is 19.8 mW, and the maximum sound pressure provided by the sound generation component 11 to the ear canal is 80 dB. That is, when the frequency is 500 Hz and the input power of the transducer does not exceed 19.8 mW, by adopting the design of extending a portion of the sound generation component 11 into the concha cavity, the maximum sound pressure provided by the sound generation component 11 to the ear canal may not be less than 80 dB. Based on FIGS. 8 and 16, at a frequency of 800 Hz, when the input power of the transducer does not exceed 19.8 mW, by adopting the design of extending a portion of the sound generation component 11 into the concha cavity, the maximum sound pressure provided by the sound generation component 11 to the ear canal may be not less than 79 dB. At a frequency of 2000 Hz, when the input power of the transducer does not exceed 17.8 mW, the maximum sound pressure provided by the sound generation component 11 to the ear canal may be not less than 83 dB.

Continue to refer to FIGS. 8 and 16, in a frequency range of 300 Hz-4000 Hz, by adopting the design of extending a portion of the sound generation component 11 into the concha cavity, when the input power of the transducer does not exceed 21.1 mW, the maximum sound pressure provided by the sound generation component 11 to the ear canal may be not less than 79 dB; in a frequency range of 700 Hz-1500 Hz, by adopting the design of extending a portion of the sound generation component 11 into the concha cavity, when the input power of the transducer does not exceed 21.1 mW, the maximum sound pressure provided by the sound generation component 11 to the ear canal may be not less than 75 dB; and in a frequency range of 2500 Hz-4000 Hz, by adopting the design of extending a portion of the sound generation component 11 into the concha cavity, when the input power of the transducer does not exceed 17.8 mW, the maximum sound pressure provided by the sound generation component 11 to the ear canal may be not less than 75 dB.

It may be seen that, in the wearing mode of extending a portion of the sound generation component 11 into the concha cavity, in a specific frequency range (e.g., 300 Hz-4000 Hz), when the input power of the transducer does not exceed 21.1 mW, the maximum sound pressure provided by the sound generation component 11 to the ear canal may be not less than 75 dB. In some embodiments, by optimizing volumes, masses, and sizes of the sound generation component 11 and the battery compartment 13, a sound output efficiency of the sound generation component 11 may be further improved, so that when the input power of the transducer does not exceed 21.1 mW, the maximum sound pressure provided by the sound generation component 11 to the ear canal may be not less than 78 dB.

In some embodiments, based on a similar mode of the voltage and input power in FIG. 9 and FIG. 16, an input current-frequency diagram (not shown) reflecting a relationship between an input current and a frequency of the transducer may also be determined. In some embodiments, by adopting the design of extending a portion of the sound generation component 11 into the concha cavity, and controlling a ratio of the distance h1 between the centroid o of the first projection and the highest point al of the second projection in the vertical axis direction to the height h of the second projection in the vertical axis direction to be between 0.35 and 0.6, the sound generation component 11 may be made to be able to provide a maximum sound pressure of not less than 75 dB to the ear canal in a specific frequency range when the input current of the transducer doesn't exceed 35.3 mA.

Exemplarily, taking a frequency of 1000 Hz as an example, according to FIG. 8, the maximum sound pressure provided to the ear canal by the sound generation component 11 is 79 dB and the input current of the transducer at the frequency of 1000 Hz is 35.3 mA. That is to say, at a frequency of 1000 Hz, by adopting the design of extending a portion of the sound generation component 11 into the concha cavity, and when the input currency of the transducer doesn't exceed 35.3 mA, the maximum sound pressure provided by the sound generation component 11 into the ear canal may be not less than 75 dB.

In addition, when the frequency is 500 Hz, the maximum sound pressure provided by the sound generation component 11 to the ear canal is 80 dB, and the input current of the transducer is 34.1 mA. That is to say, at a frequency of 500 Hz, by adopting the design of extending a portion of the sound generation component 11 into the concha cavity, when the input current of the transducer doesn't exceed 34.1 mA, the sound generation component 11 may provide a maximum sound pressure of not less than 80 dB to the ear canal. At a frequency of 800 Hz, by adopting the design of extending a portion of the sound generation component 11 into the concha cavity, when the input current of the transducer doesn't exceed 34.1 mA, the sound generation component 11 may provide a maximum sound pressure of not less than 79 dB to the ear canal. At a frequency of 2000 Hz, by adopting the design of extending a portion of the sound generation component 11 into the concha cavity, when the input current of the transducer doesn't exceed 17.8 mA, the sound generation component 11 may provide a maximum sound pressure of not less than 83 dB to the ear canal. In addition, in the frequency range of 300 Hz-4000 Hz, by adopting the design of extending a portion of the sound generation component 11 into the concha cavity, when the input current of the transducer does not exceed 35.3 mA, the maximum sound pressure provided by the sound generation component 11 to the ear canal may be not less than 79 dB; in the frequency range of 700 Hz-1500 Hz, by adopting the design of extending a portion of the sound generation component 11 into the concha cavity, when the input current of the transducer does not exceed 35.3 mA, the maximum sound pressure provided by the sound generation component 11 to the ear canal may be not less than 75 dB; and in the frequency range of 2500 Hz-4000 Hz, by adopting the design of extending a portion of the sound generation component 11 into the concha cavity, when the input current of the transducer does not exceed 32.4 mA, the maximum sound pressure provided by the sound generation component 11 to the ear canal may be not less than 75 dB.

Figure 17:
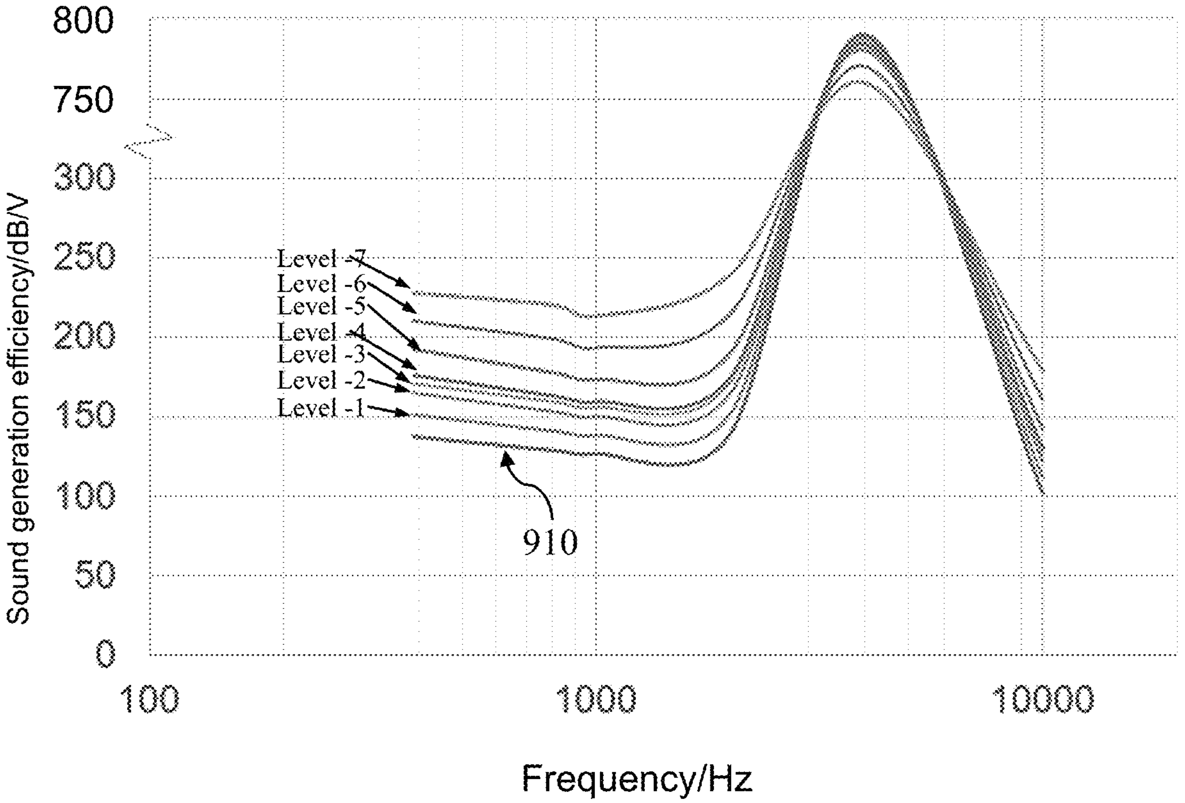
FIG. 17 is a graph illustrating sound generation efficiency-frequency curves corresponding to FIG. 8.

In some embodiments, a ratio of the sound pressure provided by the sound generation component 11 to the ear canal to the input voltage of the transducer (also referred to as a sound generation efficiency of the sound generation component 11) may also reflect the sound output efficiency of the sound generation component 11. FIG. 17 is a graph illustrating sound generation efficiency-frequency curves corresponding to FIG. 8. A horizontal coordinate represents the frequency in Hz, and a vertical coordinate represents a sound generation efficiency of the sound generation component 11 in dB/V. A solid line 910 in FIG. 17 represents the sound generation efficiency of the sound generation component 11 of the earphone 10 when a playback device outputs an output signal of a maximum sound volume level, and the other solid lines represent the sound generation efficiencies of the sound generation component 11 when the transducer plays signals of different frequencies when the playback device has smaller volume levels (minus one level to minus seven level).

As may be seen from FIG. 17, at least in a certain frequency range, by adopting a design of extending a portion of the sound generation component 11 into the concha cavity, and controlling a ratio of the distance h1 between the centroid O of the first projection and the highest point A1 of the second projection in the vertical axis direction to the height h of the second projection in the vertical axis direction to be between 0.35 and 0.6, the sound generation efficiency of the sound generation component 11 may be not less than 100 dB/V.

Exemplarily, taking a frequency of 1000 Hz as an example, as may be seen from the solid line 910 in FIG. 17, by adopting the design of extending a portion of the sound generation component 11 into the concha cavity, the sound generation efficiency of the sound generation component 11 at a frequency of 1000 Hz is 128 dB/V. In addition, when the frequency is 500 Hz, the sound generation efficiency of the sound generation component 11 is 140 dB/V. When the frequency is 800 Hz, by adopting the design of extending a portion of the sound generation component 11 into the concha cavity, the sound generation efficiency of the sound generation component 11 is 130 dB/V. When the frequency is 2000 Hz, by adopting the design of extending a portion of the sound generation component 11 into the concha cavity, the sound generation efficiency of the sound generation component 11 is 141 dB/V.

Continuing to refer to FIGS. 8 and 17, in a frequency range of 500 Hz-2000 Hz, by adopting the design of extending a portion of the sound generation component 11 into the concha cavity, the sound generation efficiency of the sound generation component 11 is not less than 120 dB/V. Referring to the solid lines corresponding to other sound volume levels, by adopting the design of extending a portion of the sound generation component 11 into the concha cavity, the sound generation efficiency of the sound generation component 11 is between 100 and 250 dB/V. At a frequency of 10,000 Hz, by adopting the design of extending a portion of the sound generation component 11 into the concha cavity, the sound generation efficiency is not less than 100 dB/V. In addition, by adopting the design of extending a portion of the sound generation component 11 into the concha cavity, the sound generation component 11 may be able to generate a high sound pressure within the ear canal with a frequency of 3000 Hz-5000 Hz at a lower input voltage.

It may be seen that, in the wearing mode of extending a portion of the sound generation component 11 into the concha cavity, the sound generation component 11 may obtain a higher sound generation efficiency in a specific frequency range (e.g., 500 Hz-4000 Hz).

In some embodiments, a higher sound generation efficiency helps to reduce and optimize volumes and masses of the sound generation component 11 and the battery compartment 13, which can provide users with a more comfortable wearing feeling while ensuring a listening effect.

Specifically, if the sound pressure provided by the sound generation component 11 to the ear canal is too low, the listening effect may be reduced, which leads to a lower listening volume for the user, making the user more susceptible to environmental sounds. To obtain a greater sound pressure, usually a size of the transducer needs to be added, or the input voltage of the transducer needs to be improved. However, increasing the size of the transducer may lead to a bulky structure of the sound generation component 11, and increasing the input voltage of the transducer may shorten a battery life of the earphone 10 without increasing a volume of the battery. If the volume of the battery is increased to ensure the battery life, the volumes, and the masses of the battery compartment 13 and the earphone 10 may be further increased, which affects the wearing feeling of the earphone.

Combining FIGS. 3A and 10A, when the earphone 10 is in the wearing state, the battery compartment 13 and the sound generation component 11 may form a lever-like structure with a position on the ear hook as a fulcrum. If the mass of the sound generation component 11 is too great or too small, the lever-like structure may be unstable, and the earphone 10 may be worn in an unstable state. An excessive mass of the sound generation component 11 may affect a fit between the battery compartment 13 and an auricle, and affect the cavity-like structure formed by the sound generation component 11 and the concha cavity, thereby reducing the listening volume in the ear canal. On the basis of improving the sound output efficiency of the sound generation component 11, the mass of the transducer may be reduced, thereby reducing the mass of the sound generation component 11. It may be understood that although reducing the mass of the transducer may reduce the mass of a magnetic circuit component, thereby reducing the sound pressure output by the transducer, the wearing mode of extending a portion of the sound generation component 11 into the concha cavity or the wearing mode of disposing at least a portion of the sound generation component 11 at the antihelix region may increase the sound pressure in the ear canal to compensate for an impact of reducing the mass of the transducer on the sound pressure. Of course, a too small mass of the sound generation component 11 may result in an insufficient sound pressure output by the transducer. Therefore, to balance the wearing stability of the earphone 10 and the listening effect, in some embodiments, the mass of the sound generation component 11 may be in a range of 3 g-6 g.

If the size of the sound generation component 11 in the short axis direction Z and the size of the sound generation component 11 in the long axis direction Y are too great, the opening of the ear canal may be blocked, a communication between the opening of the ear canal and the external environment may not be realized, and an original intention of the design of the earphone 10 may be failed. On the basis of improving the sound output efficiency of the sound generation component 11, the volume of the transducer may be reduced, thereby reducing the size of the sound generation component 11. It may be understood that although reducing the size of the transducer may reduce the sound pressure output by the transducer, the wearing mode of extending a portion of the sound generation component 11 into the concha cavity or the wearing mode of disposing at least a portion of the sound generation component 11 at the antihelix may enhance the sound pressure in the ear canal to compensate for the impact of reducing the mass of the transducer on the sound pressure. Of course, if the volume of the sound generation component 11 is too small, the transducer may be unable to output sufficient sound pressure, especially, the transducer may not be able to generate sufficient sound pressure by pushing air in middle and low frequency ranges. In some embodiments, to balance the communication between the opening of the ear canal and the external environment and the listening effect, when a portion of the sound generation component 11 extends into the concha cavity, the size of the sound generation component 11 in the short axis direction Z may be in a range of 9 mm-18 mm, and the size of the sound generation component 11 in the long axis direction Y may be in a range of 15 mm-35 mm. In some embodiments, the size of the sound generation component 11 in the short axis direction Z may be in a range of 11 mm-16 mm, and the size of the sound generation component 11 in the long axis direction Y may be in a range of 20 mm-31 mm.

In some embodiments, the size of the sound generation component 11 in the long axis direction Y may be obtained in the following manner: a short axis center plane of the magnetic circuit assembly may be obtained. The short axis center plane may be a plane passing the central axis of the magnetic circuit assembly and perpendicular to the long axis direction Y of the sound generation component 11; a tangent plane tangent to the end FE of the sound generation component 11 and parallel to the above-mentioned short axis center plane may be determined; and a distance between the short axis center plane to the tangent plane may be regarded as half the size of the sound generation component 11 in the long axis direction Y. It may be noted that the size of the sound generation component 11 in the short axis direction Z may be determined in a similar manner.

In some embodiments, a thickness of the sound generation component 11 may affect the position of a center of mass of the sound generation component 11, and the position of the center of mass of the sound generation component 11 may affect the wearing stability of the earphone 10. For example, when the thickness of the sound generation component 11 is too great, the center of mass of the sound generation component 11 may move away from the ear, which in turn affects the fit of the sound generation component 11 to the concha cavity. On the basis of improving the sound output efficiency of the sound generation component 11, the thickness of the transducer may be reduced so as to reduce the thickness of the sound generation component 11. It may be understood that although reducing the thickness of the transducer may reduce a magnetic field intensity provided by the magnetic circuit assembly, thereby affecting the sound pressure output by the transducer, while the wearing mode of extending a portion of the sound generation component 11 into the concha cavity or disposing at least a portion of the sound generation component 11 at the antihelix may increase the sound pressure in the ear canal, so as to compensate for the effect of reducing the thickness of the transducer on the sound pressure. Of course, too small thickness of the sound generation component 11 may also result in too small thickness of the magnetic circuit assembly in the transducer, which is unable to provide sufficient magnetic field intensity. In addition, when the volume of the sound generation component 11 remains unchanged, increasing the thickness of the sound generation component 11 may cause the size of the sound generation component 11 to decrease in the long axis direction Y and/or the short axis direction Z, thereby causing the size of a diaphragm or the size of a sound coil to decrease, which in turn affects the output sound pressure of the transducer. In some embodiments, to balance the stability of wearing the earphone 10 and the listening effect, the sound generation component 11 may have a size between 8 mm and 17 mm in the thickness direction.

In some embodiments, the size of the sound generation component 11 in the thickness direction may also affect the size of the inside (e.g., the front cavity and the rear cavity) of the sound generation component 11 in the thickness direction. To make a resonant peak of the sound provided by the sound generation component 11 to the ear canal at a position where the sound generation efficiency of the transducer is higher (e.g., at a frequency above 1000 Hz), so as to obtain a better listening effect, in some embodiments, the size of the sound generation component 11 in the thickness direction may be in a range of 9 mm-14 mm.

In some embodiments, there may be a great correlation between the volume of the sound generation component 11 and the volume of the transducer. If the volume of the sound generation component 11 is relatively small, accordingly, the volume of the transducer provided inside the sound generation component 11 may also be relatively small, resulting in a low efficiency of the sound generated by the air inside the housing of the sound generation component 11 pushed by the diaphragm of the transducer, thereby affecting the acoustic output effect of the earphone 10, which in turn leads to a reduction of the sound pressure provided by the sound generation component 11 to the ear canal. If the volume of the sound generation component 11 is too great, the sound generation component 11 may exceed the range of the concha cavity and fail to extend into the concha cavity, and the cavity-like structure may not be formed, or a total size of the gap formed between the sound generation component 11 and the concha cavity may be very great, which affects the listening volume at the opening of the ear canal and the sound leakage reduction effect in the far field when the user wears the earphone 10. In some embodiments, the volume of the sound generation component 11 may be in a range of 3500 $mm^3$-5200 $mm^3$.

In some embodiments, the volume of the sound generation component 11 may be determined by multiplying a projection of the sound generation component 11 on a reference plane, such as the sagittal plane of the human body, by a maximum size of the sound generation component 11 in the thickness direction. Or, considering that the sound generation component 11 may have an irregular outer contour, the volume of the sound generation component 11 may be determined by obtaining the maximum sizes of the sound generation component 11 in the long axis direction Y, the short axis direction X, and the thickness direction Z, respectively, and constructing, based on the sizes, a first cuboid. In addition, by obtaining the minimum sizes of the sound generation component 11 in the long axis direction Y, the short axis direction X, and the thickness direction Z, respectively, a second cuboid may be constructed. It may be appreciated that the actual volume of the sound generation component may be less than the volume of the first cuboid but greater than the volume of the second cuboid, and an actual volume range of the sound generation component 11 may be determined by calculating the volume of the first cuboid and the volume of the second cuboid. For example, in some embodiments, if the volume of the first cuboid is 5500 $mm^3$ and the volume of the second cuboid is 2800 $mm^3$, the volume of the sound generation component 11 may be between 2800 $mm^3$ and 5500 $mm^3$.

In some embodiments, the volume of the sound generation component 11 may be obtained in a drainage manner. Specifically, each opening of the sound generation component 11 may be sealed (e.g., the opening where the sound generation component 11 is connected to the ear hook) by a sealing material to form an airtight space inside the sound generation component 11. Then the sound generation component 11 may be placed into water. The volume of the sound generation component 11 may be determined based on the volume of discharged water (or an approximation thereof). It should be noted that, considering the fact that the sealing material has a certain volume, when obtaining the volume of the sound generation component 11 in the drainage manner, the actual volume may be slightly reduced based on experience, so as to exclude the interference of the sealing material on the volume.

In some embodiments, the volume of the sound generation component 11 may be reduced while increasing the sound output efficiency of the sound generation component 11. It may be appreciated that although reducing the volume of the sound generation component 11 reduces the sound pressure output from the transducer, by adopting the wearing mode of extending a portion of the sound generation component 11 into the concha cavity, or the wearing mode of disposing at least a portion of the sound generation component 11 at the antihelix, the sound pressure in the ear canal may be increased so as to compensate for the impact of reducing the volume of the sound generation component 11 on the sound pressure. In order to make the sound generation component 11 provide a maximum sound pressure of not less than 75 dB into the ear canal at least in a certain frequency range at a lower voltage (e.g., no more than 0.6 V), in some embodiments, the volume of the sound generation component 11 may be between 3300 $mm^3$ and 4800 $mm^3$.

The battery compartment 13 may be provided with a battery electrically connected to the sound generation component 11, and in some embodiments, the battery compartment 13 may be located at an end of the first portion 121 away from the sound generation component 11. It should be noted that the mass of the battery compartment 13 mainly comes from the mass of the batteries, and in the present disclosure, "the mass of the battery compartment" refers to a sum of the mass of a battery compartment body and the mass of the batteries. As mentioned above, when the earphone 10 is in the wearing state, the battery compartment 13 and the sound generation component 11 may form a lever-like structure with a certain position on the ear hook as the fulcrum. Therefore, if the mass of the battery compartment 13 is too great or too small, the lever structure may be unstable, thereby causing an unstable wearing of the earphone 10. Specifically, if the mass of the battery compartment 13 is too great, the earphone 10 may incline toward a back side of the auricle when worn, which affects the fit of the sound generation component 11 to the concha cavity. On the basis of improving the sound output efficiency of the sound generation component 11, the output power of the battery may be reduced, thereby reducing the mass of the battery. It may be understood that although reducing the mass of the battery may decrease the output power of the battery, the wearing mode of extending a portion of the sound generation component 11 into the concha cavity may increase the sound pressure in the ear canal, thereby compensating for the impact of reducing the mass of the battery on the sound pressure. Of course, if the mass of the battery compartment 13 is too small, the earphone 10 may incline toward the front of the ear when worn by the user, and the battery may be unable to drive the transducer. For example, in some embodiments, to balance the wearing stability and the listening effect of the earphone 10, the mass of the battery may be between 1.2 g-3.1 g.

In some embodiments, the mass of the battery may be directly proportional to a power of the battery. In some embodiments, a too small mass of the battery compartment 13 may affect the battery life of the earphone 10. In a situation of low input voltage or input power, and in a specific frequency range, the maximum sound pressure the sound generation component 11 can provide to the ear canal may be not less than 75 dB, that is, when the battery life is unchanged, the demand of the transducer on the power may be reduced. Accordingly, in some embodiments, the mass of the battery may be reduced such that the mass of the battery compartment 13 is between 1.1 g and 2.3 g.

Based on the description above about the masses of the sound generation component 11 and the battery compartment 13, when the masses of the sound generation component 11 and the battery compartment 13 are kept within a certain ratio range, the earphone 10 may have a good wearing feeling and listening effect. In some embodiments, in the wearing mode of extending a portion of the sound generation component 11 into the concha cavity, a ratio between the mass of the battery compartment 13 and the mass of the sound generation component 11 may be between 0.16-0.7. In some embodiments, the stable wearing of the earphone 10 may make the relative positions of the sound guiding hole 115 to the ear canal of the user less prone to shifting to allow the sound generation component 11 to provide a higher sound pressure to the ear canal of the user. Therefore, in some embodiments, to further improve the wearing stability of the earphone 10, under the wearing mode of extending a portion of the sound generation component 11 into the concha cavity, the ratio of the mass of the battery compartment 13 to the mass of the sound generation component 11 may be in the range of 0.2-0.6.

The volume of the battery compartment 13 may be positively correlated to the volume of the battery. In some embodiments, the volume of the battery compartment 13 may be in a range of 850 $mm^3$-1900 $mm^3$ in the wearing mode of extending a portion of the sound generation component 11 into the concha cavity to ensure the battery life of the earphone 10. In some embodiments, the demand of the transducer for the battery power may be reduced on the basis of improving the sound output efficiency of the sound generation component 11. Therefore, in the wearing mode of extending a portion of the sound generation component 11 into the concha cavity, the volume of the battery compartment 13 may be smaller. The volume of the battery compartment 13 may be between 750 $mm^3$ and 1600 $mm^3$.

In some embodiments, to ensure a battery life of the earphone 10, in the wearing mode of disposing a portion of the sound generation component 11 at the antihelix, the volume of the battery compartment 13 may be in a range of 600 $mm^3$ to 2200 $mm^3$. Disposing at least a portion of the sound generation component 11 at the antihelix may also increase the sound pressure in the ear canal, so as to compensate for the reduction of the effect of the quality of the battery on the sound pressure. Therefore, in some embodiments, in the wearing mode of disposing a portion of the sound generation component 11 at the antihelix, the volume of the battery compartment may be in a range of 750 $mm^3$-2000 $mm^3$.

Figure 18:
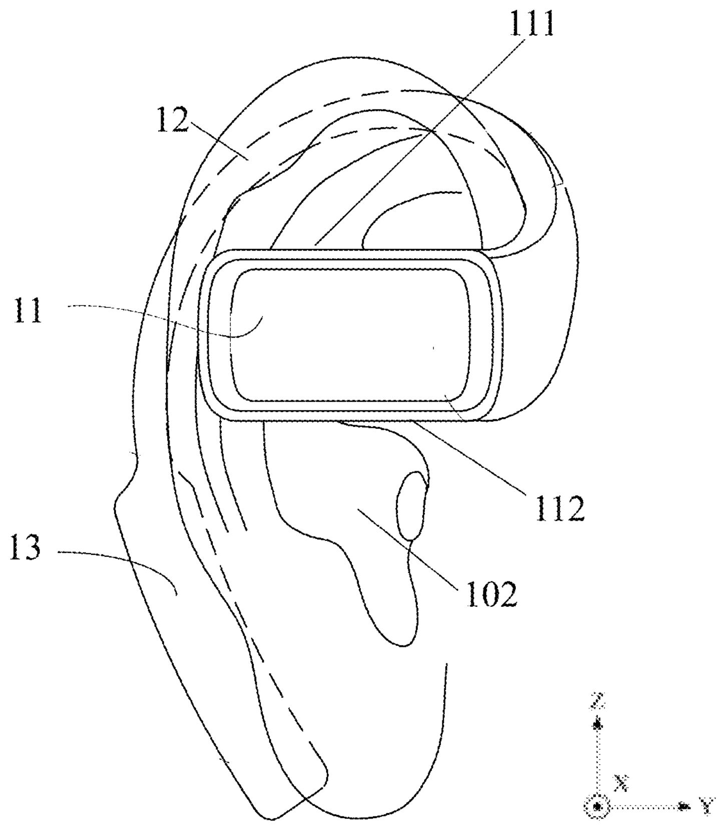
FIG. 18 is a schematic diagram illustrating an exemplary wearing of an earphone according to some other embodiments of the present disclosure.

FIG. 18 is a schematic diagram illustrating an exemplary wearing of an earphone according to some other embodiments of the present disclosure.

In some embodiments, the sound generation component may have other wearing modes that differ from extending into the concha cavity in FIG. 3A, which is able to achieve a good sound output efficiency. The following detailed description are based on the example of the earphone 10 shown in FIG. 18.

In some embodiments, when the earphone is in a wearing state, at least portion of the sound generation component 11 may cover an antihelix region of the user. At this time, the sound generation component 11 may be disposed above the concha cavity 102 and an opening of the ear canal, and the opening of the ear canal of the user may be in an open state. In some embodiments, a housing of the sound generation component 11 may include at least one sound guiding hole and at least one pressure relief hole. The sound guiding hole may be acoustically coupled with a front cavity of the earphone 10, and the pressure relief hole may be acoustically coupled with a rear cavity of the earphone 10. A sound output from the sound guiding hole and the sound output by the pressure relief hole may be approximately regarded as two sound sources, and the sounds from the two sound sources may have opposite phases. When the user wears the earphone, the sound guiding hole may be disposed on a sidewall of the sound generation component 11 facing or close to the opening of the ear canal of the user, and the pressure relief hole may be disposed on the sidewall of the sound generation component 11 away from or depart from the opening of the ear canal of the user. At this time, the sound generation component 11 and an auricle of the user may form a baffle-like structure. The sound source corresponding to the sound guiding hole may be disposed on one side of the baffle, and the sound source corresponding to the pressure relief hole may be disposed on the other side of the baffle after bypassing the sound generation component 11 and the auricle of the user, thereby forming the acoustic model shown in FIG. 21. As shown in FIG. 21, when a baffle is provided between a sound source A1 and a sound source A2, in a near field, a sound field of the sound source A2 needs to bypass the baffle to interfere with sound waves of the sound source A1 at the listening position, which is equivalent to increasing a sound path from the sound source A2 to the listening position. As a result, assuming that the sound source A1 and the sound source A2 have the same amplitude, an amplitude difference between the sound waves of the sound source A1 and the sound source A2 at the listening position may be increased compared to the situation where the baffle is not provided, and thus a cancellation degree of the two sounds at the listening position may be reduced, resulting in an increase in a sound volume at the listening position. In the far field, as the sound waves generated by the sound source A1 and the sound source A2 may interfere without bypassing the baffle in a greater spatial range (similar to the situation of no baffle is provided), compared with the situation where no baffle is disposed, a sound leakage in the far field may not increase significantly. Therefore, disposing the baffle structure around one of the sound sources A1 and A2 may significantly increase the sound volume at the listening position in the near field without significantly increasing the sound leakage in the far field.

In a specific application scenario, by covering at least a portion of the sound generation component 11 on the anti-helix region of the user, the user may hear a greater listening volume when wearing the earphone. The mode may also make the sound generation component 11 have a relatively high sound output efficiency.

Figure 20A:
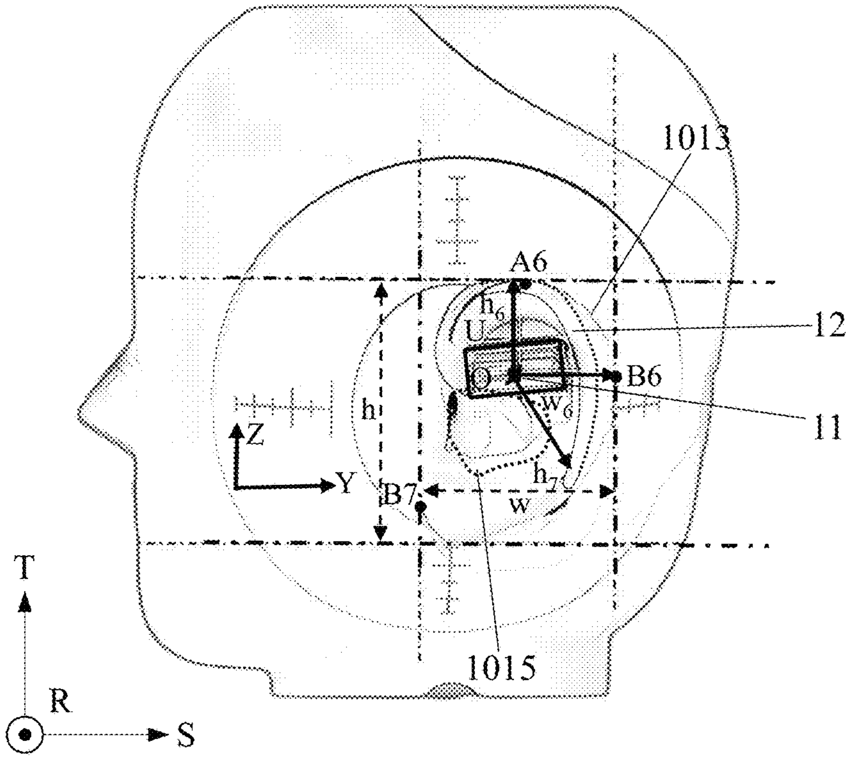
FIG. 20A is a schematic diagram illustrating an exemplary wearing of an earphone according to some other embodiments of the present disclosure.
Figure 20B:
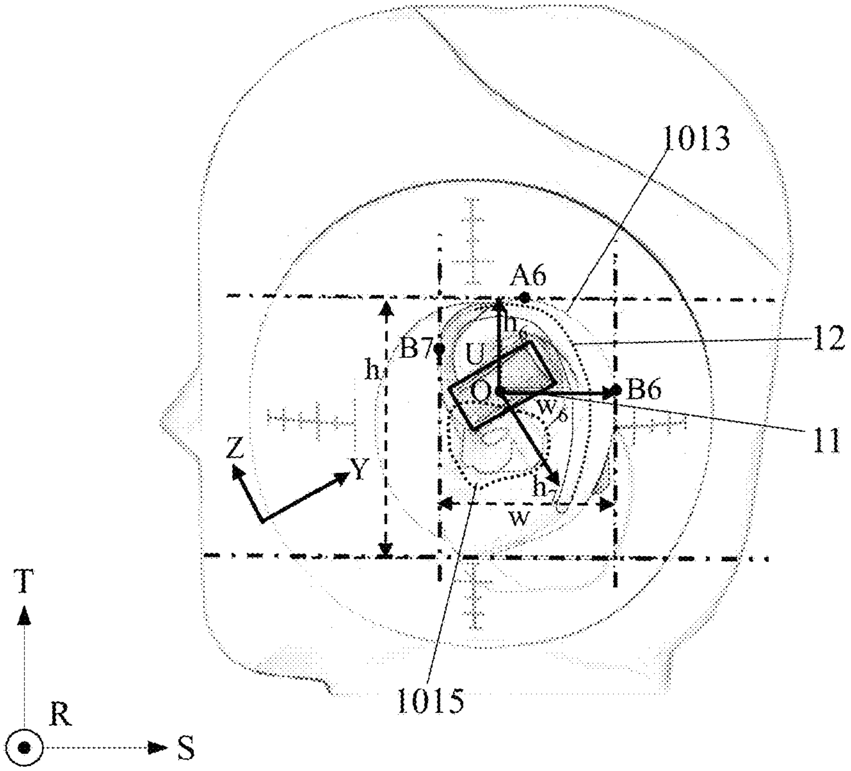
FIG. 20B is a schematic diagram illustrating an exemplary wearing of an earphone according to some other embodiments of the present disclosure.

FIGS. 20A and 20B are schematic diagrams illustrating exemplary wearing of an earphone according to some other embodiments of the present disclosure. As shown in FIGS. 20A and 20B, in some embodiments, a sound generation component may be substantially parallel with or inclined at an angle relative to a horizontal direction when the earphone 10 is in a wearing state. In some embodiments, when the earphone 10 is in the wearing state, the sound generation component 11 may have a first projection (the rectangular region in the solid line box U shown in FIGS. 20A and 20B may be approximately equivalent to the first projection) on a sagittal plane of a user's head (e.g., referring to an S-T plane of FIGS. 20A and 20B), and an auricle of the user may have, a second projection on the sagittal plane. To make a whole or a portion of the structure of the sound generation component 11 to cover the antihelix region of the user (e.g., at positions of the antihelix, the triangular fossa, the upper crus of helix, or the lower crus of helix). A ratio of a distance h6 between the centroid O of the first projection and a highest point A6 of the second projection in the vertical axis direction (e.g., the T axis direction shown in FIGS. 20A and 20B) to the height h of the second projection in the vertical axis direction may be between 0.25 and 0.4, and a ratio of a distance w6 between the centroid O of the first projection U and an end point B6 of the second projection in the sagittal axis direction (e.g., the S axis direction shown in FIGS. 20A and 20B) to a width w of the second projection on the sagittal axis direction may be in a range of 0.4-0.6.

Considering that the sidewall of the sound generation component 11 may abut against the antihelix region, the sound generation component 11 may abut against a larger region of the antihelix region such that a concave-convex structure of the region may also act as a baffle to increase a sound path of the sound transmitted from a pressure relief hole to the external ear canal 101, thereby increasing a sound path difference between the sound guiding hole and the pressure relief hole to the external ear canal 101, increasing a sound intensity at the external ear canal 101, and reducing a sound volume of the far-field sound leakage. Accordingly, to balance the listening volume and the sound leakage volume of the sound generation component 11 to ensure an acoustic output quality of the sound generation component 11, the sound generation component 11 may be fit as closely as possible to the antihelix region of the user. Correspondingly, the ratio of the distance h6 between the centroid O of the first projection of the sound generation component 11 on the sagittal plane of the user's head and the highest point A6 of the second projection of the user's auricle on the sagittal plane in the vertical axis direction to the height h of the second projection in the vertical axis direction may be between 0.25 and 0.4, and the ratio of the distance w6 between the centroid O of the first projection of the sound generation component 11 on the sagittal plane and the end point B6 of the second projection of the auricle of the user on the sagittal plane in the sagittal axis direction to the width w of the second projection in the sagittal axis direction may be between 0.4 and 0.6. In some embodiments, to ensure the acoustic output quality of the sound generation component 11 while enhancing the wearing comfort of the earphone, the ratio of the distance h6 between the centroid O of the first projection of the sound generation component 11 on the sagittal plane of the user's head and the highest point A6 of the second projection of the user's auricle on the sagittal plane in the vertical axis direction to the height h of the second projection in the vertical axis direction may be between 0.25 and 0.35, and the ratio of the distance w6 between the centroid O of the first projection of the sound generation component 11 on the sagittal plane and the end point B6 of the second projection of the auricle of the user on the sagittal plane in the sagittal axis direction to the width w of the second projection in the sagittal axis direction may be between 0.42 and 0.6. In some embodiments, the ratio of the distance h6 between the centroid O of the first projection of the sound generation component 11 on the sagittal plane of the user's head and the highest point A6 of the second projection of the user's auricle on the sagittal plane in the vertical axis direction to the height h of the second projection in the vertical axis direction may be between 0.25 and 0.34, and the ratio of the distance w6 between the centroid O of the first projection of the sound generation component 11 on the sagittal plane and the end point B6 of the second projection of the auricle of the user on the sagittal plane in the sagittal axis direction to the width w of the second projection in the sagittal axis direction may be between 0.42 and 0.55, so as to ensure that the sound generation component 11 has a better acoustic output quality.

Similarly, when shapes and the sizes of the ears of the users are different, the ratio may fluctuate within a certain range. Exemplarily, when the user's earlobes are longer, the height h of the second projection in the vertical axis direction may be greater compared to a general case, and at this time, when the user wears the earphone 10, the ratio of the distance h6 between the centroid O of the first projection of the sound generation component 11 on the sagittal plane of the user's head and the highest point A6 of the second projection of the user's auricle on the sagittal plane in the vertical axis direction may be smaller, for example, the ratio may be between 0.2 and 0.35. Similarly, in some embodiments, when a helix of the user is in a forward curved shape, the width w of the second projection in the sagittal axis direction may be smaller compared to the general situation, and the distance w6 between the centroid O of the first projection and the end point B6 of the second projection in the sagittal axis direction may also be smaller. At this time, when the user wears the earphone 10, the ratio of the distance w6 between the centroid O of the first projection and the end point B6 of the second projection in the sagittal axis direction to the width w of the second projection in the sagittal axis direction may be greater, for example, the ratio may be in a range of 0.4-0.7.

In some embodiments, for the wearing mode of disposing at least a portion of the sound generation component 11 at the antihelix shown in FIG. 21, by adopting the design of disposing at least a portion of the sound generation component 11 at the antihelix, the antihelix and a housing of the sound generation component 11 may equivalently form the baffle ss shown in FIG. 21. The baffle may attenuate the sound transmitted from the pressure relief hole to the ear canal (e.g., the sound source A2 in FIG. 21), so that a degree of phase cancellation of the sound at the ear canal is attenuated, and the sound heard by the user (e.g., the sound source A1 in FIG. 21) is louder, that is to say, the sound generation component 11 may provide greater sound pressure into the ear canal. In some embodiments, in a specific frequency range, when the input voltage of the transducer does not exceed 0.6 V, the maximum sound pressure provided by the sound generation component 11 to the ear canal may be not less than 70 dB Exemplarily, at a frequency of 1000 Hz, by adopting the design of disposing at least a portion of the sound generation component at the antihelix, in the wearing mode of disposing at least a portion of the sound generation component at the antihelix, when the input voltage of the transducer does not exceed 0.6 V, the maximum sound pressure provided by the sound generation component 11 to the ear canal may be not less than 72 dB, and when the input voltage of the transducer does not exceed 0.4 V, the maximum sound pressure provided by the sound generation component 11 to the ear canal may not be less than 70 dB. In a frequency range of 300 Hz-4000 Hz, by adopting a design of disposing at least one portion of the sound generating component 11 at the antihelix, when the input voltage of the transducer does not exceed 0.6 V, the maximum sound pressure provided by the sound generation component 11 to the ear canal may be not less than 73 dB. In a frequency range of 700 Hz-1500 Hz, by adopting a design of disposing at least one portion of the sound generating component 11 at the antihelix, when the input voltage of the transducer does not exceed 0.6 V, the maximum sound pressure provided by the sound generation component 11 to the ear canal may be not less than 71 dB.

In some embodiments, to enable the sound generation component 11 to provide a greater sound pressure into the ear canal, by adopting a design of disposing at least one portion of the sound generating component 11 at the antihelix, the ratio of the distance h6 between the centroid O of the first projection and a highest point A6 of the second projection in the vertical axis direction to the height h of the second projection in the vertical axis direction may be between 0.25 and 0.4, from another perspective, while ensuring a sufficient sound pressure provided to the ear canal, by controlling the position of the sound-generation component 11 relative to the ear in the vertical axis direction, a reliance of the transducer on the high voltage, great current, or high power may be reduced. In such a situation, in a specific frequency range, when the input voltage of the transducer does not exceed 0.6 V, the maximum sound pressure provided by the sound generation component 11 to the ear canal may be not less than 70 dB.

In some embodiments, by controlling the position of the sound generation component 11 relative to the ear in the sagittal axis direction, e.g., by controlling the ratio of the distance h6 between the centroid O of the first projection and the highest point A6 of the second projection to the height h of the second projection in the vertical axis direction between 0.25 and 0.4, the sound pressure provided by the sound generation component 11 into the ear canal may be further improved. Merely by way of example, by adopting a design of covering at least a portion of the sound generation component 11 on the antihelix of the user, the ratio of the distance w6 between the centroid O of the first projection and the end point B6 of the second projection in the sagittal axis direction to the width w of the second projection in the sagittal axis direction may be between 0.4 and 0.6. In this way, in a specific frequency range, when the input voltage of the transducer does not exceed 0.6 V, the maximum sound pressure provided by the sound generation component 11 to the ear canal may be not less than 70 dB.

When the input voltage of the transducer reduces, the sound pressure that the sound generation component 11 can provide to the ear canal may reduce accordingly. By optimizing the volumes, the masses, and the sizes of the sound generation component 11 and the battery compartment 13, even if the input voltage of the transducer is reduced, a suitable sound pressure may be generated in the ear canal.

In some embodiments, the sound output efficiency of the sound generation component 11 may be improved by adopting the design of extending a portion of the sound generation component 11 into the concha cavity or covering at least a portion of the sound generation component 11 on the antihelix. On this basis, relevant parameters such as the volumes and the masses of the sound generation component 11 and the battery compartment 13 may be optimized (e.g., the mass of the battery and/or the mass of the sound generation component 11 may be reduced). As a result, while ensuring the listening effect, a more comfortable wearing feeling may be provided for the user.

In some embodiments, the listening volume, the sound leakage reduction effect, and the wearing comfort and stability of the sound generation 11 may also be improved by adjusting the distance between the centroid O of the first projection and the contour of the second projection. For example, when the sound generation component 11 is disposed at a top of the auricle, at an earlobe, at a facial region on the front side of the auricle, or between an inner contour of the auricle and an edge of the concha cavity, which is concretely reflected as that the distance between the centroid O of the first projection and a point in a certain region of an edge of the second projection is too small, and the distance between the centroid O of the first projection and a point in another region is too great, the antihelix region may be unable to cooperate with the sound generation component 11 to act as the baffle, thereby affecting the acoustic output effect of the earphone. In addition, if the distance between the centroid O of the first projection and the point of the certain region of the edge of the second projection is too great, a gap may be formed between the end FE of the sound generation component 11 and the inner contour 1014 of the auricle, and the sound from the sound guiding hole and the sound from the pressure relief hole may produce an acoustic short circuit in a region between the end FE of the sound generation component 11 and the inner contour 1014 of the auricle, resulting in a decrease in the listening volume at the opening of the ear canal of the user. The larger the region between the end FE of the sound generation component 11 and the inner contour 1014 of the auricle, the more significant the acoustic short circuit. In some embodiments, when the wearing mode of the earphone 10 is that at least a portion of the sound generation component 11 covers the antihelix region of the user, the centroid O of the first projection of the sound generation component 11 on the sagittal plane of the user's head may also be located in a region enclosed by the contour of the second projection. However, compared with extending a portion of the sound generation component 11 into the concha cavity, in the above wearing state, the distance between the centroid O of the first projection of the sound generation component 11 on the sagittal plane of the user's head and the contour of the second projection may be different. In the earphones shown in FIGS. 20A and 20B, at least a portion of the structure of the sound generation component 11 may cover the antihelix region, which allows the opening of the ear canal to be fully exposed, thereby enabling the user to better receive the sound from the external environment. In some embodiments, by adopting the design of covering at least a portion of the sound generation component 11 over the antihelix of the user, to balance the listening volume of the sound generation component 11, the effect of sound leakage reduction, the effect of receiving sound from the external environment, as well as to minimize the region between the end FE of the sound generation component 11 and the inner contour 1014 of the auricle, so as to make the sound generation component 11 have a better acoustic output quality, the distance between the centroid O of the first projection and the contour of the second projection may be in a range of 13 mm-54 mm. At this point, at least in a certain frequency range, when the input voltage of the transducer does not exceed 0.6 V, the maximum sound pressure provided by the sound generation component 11 to the ear canal may be not less than 70 dB. In some embodiments, the distance between the centroid O of the first projection of the sound generation component 11 on the sagittal plane of the user's head and the contour of the second projection may be in a range of 23 mm-40 mm. At this point, in a specific frequency range, when the input voltage of the transducer does not exceed 0.6 V, the maximum sound pressure provided by the sound generation component to the ear canal may be not less than 72 dB, so as to ensure the good listening effect of the earphone 10, and at the same time, the sound generating component 11 may be located substantially in the antihelix region of the user, which in turn makes at least a portion of the sound generation portion 11 form a baffle with the antihelix region to increase a sound path of the sound from the pressure relief hole to the external ear canal 101, thus increase a sound path difference between the sound guiding hole and the pressure relief hole to the external ear canal 101, thereby increasing the intensity of the sound at the external ear canal 101, and at the same time reducing the sound volume of the far-field sound leakage.

In some embodiments, when the wearing mode of the earphone 10 is at least a portion of the sound generation component 11 covering the antihelix region of the user, the centroid O of the first projection of the sound generation component 11 on the sagittal plane of the user may be located outside the projection region of the opening of the ear canal of the user on the sagittal plane. In this way, the opening of the ear canal may remain sufficiently open to better receive sound information from the external environment. The position of the centroid O of the first projection may be related to the size of the sound generation component, and when the size of the sound generation component 11 is too small in the long axis direction Y or the short axis direction Z, the volume of the sound generation component 11 may be relatively small, so that an area of the diaphragm provided inside may also be relatively small, resulting in a low efficiency of the diaphragm pushing the air inside the housing of the sound generation component 11 to generate the sound, thereby affecting the acoustic output effect of the earphone. When the size of the sound generation component 11 in the long axis direction Y is too great, the sound generation component 11 may exceed the auricle, and the inner contour of the auricle may not support and limit the sound generation component 11. As a result, the sound generation component 11 may be prone to falling off in the wearing state. When the size of the sound generation component 11 in the long axis direction Y is too small, there may be a gap between the end FE of the sound generation component 11 and the inner contour 1014 of the auricle. The sound generated by the sound guiding hole and the sound generated by the pressure relief hole may have an acoustic short circuit in the region between the end FE of the sound generation component 11 and the inner contour 1014 of the auricle. The acoustic short circuit may result in a low listening volume at the opening of the ear canal of the user. The greater the region between the end FE of the sound generation component 11 and the inner contour 1014 of the auricle, the more significant the acoustic short circuit. When the size of the sound generation component 11 in the short axis direction Z is too great, the sound generation component 11 may cover the opening of the ear canal of the user, affecting the user's access to the sound information in the external environment. In some embodiments, with the design of covering at least a portion of the sound generation component 11 over the user's antihelix, to make the sound generation component have a better acoustic output quality, when the earphone is in a wearing state, a distance between the centroid of the first projection of the sound generation component on the sagittal plane and the centroid of the projection of the opening of the ear canal of the user on the sagittal plane may be not greater than 25 mm. At this time, in a specific frequency range, when the input voltage of the transducer does not exceed 0.6 V, the maximum sound pressure provided by the sound generation component to the ear canal may be not less than 70 dB. In some embodiments, the distance between the centroid of the first projection of the sound generation component on the sagittal plane and the centroid of the projection of the opening of the ear canal of the user on the sagittal plane may be 5 mm-23 mm. In some embodiments, the distance between the centroid of the first projection of the sound generation component on the sagittal plane and the centroid of the projection of the opening of the ear canal of the user on the sagittal plane may be 8 mm-20 mm. In some embodiments, by controlling the distance between the centroid of the first projection of the sound generation component on the sagittal plane and the centroid of the projection of the opening of the ear canal of the user on the sagittal plane between 10 mm and 17 mm, in a specific frequency range, when the input voltage of the transducer does not exceed 0.6 V, the maximum sound pressure provided by the sound generation component to the ear canal may be not less than 72 dB. In this way, the centroid O of the first projection may be located approximately in the antihelix region of the user. As a result, not only is it possible to make the sound output by the sound generation component have a higher sound pressure and can be better transmitted to the user, but also to keep the opening of the ear canal fully open to obtain the sound information in the external environment, and at the same time, the inner contour of the auricle may also allow at least a portion of the sound generation component 11 to be subjected to a force that prevents the at least a portion of the sound generation component 11 from sliding downward, so that the wearing stability of the earphone 10 is improved. It may be noted that a shape of the projection of the opening of the ear canal on the sagittal plane may be approximately regarded as an ellipse, and correspondingly, the centroid of the projection of the opening of the ear canal on the sagittal plane may be a geometric center of the ellipse.

In addition, while ensuring that the ear canal is not blocked, it may also be considered that the size (especially the size along the long axis direction Y of the first projection) of the baffle formed by the sound generation component 11 and the antihelix region may be as great as possible, and an overall volume of the sound generation component 11 may not be too great or too small. Therefore, when the overall volume or the shape of the sound generation component 11 is determined, the wearing angle of the sound generation component 11 relative to the antihelix region also needs to be considered.

Figure 21A:
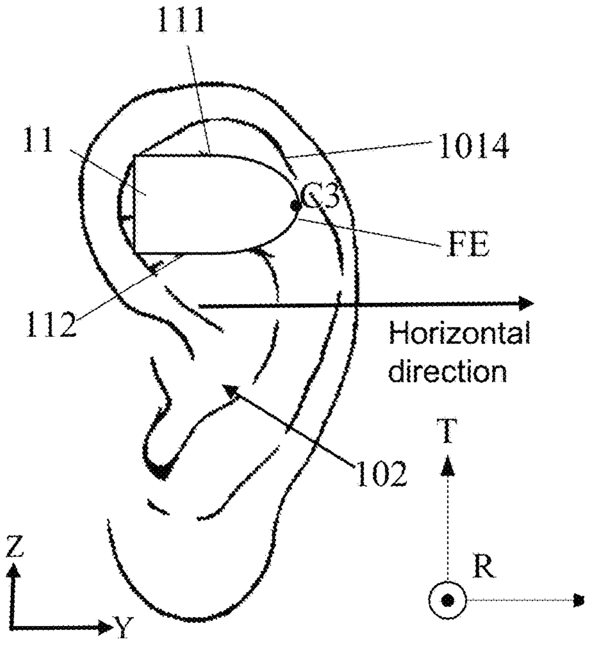
FIG. 21A is a schematic diagram illustrating different exemplary fitting positions of an earphone with an ear canal of a user according to the present disclosure.
Figure 21B:
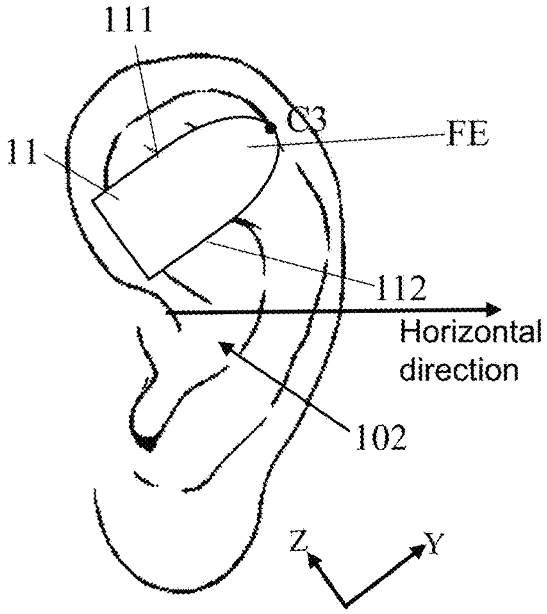
FIG. 21B is a schematic diagram illustrating different exemplary fitting positions of some other type of earphones to an ear canal of a user according to the present disclosure.
Figure 21C:
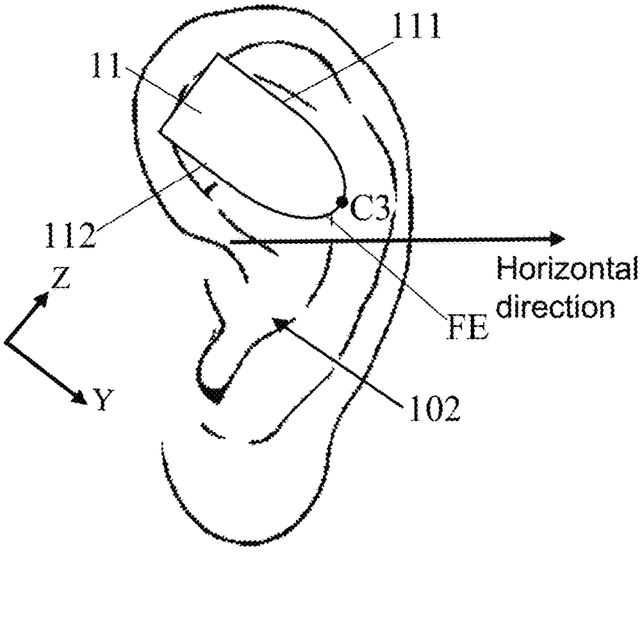
FIG. 21C is a schematic diagram illustrating of different exemplary fitting positions of some other types of earphones to an ear canal of a user according to the present disclosure.

FIGS. 21A-21C are schematic diagrams illustrating different exemplary fitting positions of an earphone with an ear canal of a user according to the present disclosure. Referring to FIG. 21A, in some embodiments, when the sound generation component 11 is a cuboid-like structure, the upper sidewall 111 or the lower sidewall 112 of the sound generation component 11 may be parallel to the horizontal plane (e.g., the ground plane) when the sound generation component 11 is in a wearing state. Referring to FIGS. 21B and 21C, in some embodiments, the upper side wall 111 or the lower side wall 112 of the sound generation component 11 may be inclined at an angle relative to the horizontal plane. Combining FIGS. 21A and 21B, when the sound generation component 11 is inclined upward relative to the horizontal plane, an excessive inclination angle of the upper side wall 111 or the lower side wall 112 of the sound generation component 11 relative to the horizontal plane may result in an excessive distance between a sound guiding hole of the sound generation component and an opening of the ear canal, thereby affecting a listening volume at the opening of the ear canal of the user. Combining FIGS. 21A and 21C, when the sound generation component is inclined downward relative to the horizontal direction, an excessive inclination angle of the upper side wall 111 or the lower side wall 112 of the sound generation component 11 relative to the horizontal plane may result in the sound generation component 11 covering the opening of the ear canal, thereby affecting the user's access to sound information in an external environment. Based on the above problem, in the wearing state, to make the opening of the ear canal of the user have a better listening effect, and at the same time, to ensure that the opening of the ear canal of the user is kept sufficiently open, in some embodiments, in the wearing state of the earphone 10, by adopting a design of disposing at least one portion of the sound generating component 11 at the antihelix, an inclination angle between the projection of the upper side wall 111 or the lower side wall 112 of the sound generation component 11 on the sagittal plane and the horizontal direction may be not greater than 40°. At this point, at least a portion of the sound generation component 11 and the antihelix region form a baffle to improve a sound intensity at the ear canal, so that in a specific frequency range, when the input voltage of the transducer does not exceed 0.6 V, the maximum sound pressure provided by the sound generation component to the ear canal may be not less than 70 dB. In some embodiments, in the wearing state of the earphone 10, an inclination angle between the projection of the upper sidewall 111 or the lower sidewall 112 of the sound generation component 11 on the sagittal plane relative to a horizontal direction may be not greater than 38°. In some embodiments, when the earphone 10 is in the wearing state, the inclination angle of the projection of the upper side wall 111 or the lower side wall 112 of the sound generation component 11 on the sagittal plane relative to the horizontal direction may be not greater than 25°. In some embodiments, when the earphone 10 is in the wearing state, the inclination angle of the projection of the upper side wall 111 or the lower side wall 112 of the sound generation component 11 on the sagittal plane relative to the horizontal direction may be not greater than 10°, so that at least a portion of the sound generation component 11 and the antihelix region may form a baffle, which is more conducive to increasing a sound intensity at the ear canal and ensure a good listening effect of the earphone 10.

It may be noted the inclination angle between the projection of the upper side wall 111 of the sound generation component 11 on the sagittal plane and the horizontal direction may be the same as or different from the inclination angle between the projection of the lower side wall 112 of the sound generation component 11 on the sagittal plane and the horizontal direction. For example, when the upper sidewall 111 and the lower sidewall 112 of the sound generation component 11 are parallel to each other, the inclination angle between the projection of the upper side wall 111 of the sound generation component 11 on the sagittal plane and the horizontal direction may be the same as the inclination angle between the projection of the lower side wall 112 of the sound generation component 11 on the sagittal plane and the horizontal direction. As another example, when the upper sidewall 111 and the lower sidewall 112 of the sound generation component 11 are not parallel to each other, or when one of the upper sidewall 111 and the lower sidewall 112 is a planar wall, and the other of the upper sidewall 111 and the lower sidewall 112 is a non-planar wall (e.g., a curved wall), the inclination angle between the projection of the upper side wall 111 of the sound generation component 11 on the sagittal plane and the horizontal direction may be different from the inclination angle between the projection of the lower side wall 112 of the sound generation component 11 on the sagittal plane and the horizontal direction. In addition, when the upper sidewall 111 or the lower sidewall 112 is a curved surface or a concave-convex surface, the projection of the upper sidewall 111 or the lower sidewall 112 on the sagittal plane may be a curve or a polyline. At this time, the inclination angle between the upper sidewall 111 on the sagittal plane and the horizontal direction may be an angle between a tangent of a point at which the curve or the polyline has the greatest distance relative to the ground plane and the ground plane, and the inclination angle between the lower sidewall 112 on the sagittal plane and the horizontal direction may be an angle between a tangent of a point at which the curve or the polyline has the smallest distance relative to the ground plane and the ground plane.

The whole or a portion of the structure of the sound generation component 11 may cover the antihelix region to form the baffle, and the listening effect when the user wears the earphone 10 may be related to the distance between the sound guiding hole and the pressure relief hole of the sound generation component 11. The closer the distance between the sound guiding hole and the pressure relief hole, the more the sounds generated by both holes are canceled out at the opening of the ear canal of the user, and the smaller the listening volume at the opening of the ear canal of the user. The distance between the sound guiding hole and the pressure relief hole may be related to the size of the sound generation component 11. For example, the sound guiding hole may be disposed on a sidewall (e.g., a lower sidewall or an inner sidewall) of the sound generation component 11 close to the opening of the ear canal of the user, and the pressure relief hole may be disposed on the sidewall (e.g., an upper sidewall or an outer sidewall) of the sound generation component 11 away from the opening of the ear canal of the user. Therefore, the size of the sound generation component may affect the listening volume at the opening of the ear canal of the user. For example, when the size is too great, a sense of pressure may be brought to most regions of the ear, thereby affecting the wearing comfort and convenience of the user when carrying around. In some embodiments, a distance between the midpoint of the projection of the upper 111 of the sound generation component 11 on the sagittal plane and the projection of the highest point of the second projection on the sagittal plane, as well as a distance between the midpoint of the projection of the lower sidewall 112 of the sound generation component 11 on the sagittal plane and the projection of the highest point of the second projection on the sagittal plane may be used to reflect the size of the sound generation component 11 in the short axis direction Z. Based on this, in order to ensure that the earphone 10 does not block the opening of the ear canal of the user while improving the listening effect of the earphone 10, in some embodiments, by adopting the design of covering at least a portion of the sound generation component 11 over the antihelix of the user, when the wearing mode of the earphone 10 is that at least a portion of the sound generation portion 11 covers the antihelix region of the user, the distance between the midpoint of the projection of the upper sidewall 111 of the sound generation component 11 on the sagittal plane and the highest point of the second projection may be in a range of 12 mm to 24 mm, and the distance between the midpoint of the projection of the lower sidewall 112 of the sound generation component 11 on the sagittal plane and the highest point of the second projection may be in a range of 22 mm to 34 mm. At this time, at least a portion of the sound generation component 11 may form a baffle with the antihelix region, which is more conducive to increasing the sound strength at the ear canal in a specific frequency range, so that when the input voltage of the transducer does not exceed 0.6 V, the maximum sound pressure provided by the sound generation component to the ear canal may be not less than 70 dB. In some embodiments, the distance between the midpoint of the projection of the upper sidewall 111 of the sound generation component 11 on the sagittal plane and the highest point of the second projection may be in a range of 12.5 mm to 23 mm, and the distance between the midpoint of the projection of the lower sidewall 112 of the sound generation component 11 on the sagittal plane and the highest point of the second projection may be in a range of 22.5 mm-33 mm. At this time, in a specific frequency range, when the input voltage of the transducer does not exceed 0.6 V, the maximum sound pressure provided by the sound generation component to the ear canal may be not less than 72 dB, so as to ensure a good listening effect and wearing comfort of the earphone 10. It should be noted that, when the projection of the upper side wall 111 of the sound generation component 11 on the sagittal plane is the curve or the polyline, the midpoint of the projection of the upper side wall 111 of the sound generation component 11 on the sagittal plane may be selected in the following exemplary manner. Two points of the projection of the upper sidewall 111 on the sagittal plane with the greatest distance in the long axis direction Y may be selected to make a line segment, and a midpoint on the line segment may be selected to make a midperpendicular, and a point where the midperpendicular intersects with the projection may be the midpoint of the projection of the upper sidewall 111 of the sound generation component 11 on the sagittal plane. In some alternative embodiments, a point of the projection of the upper sidewall 111 on the sagittal plane that has the smallest distance from the highest point of the projection of the second projection may be selected as the midpoint of the projection of the upper sidewall 111 of the sound generation component 11 on the sagittal plane. The midpoint of the projection of the lower side wall 112 of the sound generation component 11 on the sagittal plane may be selected in the same manner as described above. For example, a point of the projection of the lower sidewall 112 on the sagittal plane that has the greatest distance from the highest point of the projection of the second projection may be selected as the midpoint of the projection of the lower sidewall 112 of the sound generation component 11 on the sagittal plane.

In some embodiments, the size of the sound generation component 11 in the short axis direction Z may also be reflected by a distance between the midpoint of the projection of the upper sidewall 111 of the sound generation component 11 on the sagittal plane and the projection of an apex of the ear hook on the sagittal plane, as well as a distance between the midpoint of the projection of the lower sidewall 112 of the sound generation component 11 on the sagittal plane and the projection of the apex of the ear hook on the sagittal plane. To ensure that the earphone 10 does not block the opening of the ear canal of the user while improving the listening effect of the earphone 10, in some embodiments, by adopting the design of covering at least a portion of the sound generation component 11 over the antihelix of the user, the distance between the midpoint of the projection of the upper sidewall 111 of the sound generation component 11 on the sagittal plane and the projection of the apex of the ear hook on the sagittal plane may be in a range of 13 mm and 20 mm, and the distance between the midpoint of the projection of the lower sidewall 112 of the sound generation component 11 on the sagittal plane and the projection of the apex of the ear hook on the sagittal plane may be in a range of 22 mm-36 mm. At this point, in a specific frequency range, when the input voltage of the transducer does not exceed 0.6 V, the maximum sound pressure provided by the sound generation component to the ear canal may be not less than 70 dB. In some embodiments, the distance between the midpoint of the projection of the upper sidewall 111 of the sound generation component 11 on the sagittal plane and the projection of the apex of the ear hook on the sagittal plane may be in a range of 14 mm and 19.5 mm, and the distance between the midpoint of the projection of the lower sidewall 112 of the sound generation component 11 on the sagittal plane and the projection of the apex of the ear hook on the sagittal plane may be in a range of 22.5 mm-35 mm. In some embodiments, the distance between the midpoint of the projection of the upper sidewall 111 of the sound generation component 11 on the sagittal plane and the projection of the apex of the ear hook on the sagittal plane may be in a range of 15 mm and 18 mm, and the distance between the midpoint of the projection of the lower sidewall 112 of the sound generation component 11 on the sagittal plane and the projection of the apex of the ear hook on the sagittal plane may be in a range of 26 mm-30 mm. At this time, in a specific frequency range, when the input voltage of the transducer does not exceed 0.6 V, the maximum sound pressure provided by the sound generation component to the ear canal may be not less than 72 dB, so as to ensure a good listening effect and wearing comfort of the earphone 10.

Referring to FIG. 21A, in some embodiments, in the wearing state, the upper side wall 111 or the lower side wall 112 of the sound generation component 11 may be parallel or approximately parallel to the horizontal plane, and the end FE of the sound generation component 11 may be located between the inner contour 1014 of the auricle and an edge of the concha cavity 102, that is, the midpoint C3 of the projection of the end FE of the sound generation component 11 on the sagittal plane may be located between the projection of the inner contour 1014 of the auricle on the sagittal plane and the projection of the edge of the concha cavity 102 on the sagittal plane. As shown in FIGS. 21B and 21C, in some embodiments, the upper side wall 111 or the lower side wall 112 of the sound generation component 11 in the wearing state may also be inclined at an angle relative to the horizontal plane. As shown in FIG. 21B, the end FE of the sound generation component 11 may be inclined relative to a fixed end of the sound generation component 11 toward a region at the top of the auricle, and the end FE of the sound generation component 11 may abut against the inner contour 1014 of the auricle. As shown in FIG. 21C, the fixed end of the sound generation component 11 may be inclined toward the region of the top of the auricle relative to the end FE of the sound generation component 11, and the end FE of the sound generation component 11 may be disposed between the edge of the concha cavity 102 and the inner contour 1014 of the auricle, that is, the midpoint C3 of the projection of the end FE of the sound generation component 11 on the sagittal plane may be located between the projection of the inner contour 1014 of the auricle on the sagittal plane and the projection of the edge of the concha cavity 102 on the sagittal plane. In some embodiments, the midpoint C3 of the projection of the end FE of the sound generation component 11 on the sagittal plane may be located between the projection of the inner contour 1014 of the auricle on the sagittal plane and the projection of the edge of the concha cavity on the sagittal plane. In the wearing state, when a distance between the midpoint C3 of the projection of the end FE of the sound generation component 11 on the sagittal plane and the projection of the edge of the concha cavity 102 on the sagittal plane is too small, the end FE of the sound generation component 11 may not be able to abut against the inner contour 1014 of the auricle, and the inner contour 1014 may not limit the position of the sound generation component 11, making the sound generation component 11 easy to fall off. When the distance between the midpoint C3 of the projection of the end FE of the sound generation component 11 on the sagittal plane and the projection of the edge of the concha cavity 102 on the sagittal plane is too great, the sound generation component 11 may squeeze the inner contour of the auricle 1014, which causes discomfort to the user when worn for a long period of time. To ensure that the earphone 10 has a better listening effect while also ensuring the comfort and stability of the user when wearing it, in some embodiments, by adopting the design of covering at least a portion of the sound generation component 11 over the antihelix of the user, the distance between the midpoint C3 of the projection of the end FE of the sound generation component 11 on the sagittal plane and the projection of the edge of the concha cavity on the sagittal plane may be not greater than 15 mm. At this time, the baffle may be formed between the at least a portion of the sound generation component 11 and the antihelix region, which is more conducive to increasing the sound strength at the ear canal, so that in a specific frequency range, when the input voltage of the transducer does not exceed 0.6 V, the maximum sound pressure provided by the sound generation component to the ear canal may be not less than 70 dB. In some embodiments, the distance between the midpoint C3 of the projection of the end FE of the sound generation component 11 on the sagittal plane and the projection of the edge of the concha cavity on the sagittal plane may be not greater than 13 mm. In some embodiments, the distance between the midpoint C3 of the projection of the end FE of the sound generation component 11 on the sagittal plane and the projection of the edge of the concha cavity on the sagittal plane may be not greater than 11 mm. At this point, in a specific frequency range, when the input voltage of the transducer does not exceed 0.6 V, the maximum sound pressure provided by the sound generation component to the ear canal may be not less than 72 dB, so as to ensure a good listening effect of the earphone 10 as well as a better wearing comfort and stability. In addition, considering that there is a gap between the end FE of the sound generation component 11 and the inner contour 1014 of the auricle, the sound generated from the sound guiding hole and the sound generated from the pressure relief hole may have an acoustic short circuit in a region between the end FE of the sound generation component 11 and the inner contour 1014 of the auricle, resulting in a decrease in the listening volume at the opening of the ear canal of the user. The greater the region between the end FE of the sound generation component 11 and the inner contour 1014 of the auricle, the more significant the acoustic short circuit. To ensure the listening volume when the user wears the earphone 10, in some embodiments, the end FE of the sound generation component 11 may abut against the inner contour 1014 of the auricle, such that a path of the acoustic short circuit between the end FE of the sound generation component 11 and the inner contour of the auricle may be closed, thereby increasing the listening volume at the opening of the ear canal.

It may be noted that when the projection of the end FE of the sound generation component 11 on the sagittal plane is the curve or the polyline, the midpoint C3 of the projection of the end FE of the sound generation component 11 on the sagittal plane may be selected in the following exemplary manner. Two points of the projection of the end FE on the sagittal plane with the greatest distance in the short axis direction Z may be selected to make a line segment, and a midpoint on the line segment may be selected to make a midperpendicular, and a point where the midperpendicular intersects with the projection may be the midpoint of the projection of the end of the sound generation component 11 on the sagittal plane. In some embodiments, when the end FE of the sound generation component 11 is a curved surface, a point of tangency of the projection of the end FE where a tangent line parallel to the short axis direction Z is located may also be selected as the midpoint of the projection of the end FE of the sound generation component 11 on the sagittal plane.

In addition, in some embodiments of the present disclosure, the distance between the midpoint of the projection of the end FE of the sound generation component 11 on the sagittal plane and the projection of the edge of the concha cavity on the sagittal plane refers to a minimum distance between the midpoint of the projection of the end FE of the sound generation component 11 on the sagittal plane and the projection region of the edge of the concha cavity on the sagittal plane. Or, the distance between the midpoint C3 of the projection of the end FE of the sound generation component 11 on the sagittal plane and the projection of the edge of the concha cavity on the sagittal plane refers to a distance between the midpoint C3 of the projection of the end FE of the sound generation component 11 on the sagittal plane and the projection of the edge of the concha cavity on the sagittal plane in the sagittal axis.

In some embodiments, when the user wears the earphone as shown in FIGS. 20A and 20B, to make a whole or a portion of the structure of the sound generation component cover the antihelix region, there may be a certain angle between the upper sidewall 111 of the sound generation component 11 and the second portion 122 of the ear hook. Similar to a principle regarding that at least a portion of the sound generation component extends into the concha cavity, i.e., the angle may be expressed by an angle β between a projection of the upper sidewall 111 of the sound generation component 11 on a sagittal plane and a tangent line 126 of a projection of a connection between the upper sidewall 111 of the sound generation component 11 and the second portion 122 of the ear hook on the sagittal plane. Specifically, the upper sidewall of the sound generation component 11 and the second portion 122 of the ear hook may have a connection portion, the projection of the connection portion on the sagittal plan may be point U, and the tangent line 126 of the projection of the second portion 122 of the ear hook may be made passing point U. When the upper sidewall 111 is a curved surface, the projection of the upper sidewall 111 on the sagittal plane may be a curve or a polyline. At this time, the angle between the projection of the upper sidewall

111 on the sagittal plane and the tangent line 126 may be the angle between a tangent line at a point where the polyline has the greatest distance relative to the ground plane and the tangent line 126. In some embodiments, when the upper sidewall 111 is a curved surface, a tangent line on the projection thereof parallel to the long axis direction Y may also be selected, and the angle between the tangent line and the horizontal direction may be used to represent the angle between the projection of the upper sidewall 111 on the sagittal plane and the tangent line 126. In some embodiments, the angle β may be in a range of 45°-110°. In some embodiments, the angle β may be in a range of 60°-100°. In some embodiments, the angle β may be in a range of 80°-95°.

The human head may be approximately regarded as a sphere-like structure, the ear auricle may be a structure that is convex relative to the head, and when the user wears the earphone, a portion of the region of the ear hook may be fitted to the user's head. To enable the sound generation component 11 to be in contact with the antihelix region, in some embodiments, when the earphone is in the wearing state, the sound generation component may have a certain inclination angle relative to the ear hook plane. The inclination angle may be represented by an angle between the plane corresponding to the sound generation 11 and the ear hook plane. In some embodiments, the plane corresponding to the sound generation component 11 may include an outer side and an inner side. In some embodiments, when the outer side or the inner side of the sound generation component 11 is a curved surface, the plane corresponding to the sound generation component 11 may refer to a tangent plane at the center of the curved surface, or a plane that substantially coincides with a curve bounded by the edge contour of the curved surface. Taking the inner side of the sound generation component 11 as an example, the angle formed between the side and the ear hook plane may be the inclination angle of the sound generation component 11 relative to the ear hook plane.

Considering that a too great angle makes the contact area between the sound generation component 11 and the antihelix region of the user small, which is unable to provide sufficient contact resistance and the earphone is prone to fall off when the earphone is worn by the user. In addition, a size of the baffle formed by the sound generation component 11 at least partially covering the antihelix region of the sound generation component 11 (especially the size along the long axis direction Y of the sound generation component 11) may be too small, and a sound path difference between the sound guiding hole and the pressure relief hole to the outer ear canal 101 may be small, which affects the listening volume at the opening of the ear canal of the user. Furthermore, a too small size of the sound generation component 11 along the long axis direction Y may lead to a too great region between the end FE of the sound generation component 11 and the inner contour 1014 of the auricle, and the sound generated by the sound guiding hole and the sound generated by the pressure relief hole may have a short circuit in the region between the end FE of the sound generation component 11 and the inner contour 1014 of the auricle, resulting in a decrease in the listening volume at the opening of the ear canal of the user. To ensure that the user can wear the earphone 10 with a better listening effect while ensuring stability and comfort when wearing the earphone 10, exemplarily, in some embodiments, by adopting the design of covering at least a portion of the sound generation component 11 over the antihelix of the user, when the earphone is worn in a mode that at least a portion of the sound generation component 11 covers over the antihelix region of the user and the earphone is in the wearing state, the plane corresponding to the sound generation component 11 may be inclined at an angle in a range of not greater than 8° relative to the ear hook plane. At this time, in a specific frequency range, when the input voltage of the transducer does not exceed 0.6 V, the maximum sound pressure provided by the sound generation component to the ear canal may be not less than 70 dB, so that the sound generation component 11 has a greater contact area with the antihelix region of the user to improve the wearing stability, while most of the structure of the sound generation component 11 is located in the antihelix region, the opening of the ear canal may be completely open for the user to receive the sound from the external environment. In some embodiments, the inclination angle of the plane corresponding to the sound generation component 11 relative to the ear hook plane may be in a range of 2°-7°. In some embodiments, the inclination angle of the plane corresponding to the sound generation component 11 relative to the ear hook plane may be in a range of 3°-6°. At this time, in a specific frequency range, when the input voltage of the transducer does not exceed 0.6 V, the maximum sound pressure provided by the sound generation component to the ear canal may be not less than 72 dB, so as to ensure that the earphone 10 has good listening effect and wearing comfort.

As the ear hook itself is elastic, the inclination angle of the sound generation component relative to the ear hook plane may change between the wearing state and the non-wearing state. For example, the inclination angle in the non-wearing state may be smaller than the inclination angle in the wearing state. In some embodiments, by adopting the design of covering at least a portion of the sound generation component 11 over the antihelix of the user, when the earphone is in the non-wearing state, the inclination angle of the sound generation component relative to the ear hook plane may be in a range of 0° and 6°. At this time, a baffle may be formed by at least a portion of the sound generation component 11 and the antihelix region, which is more favorable to increase the sound strength at the ear canal, so that in a specific frequency range, when the input voltage of the transducer does not exceed 0.6 V, the maximum sound pressure provided by the sound generation component to the ear canal may be not less than 70 dB. By making the inclination angle of the sound generation component relative to the ear hook plane in the non-worn state slightly smaller than the inclination angle of the sound generation component relative to the ear hook plane in the wearing state, the earphone 10 may generate a certain clamping force on the user's ear (e.g., on the antihelix region) when the earphone 10 is in the wearing state, thereby improving the wearing stability when the earphone is in the wearing state without affecting the wearing experience of the user. In some embodiments, in the non-wearing state, the inclination angle of the sound generation component relative to the ear hook plane may be in a range of 2°-5°. At this time, in a specific frequency range, when the input voltage of the transducer does not exceed 0.6 V, the maximum sound pressure provided by the sound generation component to the ear canal may be not less than 72 dB, so as to ensure the good listening effect and wearing comfort of the earphone 10.

When the size of the sound generation component 11 in the thickness direction X is too small, volumes of the front cavity and the rear cavity formed by the diaphragm and the housing of the sound generation component 11 may be too small, a vibration amplitude of the vibration may be limited, and a great sound volume may not be provided. When the size of the sound generation component 11 in the thickness direction X is too great, an overall size or weight of the sound generation component 11 may be great in the wearing state, which affects the wearing stability and comfort. In some embodiments, to ensure that the sound generation component 11 has a better acoustic output effect as well as to ensure the wearing stability, in some embodiments, when the earphone is worn in such a way that at least a portion of the sound generation component 11 covers over the antihelix region of the user and the earphone is in a wearing state, the distance between a point on the sound generation component that is farthest from the ear hook plane and the ear hook plane may be in a range of 12 mm-19 mm, and the distance between the point on the sound generation component closest to the ear hook plane and the ear hook plane may be in a range of 3 mm-9 mm. At this point, in a specific frequency range, when the input voltage of the transducer does not exceed 0.6 V, the maximum sound pressure provided by the sound generation component to the ear canal may be not less than 70 dB. In some embodiments, when the earphones are in the wearing state, the distance between the point on the sound generation component that is farthest from the ear hook plane and the ear hook plane may be in a range of 13.5 mm-17 mm, and the distance between the point on the sound generation component closest to the ear hook plane and the ear hook plane may be in a range of 4.5 mm-8 mm. In some embodiments, when the earphone is in the wearing state, the distance between the point on the sound generation component that is farthest from the ear hook plane and the ear hook plane may be in a range of 14 mm-17 mm, and the distance between the point on the sound generation component closest to the ear hook plane and the ear hook plane may be in a range of 5 mm-7 mm. In some embodiments, the distance between the point on the sound generation component that is farthest from the ear hook plane and the ear hook plane may be controlled in a range of 12 mm-19 mm, and the distance between the point on the sound generation component closest to the ear hook plane and the ear hook plane may be controlled in a range of 3 mm-9 mm. At this time, at least in a certain frequency range, when the input voltage of the transducer does not exceed 0.6 V, the maximum sound pressure provided by the sound generation component to the ear canal may be not less than 72 dB to ensure that the earphone 10 has the good listening effect. In addition, the size of the sound generation component along the thickness direction X and the long axis direction Y may be constrained so that at least a portion of the sound generation component may cooperate with the antihelix region of the user to form a baffle, and at the same time, the earphone may have better wearing comfort and stability. The overall structure of the earphones shown in FIGS. 20A and 20B may be substantially the same as the overall structure of the earphones shown in FIGS. 14A and 14B. For contents on the inclination angle of the sound generation component of the earphone shown in FIGS. 16 and 18 relative to the ear hook plane and the distance between a point on the sound generation component 11 that is farthest from the ear hook plane and the ear hook plane, please refer to FIGS. 14A and 14B.

In some embodiments, when the wearing mode of the earphone 10 is covering at least a portion of the sound generation component 11 over the antihelix region of the user and the earphone is in the wearing state, at least a portion of the sound generation component 11 of the earphone 10 may be subjected to a force of the antihelix to prevent the sound generation component 11 from slipping, thereby ensuring the acoustic output effect of the sound generation component 11 and improving the wearing stability of the earphone by the force of the antihelix region on the sound generation component 11. At this time, the sound generation component 11 may have a certain inclination angle relative to the auricular plane of the user. When the inclination angle of the sound generation component 11 relative to the auricular plane has a great value, the sound generation component 11 may squeeze the antihelix region and cause a strong sense of discomfort when the user wears the earphone for a long time. Therefore, to enable the user to wear the earphone with better stability and comfort, and at the same time to enable the sound generation component 11 to have a better acoustic output effect, the inclination angle of the sound generation component of the earphone relative to the auricular plane may be in a range of 5°-40° in the wearing state. In some embodiments, to further optimize the acoustic output quality and the wearing experience of the earphone in the wearing state, the inclination angle of the sound generation component of the earphone relative to the auricular plane may be in a range of 8°-35°. In some embodiments, the inclination angle of the sound generation component relative to the auricular plane may be in a range of 15°-25°. At this point, a baffle may be formed by at least a portion of the sound generation component 11 and the antihelix region, which is more favorable to increase the sound strength at the ear canal, so that in a specific frequency range, when the input voltage of the transducer does not exceed 0.6 V, the maximum sound pressure provided by the sound generation component to the ear canal may be not less than 72 dB, so as to ensure a good listening effect and wearing comfort of the earphone 10. It may be noted that the inclination angle of the side wall of the sound generation component 11 away from the user's head or facing the opening of the ear canal of the user relative to the auricular plane of the user may be a sum of the angle $\gamma 1$ between the auricular plane and the sagittal plane and the angle $\gamma 2$ between the side wall of the sound generation component 11 away from the user's head or facing the opening of the ear canal of the user and the sagittal plane. For the inclination angle of the sound generation component relative to the sagittal plane, please refer to elsewhere in the embodiments of the present disclosure, e.g., FIG. 15 and the related descriptions.

Although reducing the size of the transducer may reduce the sound pressure output by the transducer, disposing at least a portion of the sound generation portion 11 at the antihelix may increase the sound pressure in the ear canal, so as to compensate for the effect of reducing the size of the transducer on the sound pressure. Of course, if the volume of the sound generation component 11 is too small, the transducer may be unable to output sufficient sound pressure, especially, the transducer may not be able to generate sufficient sound pressure by pushing air in middle and low frequency ranges. In some embodiments, to balance the communication between the opening of the ear canal and the external environment as well as the listening effect, when adopting the design of disposing at least a portion of the sound generation portion 11 at the antihelix, the size of the sound generation component 11 in the short axis direction Z may be in a range of 9 mm-18 mm, and the size of the sound generation component 11 in the long axis direction Y may be in a range of 16 mm-34 mm. In some embodiments, the size of the sound generation component 11 in the short axis direction Z may be in a range of 12 mm-17 mm, and the size of the sound generation component 11 in the long axis direction Y may be in a range of 17 mm-30 mm.

In some embodiments, the mass of the battery may be positively proportional to a power of the battery. In some embodiments, a too-small battery compartment 13 may affect the battery life of the earphone 10. In a situation of low input voltage or input power, and in a specific frequency range, the maximum sound pressure provided by the sound generation component 11 to the ear canal may be not less than 75 dB, that is, when the battery life is unchanged, the demand of the transducer on the power may be reduced. Therefore, disposing at least a portion of the sound generation component 11 at the antihelix may also increase the sound pressure in the ear canal as a way of compensating for the reduction of the impact of the battery mass on the sound pressure. In some embodiments, when at least a portion of the sound generation portion 11 is disposed at the antihelix, the mass of the battery compartment 13 may be in a range of 1.1 g-3.0 g.

Referring to FIG. 18, to make the sound generation component 11 of the earphone 10 have a good wearing feeling and listening effect under a wearing mode in which at least a portion of the sound generation portion 11 is disposed at the antihelix, in some embodiments, a ratio of the mass of the battery compartment 13 to the mass of the sound generation component 11 may be in a range of 0.15 to 0.66. In some embodiments, a stable wearing of the earphone 10 may make the position of the sound generation component relative to the ear canal of the user less likely to shift, so that the sound generation component 11 and the auricle form a baffle structure as shown in FIG. 19, so as to make the sound generation component 11 provide a higher sound pressure to the ear canal of the user. In some embodiments, to further improve the wearing stability, in the wearing mode of disposing at least a portion of the sound generation portion 11 at the antihelix, the ratio of the mass of the battery compartment 13 to the mass of the sound generation component 11 may be in a range of 0.2-0.52.

The basic concepts have been described above, and it is apparent to those skilled in the art that the foregoing detailed disclosure is intended as an example only and does not constitute a limitation of the present disclosure. While not expressly stated herein, those skilled in the art may make various modifications, improvements, and amendments to the present disclosure. Those types of modifications, improvements, and amendments are suggested in the present disclosure, so those types of modifications, improvements, and amendments are still within the spirit and scope of the exemplary embodiments of the present disclosure.

The specific embodiments described in the present disclosure are only exemplary, and one or more technical features in the specific embodiments are optional or additional, and do not constitute essential technical features of the inventive concept of the present disclosure. In other words, the protection scope of the present disclosure covers and is far greater than the specific embodiments.

Also, the present disclosure uses specific words to describe embodiments of the disclosure. such as “an embodiment”, “one embodiment”, and/or “some embodiments” means a feature, structure, or characteristic associated with at least one embodiment of the present disclosure. Accordingly, it should be emphasized and noted that “one embodiment” or “an embodiment” or “an alternative embodiment” referred to two or more times in different locations in the present disclosure do not necessarily refer to the same embodiment. In addition, certain features, structures, or characteristics in one or more embodiments of the present disclosure may be suitably combined.

Similarly, it should be noted that in order to simplify the presentation of the present disclosure, and thereby aid in the understanding of one or more embodiments of the present disclosure, the foregoing descriptions of the embodiments of the present disclosure sometimes group multiple features together in a single embodiment, accompanying drawing, or descriptions thereof. However, this mode of disclosure does not imply that the objects of the present disclosure require more features than those mentioned in the claims. Rather, claimed subject matter may lie in less than all features of a single foregoing disclosed embodiment.

Finally, it should be understood that the embodiments in the present disclosure are only used to illustrate the principles of the embodiments in the present disclosure. Other deformations may also fall within the scope of the present disclosure. As such, as an example, not as a limitation, alternative configurations of embodiments of the present disclosure may be viewed as consistent with the teachings of the present disclosure. Correspondingly, the embodiments of the present disclosure are not limited to the embodiments expressly presented and described herein.

What is claimed is:

1. An earphone, comprising:

a sound generation component including a transducer and a housing accommodating the transducer, at least a portion of the sound generation component covering an antihelix region of a user; and an ear hook including a first portion and a second portion, the first portion being hooked between an auricle and a head of the user, the second portion being connected to the first portion, extending toward an anterolateral side of the auricle, and being connected to the sound generation component to place the sound generation component at a position near an ear canal without blocking an opening of the ear canal; wherein the sound generation component has a first projection on a sagittal plane, and the auricle has a second projection on the sagittal plane, a centroid of the first projection having a first distance from a highest point of the second projection in a vertical axis direction, a ratio of the first distance to a height of the second projection in the vertical axis direction being in a range of 0.25-0.4; and in a specific frequency range, the sound generation component is capable of providing sound with a maximum sound pressure of not less than 70 dB into the ear canal when an input voltage of the transducer does not exceed 0.6 V.

2. The earphone of claim 1, wherein the centroid of the first projection has a second distance from an end point of the second projection in a sagittal axis direction, a ratio of the second distance to a width of the second projection in the sagittal axis direction being in a range of 0.4-0.6.

3. The earphone of claim 1, wherein a distance between the centroid of the first projection on the sagittal plane and a contour of the second projection on the sagittal plane is in a range of 13 mm-54 mm.

4. The earphone of claim 1, wherein a distance between the centroid of the first projection on the sagittal plane and a projection of the first portion of the ear hook on the sagittal plane is in a range of 8 mm-45 mm.

5. The earphone of claim 1, wherein a distance between the centroid of the first projection on the sagittal plane and a centroid of a projection of the opening of the ear canal on the sagittal plane is not greater than 25 mm.

6. The earphone of claim 1, wherein a projection of an upper sidewall or a lower sidewall of the sound generation component on the sagittal plane has an inclination angle in a range not greater than 40° relative to a horizontal direction.

7. The earphone of claim 1, wherein:

a distance between a midpoint of a projection of an upper sidewall of the sound generation component on the sagittal plane and the highest point of the second projection on the sagittal plane is in a range of 24 mm-36 mm; and a distance between a midpoint of a projection of a lower sidewall of the sound generation component on the sagittal plane and the highest point of the second projection on the sagittal plane is in a range of 22 mm-34 mm.

8. The earphone of claim 1, wherein a distance between a midpoint of a projection of an upper sidewall of the sound generation component on the sagittal plane and a projection of an apex of the ear hook on the sagittal plane is in a range of 13 mm and 20 mm; and a distance between a midpoint of a projection of a lower sidewall of the sound generation component on the sagittal plane and the projection of the apex of the ear hook on the sagittal plane is in a range of 22 mm-36 mm.

9. The earphone of claim 1, wherein in a non-wearing state, an inclination angle of the sound generation component relative to an ear hook plane of the ear hook is not greater than 8°.

10. The earphone of claim 9, wherein an inclination angle of the sound generation component relative to an auricular plane is in a range of 7°-25°.

11. The earphone of claim 9, wherein in the non-wearing state, a distance between a point on the sound generation component that is farthest from the ear hook plane and the ear hook plane is in a range of 26 mm-32 mm.

12. The earphone of claim 1, wherein the sound generation component has a mass between 3 g and 6 g.

13. The earphone of claim 12, wherein the sound generation component has a size between 16 mm and 34 mm in a long axis direction.

14. The earphone of claim 12, wherein the sound generation component has a size between 7 mm and 14 mm in a short axis direction.

15. The earphone of claim 1, wherein an end of the first portion of the ear hook away from the second portion includes a battery compartment, a mass of the battery compartment being between 1.1 g and 3.0 g.

16. The earphone of claim 15, wherein a ratio of the mass of the battery compartment to a mass of the sound generation component is in a range of 0.2-0.52.

17. The earphone of claim 15, wherein the battery compartment has a volume between 750 $mm^3$ and 2000 $mm^3$.

* * * * *